(12) United States Patent
Nakashima et al.

(10) Patent No.: US 9,832,761 B2
(45) Date of Patent: Nov. 28, 2017

(54) COMMUNICATION SYSTEM

(71) Applicant: Sharp Kabushiki Kaisha, Osaka-shi, Osaka (JP)

(72) Inventors: Daiichiro Nakashima, Osaka (JP); Kazuyuki Shimezawa, Osaka (JP); Toshizo Nogami, Osaka (JP); Kimihiko Imamura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/405,178

(22) PCT Filed: Jun. 7, 2013

(86) PCT No.: PCT/JP2013/065787
§ 371 (c)(1),
(2) Date: Dec. 3, 2014

(87) PCT Pub. No.: WO2013/183749
PCT Pub. Date: Dec. 12, 2013

(65) Prior Publication Data
US 2015/0131565 A1 May 14, 2015

(30) Foreign Application Priority Data
Jun. 7, 2012 (JP) ................................ 2012-129718

(51) Int. Cl.
*H04J 3/22* (2006.01)
*H04W 72/04* (2009.01)
(Continued)

(52) U.S. Cl.
CPC ....... *H04W 72/0413* (2013.01); *H04L 1/0026* (2013.01); *H04L 1/1671* (2013.01);
(Continued)

(58) Field of Classification Search
None
See application file for complete search history.

(56) References Cited

U.S. PATENT DOCUMENTS

2013/0064216 A1* 3/2013 Gao ...................... H04L 5/0016
370/330
2013/0114530 A1* 5/2013 Chen ................... H04W 72/042
370/329

(Continued)

OTHER PUBLICATIONS

U.S. Appl. No. 61/644,089, Gao.*

(Continued)

*Primary Examiner* — Kwang B Yao
*Assistant Examiner* — Juvena Loo
(74) *Attorney, Agent, or Firm* — Keating & Bennett, LLP

(57) ABSTRACT

It is possible to efficiently transmit and receive signals containing uplink control information between a base station apparatus and a mobile station apparatus.

eREG is configured with a plurality of resources into which one DL PRB pair is divided, eCCE is configured with an aggregation of a plurality of eREGs, a second PDCCH is configured with an aggregation of one or more eCCEs, a PUCCH resource corresponds to each eCCE, a first reception processing unit receives information indicating a plurality of second PDCCH regions and information indicating a PUCCH resource in which association with eCCE of the second PDCCH region for each second PDCCH region is started, from the base station apparatus, and a first control unit configures a PUCCH resource, in which association with eCCE of the second PDCCH region is started, for each second PDCCH region, based on the received information.

6 Claims, 23 Drawing Sheets

(51) Int. Cl.
*H04L 1/00* (2006.01)
*H04L 1/16* (2006.01)
*H04L 1/18* (2006.01)
*H04L 5/00* (2006.01)

(52) U.S. Cl.
CPC .......... *H04L 1/1861* (2013.01); *H04L 5/0053* (2013.01); *H04L 5/0055* (2013.01); *H04L 5/0007* (2013.01); *H04W 72/042* (2013.01); *H04W 72/0446* (2013.01)

(56) References Cited

U.S. PATENT DOCUMENTS

| | | | | |
|---|---|---|---|---|
| 2013/0121304 A1* | 5/2013 | Nory | ...................... | H04L 1/1861 370/330 |
| 2013/0194931 A1* | 8/2013 | Lee | ...................... | H04L 5/0053 370/241 |
| 2013/0230017 A1* | 9/2013 | Papasakellariou | ...................... | H04W 72/0406 370/330 |
| 2013/0230030 A1* | 9/2013 | Papasakellariou | ...................... | H04W 72/0406 370/336 |
| 2013/0242882 A1* | 9/2013 | Blankenship | ...................... | H04W 72/0453 370/329 |
| 2013/0242890 A1* | 9/2013 | He | ...................... | H04L 5/1469 370/329 |
| 2014/0301329 A1* | 10/2014 | Kim | ...................... | H04L 1/1861 370/329 |

OTHER PUBLICATIONS

U.S. Appl. No. 61/606,772, Aris Papasakellariou, "HARQ-ACK Transmission in Response to Detection of a Control Channel in a Communication System Supporting Multiple Types of Control Channels".*
Sharp, "PUCCH Resource for ePDCCH", 3GPP TSG RAN WG1 Meeting #69, R1-122968, May 21-25, 2012.
Ericsson et al., "Way Forward on downlink control channel enhancements by UE-specific RS Al 7.5.3.2", 3GPP TSG-RAN WG1 #66bis, R1-113589, Oct. 10-14, 2011, 2 pages.
NTT DOCOMO, "Design Principle for E-PDCCH Multiplexing", 3GPP TSG RAN WG1 Meeting #69, R1-121976, May 21-25, 2012, pp. 1-3.
Sharp et al., "WF on PUCCH Format 1a/1b resource allocation for ePDCCH based HARQ-ACKS", 3GPP TSG-RAN WG1 Meeting #69, R1-123013, May 21-25, 2012, 4 pages.
Alcatel-Lucent Shanghai Bell et al., "DCI Multiplexing for ePDCCH", 3GPP TSG RAN WG1 Meeting #68bis, R1-121253, Mar. 26-30, 2012, 3 pages.
Alcatel-Lucent Shanghai Bell et al., "PUCCH resource mapping with ePDCCH", 3GPP TSG RAN WG1 #67, R1-114066, Nov. 14-18, 2011, 2 pages.
Sharp, "PUCCH resource management for CoMP Scenarios", 3GPP TSG RAN WG1 Meeting #68bis, R1-121352, Mar. 26-30, 2012, pp. 1-15.
Official Communication issued in International Patent Application No. PCT/JP2013/065787, dated Jul. 9, 2013.
ASUSTeK, "PUCCH Resource Allocation Corresponding to ePDCCH", 3GPP TSG RAN WG1, Meeting #68, R1-120666, Jan. 31, 2012, 2 pages.
Samsung, "HARQ-ACK PUCCH Resources in Response to E-PDCCH Detections", 3GPP TSG RAN WG1, #68bis, R1-121647, Mar. 20, 2012, pp. 1-2.

* cited by examiner

FIG. 15

| PUCCH resrouce 1 | UL PRB pair 5 | Code 1 IN FREQUENCY DOMAIN | Code 1 IN TIME DOMAIN |
|---|---|---|---|
| PUCCH resrouce 2 | UL PRB pair 5 | Code 1 IN FREQUENCY DOMAIN | Code 2 IN TIME DOMAIN |
| PUCCH resrouce 3 | UL PRB pair 5 | Code 1 IN FREQUENCY DOMAIN | Code 3 IN TIME DOMAIN |
| PUCCH resrouce 4 | UL PRB pair 5 | Code 2 IN FREQUENCY DOMAIN | Code 1 IN TIME DOMAIN |
| PUCCH resrouce 5 | UL PRB pair 5 | Code 2 IN FREQUENCY DOMAIN | Code 2 IN TIME DOMAIN |
| PUCCH resrouce 6 | UL PRB pair 5 | Code 2 IN FREQUENCY DOMAIN | Code 3 IN TIME DOMAIN |
| PUCCH resrouce 7 | UL PRB pair 5 | Code 3 IN FREQUENCY DOMAIN | Code 1 IN TIME DOMAIN |
| PUCCH resrouce 8 | UL PRB pair 5 | Code 3 IN FREQUENCY DOMAIN | Code 2 IN TIME DOMAIN |
| PUCCH resrouce 9 | UL PRB pair 5 | Code 3 IN FREQUENCY DOMAIN | Code 3 IN TIME DOMAIN |
| PUCCH resrouce 10 | UL PRB pair 5 | Code 4 IN FREQUENCY DOMAIN | Code 1 IN TIME DOMAIN |
| PUCCH resrouce 11 | UL PRB pair 5 | Code 4 IN FREQUENCY DOMAIN | Code 2 IN TIME DOMAIN |
| PUCCH resrouce 12 | UL PRB pair 5 | Code 4 IN FREQUENCY DOMAIN | Code 3 IN TIME DOMAIN |
| PUCCH resrouce 13 | UL PRB pair 6 | Code 1 IN FREQUENCY DOMAIN | Code 1 IN TIME DOMAIN |
| PUCCH resrouce 14 | UL PRB pair 6 | Code 1 IN FREQUENCY DOMAIN | Code 2 IN TIME DOMAIN |
| PUCCH resrouce 15 | UL PRB pair 6 | Code 1 IN FREQUENCY DOMAIN | Code 3 IN TIME DOMAIN |
| PUCCH resrouce 16 | UL PRB pair 6 | Code 2 IN FREQUENCY DOMAIN | Code 1 IN TIME DOMAIN |
| PUCCH resrouce 17 | UL PRB pair 6 | Code 2 IN FREQUENCY DOMAIN | Code 2 IN TIME DOMAIN |
| PUCCH resrouce 18 | UL PRB pair 6 | Code 2 IN FREQUENCY DOMAIN | Code 3 IN TIME DOMAIN |
| PUCCH resrouce 19 | UL PRB pair 6 | Code 3 IN FREQUENCY DOMAIN | Code 1 IN TIME DOMAIN |
| PUCCH resrouce 20 | UL PRB pair 6 | Code 3 IN FREQUENCY DOMAIN | Code 2 IN TIME DOMAIN |
| PUCCH resrouce 21 | UL PRB pair 6 | Code 3 IN FREQUENCY DOMAIN | Code 3 IN TIME DOMAIN |
| PUCCH resrouce 22 | UL PRB pair 6 | Code 4 IN FREQUENCY DOMAIN | Code 1 IN TIME DOMAIN |
| PUCCH resrouce 23 | UL PRB pair 6 | Code 4 IN FREQUENCY DOMAIN | Code 2 IN TIME DOMAIN |
| PUCCH resrouce 24 | UL PRB pair 6 | Code 4 IN FREQUENCY DOMAIN | Code 3 IN TIME DOMAIN |

FIG. 23

☐ SECOND PDCCH (eREG)

⋮ UE-specific RS

→ FREQUENCY

↓ TIME

| 1 | 2 | 3 | 4 | 5 | 6 | 7 | 8 | 9 | 10 | 11 | 12 |
|---|---|---|---|---|---|---|---|---|----|----|----|
| 13 | 14 | 15 | 16 | 1 | 2 | 3 | 4 | 5 | 6 | 7 | 8 |
| 9 | 10 | 11 | 12 | 13 | 14 | 15 | 16 | 1 | 2 | 3 | 4 |
| 5 | 6 | 7 | 8 | 9 | 10 | 11 | 12 | 13 | 14 | 15 | 16 |
| 1 | 2 | 3 | 4 | 5 | 6 | 7 | 8 | 9 | 10 | 11 | 12 |
| 13 | RS | 14 | 15 | 16 | 1 | RS | 2 | 3 | 4 | 5 | RS |
| 6 | RS | 7 | 8 | 9 | 10 | RS | 11 | 12 | 13 | 14 | RS |
| 15 | 16 | 1 | 2 | 3 | 4 | 5 | 6 | 7 | 8 | 9 | 10 |
| 11 | 12 | 13 | 14 | 15 | 16 | 1 | 2 | 3 | 4 | 5 | 6 |
| 7 | 8 | 9 | 10 | 11 | 12 | 13 | 14 | 15 | 16 | 1 | 2 |
| 3 | 4 | 5 | 6 | 7 | 8 | 9 | 10 | 11 | 12 | 13 | 14 |
| 15 | 16 | 1 | 2 | 3 | 4 | 5 | 6 | 7 | 8 | 9 | 10 |
| 11 | RS | 12 | 13 | 14 | 15 | RS | 16 | 1 | 2 | 3 | RS |
| 4 | RS | 5 | 6 | 7 | 8 | RS | 9 | 10 | 11 | 12 | RS |

COMMUNICATION SYSTEM

TECHNICAL FIELD

The present invention relates to a communication system, a mobile station apparatus, a base station apparatus, a communication method, and an integrated circuit, in which in a communication system configured with a plurality of mobile station apparatuses and a base station apparatus, resources to be used in transmission and reception of uplink control information are efficiently controlled, the mobile station apparatuses are capable of efficiently transmitting signals containing the uplink control information to the base station apparatus, and the base station apparatus is capable of efficiently receiving signals containing the uplink control information from the mobile station apparatuses.

BACKGROUND ART

Evolution of a radio access scheme and a radio network of a cellular mobile communication (hereinafter, referred to as "Long Term Evolution (LTE®))" or "Evolved Universal Terrestrial Radio access (EUTRA)") has been standardized in a 3rd Generation Partnership Project (3GPP®). In LTE, Orthogonal Frequency Division Multiplexing (OFDM) scheme, which is multicarrier transmission, is adopted as a communication scheme of wireless communication from a base station apparatus to a mobile station apparatus (referred to as downlink (DL)). Further, in LTE, Single-Carrier Frequency Division Multiple Access (SC-FDMA) scheme, which is single carrier transmission, is adopted as a communication scheme of wireless communication from the mobile station apparatus to the base station apparatus (referred to as uplink (UL)). In LTE, Discrete Fourier Transform-Spread OFDM (DFT-Spread OFDM) scheme is adopted as the SC-FDMA scheme.

LTE is developed, and thus Long Term Evolution-Advanced (LTE-A) adopting a new technology is specified. In LTE-A, at least the same channel structure as that of LTE is supported. A channel means a medium to be used in transmission of signals. A channel to be used in a physical layer is termed a physical channel, whereas a channel to be used in a Medium Access Control (MAC) layer is termed a logical channel. The types of the physical channel includes a Physical Downlink Shared CHannel (PDSCH) to be used in transmission and reception of data and control information of the downlink, a Physical Downlink Control CHannel (PDCCH) to be used in transmission and reception of control information of the downlink, a Physical Uplink Shared CHannel (PUSCH) to be used in transmission and reception of data and control information of the uplink, a Physical Uplink Control CHannel (PUCCH) to be used in transmission and reception of control information of the uplink, a Synchronization CHannel (SCH) to be used for synchronization establishment of the downlink, a Physical Random Access CHannel (PRACH) to be used for synchronization establishment of the uplink, a Physical Broadcast CHannel (PBCH) to be used in transmission of system information of the downlink, and the like. The mobile station apparatus or the base station apparatus maps and transmits signals which are generated from control information, data, and the like on each physical channel. Data which is transmitted on the physical downlink shared channel or the physical uplink shared channel is termed a transport block.

Control information which is mapped on the physical uplink control channel is termed Uplink Control Information (UCI). The uplink control information is control information (reception confirmation acknowledgement; ACK/NACK) indicating acknowledgement (ACK) or negative acknowledgement (NACK) with respect to data mapped on the received physical downlink shared channel, control information (Scheduling Request: SR) indicating a request for allocation of an uplink resource, or control information (Channel Quality Indicator: CQI) indicating reception quality (also referred to as channel quality) of the downlink.

<Cooperative Communication>

In order to reduce or suppress interference for the mobile station apparatus in a cell edge region or to increase reception signal power, applying Cooperative Multipoint communication (CoMP communication) to LTE and LTE-A is being considered which performs communication between neighboring cells in cooperation with each other. In addition, for example, the form in which the base station apparatus performs communication by using a certain frequency band will be referred to as "a cell". For example, as the CoMP communication, in a plurality of cells, a different weighting signal process (pre-coding process) is applied on a signal, a plurality of base station apparatuses cooperate to transmit the signal to the same mobile station apparatus (also referred to as Joint Processing or Joint Transmission). This method enables to improve a signal power-to-interference noise power ratio of the mobile station apparatus and improve the reception characteristics of the mobile station apparatus. For example, as CoMP communication, a method in which a plurality of cells cooperate to perform a scheduling for the mobile station apparatus (Coordinated Scheduling: CS) is being considered. This method enables to improve a signal power-to-interference noise power ratio of the mobile station apparatus. For example, as the CoMP communication, a method in which a plurality of cells cooperate to apply a beamforming on signals and transmit the signals to the mobile station apparatus (Coordinated Beamforming: CB) is being considered. This method enables to improve a signal power-to-interference noise power ratio of the mobile station apparatus. For example, as the CoMP communication, a method in which only one cell transmits signals by using a predetermined resource, other cells do not transmit signals on a predetermined resource (Blanking and Muting) is being considered. This method enables to improve a signal power-to-interference noise power ratio of the mobile station apparatus.

In addition, with respect to a plurality of cells to be used in the cooperative communication, different cells may be configured with different base station apparatuses, different cells may be configured with different Remote Radio Heads (RRH) (more compact outdoor radio unit than the base station apparatus, and also referred to as a Remote Radio Unit: RRU) which are managed by the same base station apparatus, different cells may be configured with a base station apparatus and RRH managed by the base station apparatus, or different cells may be configured with the base station apparatus and the RRH managed by a base station apparatus different from the base station apparatus.

A base station apparatus having a wide coverage is generally referred to as a macro base station apparatus. A base station apparatus having a narrow coverage is generally referred to as a pico base station apparatus or a femto base station apparatus. The RRH is considered generally to operate in an area having a narrower coverage than that of the macro base station apparatus. The deployment of a communication system configured with the macro base station apparatus and the RRH in which the coverage supported by the macro base station apparatus includes all or a part of the coverage supported by the RRH is referred to as a heterogeneous network deployment. In a communication system of such a heterogeneous network deployment, a method is considered in which the macro base station apparatus and the RRH cooperate to transmit signals to the mobile station apparatus located within an overlapped coverage. Here, the RRH is managed by the macro base station apparatus and transmission and reception thereof are controlled. In addition, the macro base station apparatus and the RRH are connected to each other by a wired line such as an optical fiber or a wireless line using a relay technology. In this manner, since the macro base station apparatus and the RRH perform cooperative communication each using all or partially the same radio resource, it is possible to improve overall frequency utilization efficiency (transmission capacity) within an area of a coverage which has built by the macro base station apparatus.

When a mobile station apparatus is located in the vicinity of the macro base station apparatus or the RRH, the mobile station apparatus can perform single cell communication with the macro base station apparatus or the RRH. In other words, some mobile station apparatuses perform communication with the macro base station apparatus or the RRH without using the cooperative communication so as to transmit and receive signals. For example, the macro base station apparatus receives an uplink signal from the mobile station apparatus located close to the macro station apparatus in distance. For example, the RRH receives an uplink signal from the mobile station apparatus located close to the RRH in distance. Further, when the mobile station apparatus is located in the vicinity of the edge (cell edge) of a coverage built by the RRH, measures against the co-channel interference from the macro base station apparatus is required. A method has been considered which reduces or suppresses interference for the mobile station apparatus in the cell edge region by using a CoMP scheme in which neighboring base stations cooperate with each other as a multi-cell communication (cooperative communication) between the macro base station apparatus and the RRH.

Further, it has been considered that the mobile station apparatus receives signals transmitted from both the macro base station apparatus and the RRH by using cooperative communication in the downlink, and transmits signals in a form suitable for either the macro base station apparatus or the RRH in the uplink. For example, the mobile station apparatus transmits uplink signals in transmission power that is suitable for the macro base station apparatus to receive the signals. For example, the mobile station apparatus transmits uplink signals in transmission power that is suitable for the RRH to receive the signals. This reduces unnecessary interference in the uplink, and improves the frequency utilization efficiency.

It is necessary for the mobile station apparatus to obtain control information indicating a modulation scheme, a coding rate, a spatial multiplexing number, a transmission power adjustment value, allocation of resource, and the like which are used in data signals, with respect to a reception process of the data signals. With respect to LTE and LTE-A, it has been considered to introduce a new control channel (enhanced physical downlink control channel: ePDCCH) for transmitting control information regarding the data signals (NPL 1). For example, it has been considered to improve the capacities of all control channels. For example, it has been considered to support interference coordination in a frequency domain for the enhanced physical downlink control channel. For example, it has been considered to support spatial multiplexing for the enhanced physical downlink control channel. For example, it has been considered to support beamforming for the enhanced physical downlink control channel. For example, it has been considered to support diversity for the enhanced physical downlink control channel. For example, it has been considered to use the enhanced physical downlink control channel in a new type of carrier. For example, it has been considered not to perform transmission of the reference signal which is common to all mobile station apparatuses within a cell, in the new type of carrier. For example, it has been considered to further reduce the transmission frequency of the reference signal which is common to all mobile station apparatuses within the cell than the conventional transmission frequency, in the new type of carrier. For example, it has been considered to demodulate signals such as control information by using a reference signal specific to the mobile station apparatus, in the new type of carrier.

For example, as an application of beamforming, it has been considered to apply cooperative communication, and transmission through a plurality of antennas to the enhanced physical downlink control channel. Specifically, it has been considered that a plurality of base station apparatuses and a plurality of RRHs apply a pre-coding process on signals of the enhanced physical downlink control channel and apply the same pre-coding process on a reference signal (RS) for demodulating the signals of the enhanced physical downlink control channel. Specifically, it has been considered that a plurality of base station apparatuses and a plurality of RRHs allocate the enhanced physical downlink control channel and RS, to which the same pre-coding process is applied, in a region of resources in which the PDSCH is allocated, and transmit the enhanced physical downlink control channel and RS. It has been considered that a mobile station apparatus demodulates the signals of the enhanced physical downlink control channel which is subjected to the same pre-coding process, by using the received RS which has been subjected to the pre-coding process, so as to obtain control information. In this method, it is not necessary for the base station apparatus and the mobile station apparatus to exchange information regarding the pre-coding process which is applied to the signal of the enhanced physical downlink control channel.

For example, a method has been considered which configures signals of the enhanced physical downlink control channel by using resources separated in the frequency domain so as to achieve an effect of frequency diversity, as the application of diversity. In contrast, a method has been considered which configures signals of the enhanced physical downlink control channel by using the resources which are not separated in the frequency domain, when beamforming is applied to the enhanced physical downlink control channel.

A mapping method for resources configuring the enhanced physical downlink control channel has been considered. It has been considered to make the unit of resources configuring one enhanced physical downlink control channel to be a set of physical resource block pairs of a predetermined number (NPL 2). For example, the set of a plurality of physical resource block pairs which is the unit of resources configuring one enhanced physical downlink control channel is referred to as an enhanced physical downlink control channel set (ePDCCH set). In NPL 2, it is considered to configure a plurality of enhanced physical downlink control channels which are configured with the physical resource block pairs of a predetermined number, for the mobile station apparatus. For example, it is considered that in a plurality of mobile station apparatuses for which a plurality of enhanced physical downlink control channel sets are configured, some enhanced physical downlink control channel sets are configured with a plurality of common physical resource block pairs and some different enhanced physical downlink control channel sets are configured with a plurality of different physical resource block pairs. It is considered that the mobile station apparatus performs a decoding process for detecting the enhanced physical downlink control channel, in each of the plurality of configured enhanced physical downlink control channel sets.

Meanwhile, a method is considered which allocates resources of a physical uplink control channel which are used in transmission and reception of ACK/NACK for the physical downlink shared channel to which resources are allocated by downlink control information which is transmitted and received in an enhanced physical downlink control channel (NPL 3). A method is considered in which the resources of the physical uplink control channel are implicitly determined based on a logical resource (enhanced Control Channel Element: eCCE) number that is used in the enhanced physical downlink control channel, without using signaling which explicitly indicates the resources of the physical uplink control channel.

In NPL 3, with respect to resources of the physical uplink control channel which are used in transmission and reception of ACK/NACK for the physical downlink shared channel to which resources are allocated by downlink control information which is transmitted and received in the existing physical downlink control channel, and with respect to resources of the physical uplink control channel which are used in transmission and reception of ACK/NACK for the physical downlink shared channel to which resources are allocated by downlink control information which is transmitted and received in the enhanced physical downlink control channel, a method of allowing at least some resources to be shared is considered. In the existing physical downlink control channel, the method is considered in which the resources of the physical uplink control channel are implicitly determined based on the logical resource (Control Channel Element: CCE) number that is used in the physical downlink control channel, without using signaling which explicitly indicates the resources of the physical uplink control channel, the resource of the physical uplink control channel in which the association with the control channel element is started, in other words, the resource of the physical uplink control channel in which the association with the control channel element of the minimum number is performed is controlled, and the mobile station apparatus is notified, in advance, of information indicating the resource of the physical uplink control channel in which the association with the control channel element is started, from the base station apparatus. It is considered that in the enhanced physical downlink control channel, the resource of the physical uplink control channel in which association with the enhanced control channel element of the enhanced physical downlink control channel is started is controlled independently of the resource of the physical uplink control channel in which the association with the control channel element of the existing physical downlink control channel is started, and the mobile station apparatus is notified, in advance, of information indicating the resource of the physical uplink control channel in which the association with the enhanced control channel element is started, from the base station apparatus independently of the information indicating the resource of the physical uplink control channel in which the association with the control channel element is started.

In the above method in which the resource of the physical uplink control channel is implicitly determined, the resources of a plurality of physical uplink control channels are reserved in advance for the uplink. Among a plurality of resources which are reserved, the resources which are actually used in transmission and reception of uplink control information for each subframe are dependent on the control channel element of the physical downlink control channel which is used for each subframe and the enhanced control channel element of the enhanced physical downlink control channel.

CITATION LIST

Non-Patent Document

NPL 1: 3GPP TSG RAN WG1#66bis, Zhuhai, China, 10-14, October, 2011, R1-113589 "Way Forward on downlink control channel enhancements by UE-specific RS"

NPL 2: 3GPP TSG RAN WG1#69, Prague, Czech Republic, 21-25, May, 2012, R1-121976 "Design Principle for E-PDCCH Multiplexing"

NPL 3: 3GPP TSG RAN WG1#69, Prague, Czech Republic, 21-25, May, 2012, R1-123013 "WF on PUCCH Format 1a/1b resource allocation for ePDCCH based HARQ-ACKs"

DISCLOSURE OF THE INVENTION

Problems to be Solved by the Invention

However, in the related studies, with respect to a method of allocating resources of the physical uplink control channel which are used in transmission and reception of ACK/NACK for the physical downlink shared channel to which resources are allocated by downlink control information which is transmitted and received in the enhanced physical downlink control channel, a case is not considered sufficiently in which a plurality of enhanced physical downlink control channel sets are configured in a plurality of mobile station apparatuses.

In the case where different mobile station apparatuses use the physical uplink control channel which is configured with the same resources, signal collision occurs, the signals exert interference on each other, and the reception quality of the signal deteriorates. Meanwhile, preparing different resources in advance for respective mobile station apparatuses, with respect to the resource of the physical uplink control channel which is reserved, in order to avoid collision of signals of the resource of the physical uplink control channel induces an increase in overhead, and the capacity of a system deteriorates.

The present invention has been made in view of the above circumstances, an object is to provide a communication system, a mobile station apparatus, a base station apparatus, a communication method, and an integrated circuit, in which in a communication system configured with a plurality of mobile station apparatuses and a base station apparatus, resources to be used in transmission and reception of uplink control information are efficiently controlled, the mobile station apparatus is capable of efficiently transmitting signals containing uplink control information to the base station apparatus, and the base station apparatus is capable of efficiently receiving signals containing the uplink control information from the mobile station apparatus.

Means for Solving the Problems (1) The present invention includes the following means in order to achieve the above objects. In other words, a communication system of the present invention is a communication system which is configured with a plurality of terminal apparatuses and a base station apparatus capable of communicating with the plurality of terminal apparatuses by using EPDCCH and PUCCH, in which the base station apparatus includes a second radio resource control unit configured to and/or programmed to configure a plurality of EPDCCH sets for each of the terminal apparatuses, and to configure a PUCCH resource, in which association with an ECCE index is started, for the configuration of each of the EPDCCH sets; and a second transmission processing unit configured to and/or programmed to transmit information indicating the configurations of the plurality of EPDCCH sets and a plurality of the PUCCH resources which are configured by the second radio resource control unit, to the terminal apparatuses, and the terminal apparatus includes a first reception processing unit configured to and/or programmed to receive information indicating a plurality of EPDCCH sets and information indicating a PUCCH resource offset for each of the EPDCCH sets from the base station apparatus; a first radio resource control unit configured to and/or programmed to configure the plurality of EPDCCH sets, according to information received by the first reception processing unit; and a first control unit configured to and/or programmed to configure a PUCCH resource, in which association with an ECCE index is started, for each of the EPDCCH sets which are configured by the first radio resource control unit, according to the information received by the first reception processing unit.

(2) Further, a terminal apparatus of the present invention is a terminal apparatus which is capable of communicating with a base station apparatus by using EPDCCH and PUCCH, and includes a first reception processing unit configured to and/or programmed to receive information indicating a plurality of EPDCCH sets and information indicating a PUCCH resource offset for each of the EPDCCH sets, from the base station apparatus; a first radio resource control unit configured to and/or programmed to configure the plurality of EPDCCH sets, according to the information received by the first reception processing unit; and a first control unit configured to and/or programmed to configure a PUCCH resource, in which association with an ECCE index is started, for each of the EPDCCH sets which are configured by the first radio resource control unit, according to the information received by the first reception processing unit.

(3) Further, in the terminal apparatus of the present invention, the PUCCH is used in transmission and reception of ACK/NACK, and the ACK/NACK corresponds to PDSCH data of which resource allocation information is represented by detected EPDCCH.

(4) Further, in the mobile station apparatus of the present invention, a PUCCH format 1a or a PUCCH format 1b is used for the PUCCH.

(5) Further, in the mobile station apparatus of the present invention, the first control unit is configured to and/or programmed to determine the PUCCH resource that is used in transmission of the ACK/NACK, based on at least an ECCE index of a minimum number among one or more ECCEs configuring the EPDCCH, which contains resource allocation information of the PDSCH, and a PUCCH resource in which association with ECCE of an PDCCH set from which the EPDCCH is detected is started.

(6) Further, a base station apparatus of the present invention is a base station apparatus capable of communicating with a plurality of terminal apparatuses by using EPDCCH and PUCCH, and includes a second radio resource control unit configured to and/or programmed to configure a plurality of EPDCCH sets and configures a PUCCH resource in which the association with an ECCE index is started, for the configuration of each of the EPDCCH sets; and a second transmission processing unit configured to and/or programmed to transmit information indicating the configurations of the plurality of EPDCCH sets and a plurality of the PUCCH resources which are configured by the second radio resource control unit, to the terminal apparatuses.

(7) Further, in the base station apparatus of the present invention, the PUCCH is used in transmission and reception of ACK/NACK, and the ACK/NACK corresponds to PDSCH data of which resource allocation information is represented by transmitted EPDCCH.

(8) Further, in the base station apparatus of the present invention, a PUCCH format 1a or a PUCCH format 1b is used for the PUCCH.

(9) Further, a communication method of the present invention is a communication method which is used in a terminal apparatus capable of communicating with a base station apparatus by using EPDCCH and PUCCH, and includes at least a step of receiving information indicating a plurality of EPDCCH sets and information indicating a PUCCH resource offset for each of the EPDCCH sets, from the base station apparatus; a step of configuring a plurality of EPDCCH sets, according to information received by the first reception processing unit; and a step of configuring a PUCCH resource, in which association with an ECCE index is started, for each of the EPDCCH sets which are configured by the first radio resource control unit, according to the received information.

(10) Further, a communication method of the present invention is a communication method which is used in a base station apparatus capable of communicating with a plurality of terminal apparatuses by using EPDCCH and PUCCH, and includes at least a step of configuring a plurality of EPDCCH sets and configuring a PUCCH resource, in which the association with an ECCE index is started, for the configuration of each of the EPDCCH sets; and a step of transmitting information indicating the configurations of the plurality of EPDCCH sets which are configured and the plurality of PUCCH resources, to the terminal apparatuses.

(11) Further, an integrated circuit of the present invention is an integrated circuit which is implemented in a terminal apparatus capable of communicating with a base station apparatus by using EPDCCH and PUCCH, and causes the terminal apparatus to exert a series of functions including a function of receiving information indicating a plurality of EPDCCH sets and information indicating a PUCCH resource offset for each of the EPDCCH sets, from the base station apparatus; and a function of configuring a plurality of EPDCCH sets, according to information received by the first reception processing unit; and a function of configuring a PUCCH resource, in which association with an ECCE index is started, for each of the EPDCCH sets which are configured by the first radio resource control unit, according to the received information.

(12) Further, an integrated circuit of the present invention is an integrated circuit which is implemented in a base station apparatus capable of communicating with a plurality of terminal apparatuses by using EPDCCH and PUCCH, and causes the base station apparatus to exert a series of functions including a function of configuring a plurality of EPDCCH sets and configuring a PUCCH resource, in which association with an ECCE index is started, for the configuration of each of the EPDCCH sets; and a function of transmitting information indicating the configurations of the plurality of EPDCCH sets which are configured and the plurality of PUCCH resources, to the terminal apparatuses.

Although the present invention is disclosed herein as improvements of a communication system, a mobile station apparatus, a base station apparatus, a communication method, and an integrated circuit in which a region having a possibility of the control channel being allocated therein for the mobile station apparatus is configured by a base station apparatus, a communication scheme to which the present invention is applicable is not limited to communication schemes such as LTE or LTE-A having upward compatibility with LTE. For example, the present invention can be applied to a Universal Mobile Telecommunications System (UMTS).

Effects of the Invention

According to the present invention, a mobile station apparatus is capable of efficiently transmitting a signal containing uplink control information to a base station apparatus, the base station apparatus is capable of efficiently receiving the signal containing the uplink control information from the mobile station apparatus, and thus it is possible to realize more efficient communication system.

BRIEF DESCRIPTION OF THE DRAWINGS

FIG. 15 is a diagram illustrating the configuration and the number of ACK/NACK PUCCH resource in the communication system according to the embodiment of the present invention.

FIG. 23 is a diagram illustrating an example of a configuration of eREG of the embodiment of the present invention.

BEST MODE FOR CARRYING OUT THE INVENTION

The technology described herein may be used in various wireless communication systems such as a Code Division Multiple Access (CDMA) system, a Time Division Multiple Access (TDMA) System, a Frequency Division Multiple Access (FDMA) system, an Orthogonal FDMA (OFDMA) system, a Single Carrier FDMA (SC-FDMA) system, and other systems. The terms "system" and "network" may be often used synonymously. The CDMA system can implement wireless technologies (standards) such as Universal Terrestrial Radio Access (UTRA) or cdma2000 (registered trademark). The UTRA includes Wideband CDMA (WCDMA (registered trademark)) and other improved types of CDMA. The cdma2000 includes IS-2000, IS-95, and IS-856 standards. The TDMA system can implement a wireless technology such as a Global System for Mobile Communications (GSM (registered trademark)). The OFDMA system can implement wireless technologies such as Evolved UTRA (E-UTRA), Ultra Mobile Broadband (UMB), IEEE802.11 (Wi-Fi), IEEE802.16 (WiMAX), IEEE802.20, and Flash-OFDM (registered trademark). 3GPP Long Term Evolution (LTE) is an E-UTRA employing the OFDMA on a downlink and SC-FDMA on an uplink. LTE-A is an improved LTE system, wireless technology, and standard. UTRA, E-UTRA, LTE, LTE-A and GSM are described in documents issued from organizations named the 3rd Generation Partnership Project (3GPP). The cdma2000 and the UMB are described in documents issued from organizations named the 3rd Generation Partnership Project 2 (3GPP2). For clarity, as some aspects of the present technology, data communication in LTE and LTE-A will be described below, and the terms used in LTE and LTE-A are used in the description below.

Hereinafter, embodiments of the present invention will be described in detail with reference to drawings. An overview of a communication system according to the present embodiment and a configuration of a radio frame will be described using FIGS. 9 to 25. A configuration of the communication system according to the present embodiment will be described using FIGS. 1 to 6. An operation process of the communication system according to the present embodiment will be described using FIGS. 7 and 8.

Figure 9:
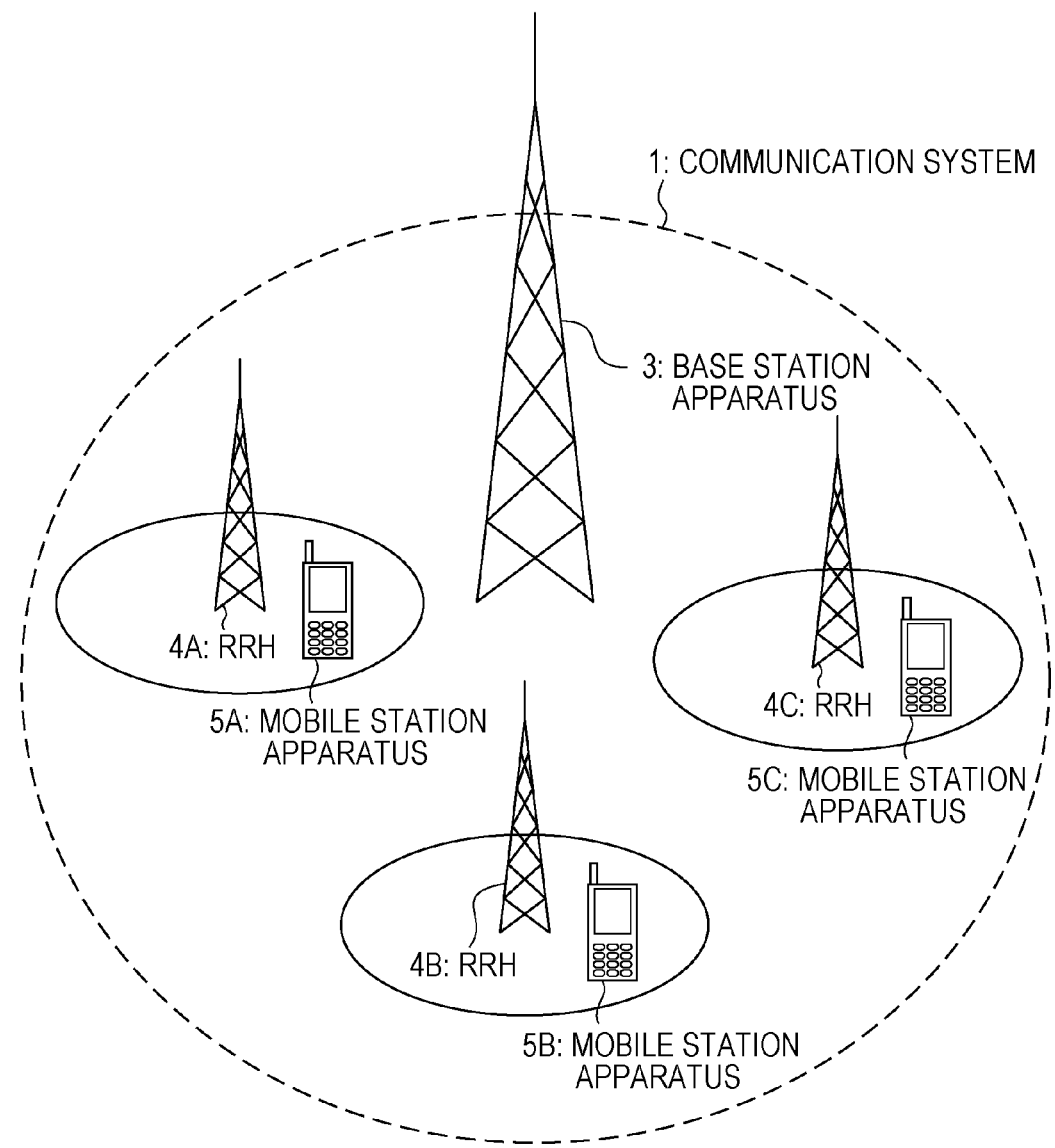
FIG. 9 is a diagram schematically describing an overall appearance of a communication system according to an embodiment of the present invention.

FIG. 9 is a diagram schematically describing an overall appearance of a communication system according to an embodiment of the present invention. In the communication system 1 illustrated in FIG. 9, a base station apparatus (also referred to as an eNodeB, a NodeB, a Base Station (BS), an Access Point (AP), and a macro base station) 3, a plurality of RRHs (also referred to as a Remote Radio Head, an apparatus having an outdoor wireless unit smaller than the base station apparatus, and a Remote Radio Unit (RRU)) 4A, 4B, and 4C, a plurality of mobile station apparatuses (also referred to as User Equipment (UE), a Mobile Station (MS), a Mobile Terminal (MT), a terminal, a terminal apparatus, and a mobile terminal) 5A, 5B, and 5C perform communication with each other. Hereinafter, in the present embodiment, a description will be made appropriately while the RRHs 4A, 4B, and 4C are referred to as a RRH 4 and the mobile station apparatuses 5A, 5B, and 5C are referred to as a mobile station apparatus 5. In the communication system 1, the base station apparatus 3 and the RRH 4 cooperate to perform communication with the mobile station apparatus 5. In FIG. 9, the base station apparatus 3 and the RRH 4A perform cooperative communication with the mobile station apparatus 5A, the base station apparatus 3 and the RRH 4B perform cooperative communication with the mobile station apparatus 5B, and the base station apparatus 3 and the RRH 4C perform cooperative communication with the mobile station apparatus 5C.

In addition, the RRH may be referred to as a special form of the base station apparatus. For example, it may be said that the RRH is a base station apparatus which has only a signal processing unit and for which configuration of parameters used in the RRH, a scheduling determination and the like are performed by another base station apparatus. Accordingly, it should be noted that the expression of the base station apparatus 3 appropriately includes the RRH 4 in the following description.

<Cooperative Communication>

The communication system 1 according to the embodiment of the present invention uses cooperative communication (Cooperative Multipoint (CoMP) communication) in which a plurality of cells cooperate to perform transmission and reception of signals. In addition, for example, a form in which the base station apparatus performs communication using one frequency band will be referred to as "a cell". For example, as the cooperative communication, different weighting signal processes (pre-coding process) are applied to signals in a plurality of cells (the base station apparatus 3 and the RRH 4), and the base station apparatus 3 and the RRH 4 cooperate to transmit the signals to the same mobile station apparatus 5 (Joint Processing, Joint Transmission). For example, as the cooperative communication, a plurality of cells (base station apparatus 3 and the RRH 4) cooperate to perform a scheduling for the mobile station apparatus 5 (Coordinated Scheduling: CS). For example, as the cooperative communication, a plurality of cells (base station apparatus 3 and the RRH 4) cooperate to apply a beamforming on signals and transmit the signals to the mobile station apparatus 5 (Coordinated Beamforming: CB). For example, as the cooperative communication, only one cell (the base station apparatus 3 or the RRH 4) transmits a signal by using a predetermined resource and the other cell (the base station apparatus 3 or the RRH 4) does not transmit a signal by using the predetermined resource (Blanking and Muting). For example, as cooperative communication, a cell to be used in transmission is selected among a plurality of cells (the base station apparatus 3 and the RRH 4) for each subframe and a signal is transmitted to the mobile station apparatus 5 (Dynamic Point Switching: DPS).

In addition, although a description is omitted in the embodiments of the present invention, with respect to a plurality of cells used in the cooperative communication, different cells may be configured with different base station apparatuses 3, may be configured with different RRHs 4 managed by the same base station apparatus 3, or may be configured with a RRH 4 managed by the base station apparatus 3 and a base station apparatus 3 which is different from the base station apparatus 3.

In addition, although a plurality of cells are used as physically different cells, they may be used as logically the same cells. Specifically, it may be configured that a common cell identifier (Physical cell ID) is used in each cell. For example, although common physical cell ID is used in physically different cells, other different virtual cell IDs are used in respective cells. For example, such a cell is referred to as a Virtual Cell. A configuration in which a plurality of transmission apparatuses (the base station apparatus 3 and the RRH 4) transmit common signals to the same reception apparatus by using the same frequency band is also referred to as a Single Frequency Network (SFN).

The deployment of the communication system 1 of the embodiment of the present invention is assumed as the deployment of a heterogeneous network. The communication system 1 is configured with the base station apparatus 3 and the RRH 4, and is configured such that the coverage supported by the base station apparatus 3 includes all or a part of the coverage supported by the RRH 4. Here, the coverage means an area for realizing communication while satisfying a request. In the communication system 1, the base station apparatus 3 and the RRH 4 cooperate to transmit signals to the mobile station apparatus 5 located within an overlapped coverage. Here, the RRH 4 is managed by the base station apparatus 3, and transmission and reception thereof is controlled. In addition, the base station apparatus 3 and the RRH 4 are connected by a wired line such as an optical fiber or a wireless line using a relay technology.

When the mobile station apparatus 5 is located in the vicinity of the base station apparatus 3 or the RRH 4, the mobile station apparatus 5 may use single cell communication with the base station apparatus 3 or the RRH 4. In other words, some mobile station apparatuses 5 may perform communication with the base station apparatus 3 or the RRH 4 and perform transmission and reception of signals, while not using the cooperative communication. For example, the base station apparatus 3 may receive uplink signals from the mobile station apparatus 5 close to the base station apparatus in distance. For example, the RRH 4 may receive uplink signals from the mobile station apparatus 5 close to the RRH in distance. Further, for example, both the base station apparatus 3 and the RRH 4 may receive uplink signals from the mobile station apparatus 5 located in the vicinity of an edge (cell edge) of a coverage built by the RRH 4.

Further, the mobile station apparatus 5 may receive signals transmitted from both the base station apparatus 3 and the RRH 4 by using the cooperative communication in the downlink, and may transmit signals in a form suitable for any of the base station apparatus 3 or the RRH 4 in the uplink. For example, the mobile station apparatus 5 transmits uplink signals in transmission power suitable for the base station apparatus 3 to receive signals. For example, the mobile station apparatus 5 transmits uplink signals in transmission power suitable for the RRH 4 to receive signals.

A plurality of RRHs 4 may simultaneously transmit different signals by using the same physical resource, in the downlink. For example, an RRH 4A, an RRH 4B, and an RRH 4C transmit reference signals using respectively different scrambling sequences in the downlink. In this manner, an aspect of performing communication with a plurality of mobile station apparatuses which are spatially separated, by using the same physical resource is referred to as Cell-splitting. A plurality of RRHs 4 form communication areas in a coverage area of one base station apparatus 3, and virtual cells are configured by respective RRHs 4. In such a cell deployment, the mobile station apparatus 5 does not recognize the existence of a virtual cell, therefore, even when the mobile station apparatus 5 moves to the different virtual cell, a handover procedure is not executed.

The base station apparatus 3 and the RRH 4 may simultaneously transmit different signals by using the same physical resource in the downlink. For example, the base station apparatus 3 and the RRH 4 transmit reference signals using respectively different scrambling sequences in the downlink. The base station apparatus 3 and the RRH 4 respectively perform different pre-coding processes on the signals to be transmitted and control beams of signals for the mobile station apparatuses 5 in each area, such that even when the same resource is used in the frequency domain and the time domain, the base station apparatus 3 and the RRH 4 realize relatively high orthogonality for the signals among mobile station apparatuses 5 and reduce co-channel interference. Such a technology is referred to as Multi-User (MU)-MIMO. Since signals among the mobile station apparatuses 5 are spatially demultiplexed, such a technology is also referred to as Space Division Multiple Access (SDMA). The MU-MIMO using reference signals using different scrambling sequences is referred to as MU-MIMO with quasi-orthogonal RS.

In FIG. 9, it is assumed that an area near to the RRH 4A is an area A, an area near to the RRH 4B is an area B, and an area near to the RRH 4C is an area C. In the area of the base station apparatus 3, different pre-coding processes are executed on a second PDCCH and a UE-specific RS, described later, which are respectively used in the mobile station apparatus 5 located in the area A, the mobile station apparatus 5 located in the area B, and the mobile station apparatus 5 located in the area C. The regions in which the second PDCCH may be allocated are separately configured and the pre-coding process may be separately applied, with respect to the mobile station apparatus 5 located in the area A, the mobile station apparatus 5 located in the area B, and the mobile station apparatus 5 located in the area C.

In the communication system 1, the DownLink (DL) which is a communication direction from the base station apparatus 3 or the RRH 4 to the mobile station apparatus 5 is configured to include a downlink pilot channel, a Physical Downlink Control CHannel (PDCCH), and a Physical Downlink Shared CHannel (PDSCH). The cooperative communication is applied to or is not applied to the PDSCH. The PDCCH is configured with a first PDCCH and a second PDCCH (enhanced physical downlink control channel (enhanced PDCCH: e-PDCCH)). The downlink pilot channel is configured with a first type of reference signal (CRS described later) used in demodulating the PDSCH, the first PDCCH and a second type of reference signal (UE-specific RS described later) used in demodulating the PDSCH and the second PDCCH, and a third type of reference signal (CSI-RS described later).

In addition, from one viewpoint, the first PDCCH is a physical channel in which the same transmission ports (an antenna port and a transmit antenna) as the first type of reference signal is used. Further, the second PDCCH is a physical channel in which the same transmission port as the second type of reference signal is used. The mobile station apparatus 5 demodulates the signals mapped to the first PDCCH by using the first type of reference signal, and demodulates the signals mapped to the second PDCCH by using the second type of reference signal. The first type of reference signal is a reference signal which is common to all mobile station apparatuses 5 within a cell, inserted into almost all resource blocks and available also in any mobile station apparatus 5. Therefore, any mobile station apparatus 5 can demodulate the first PDCCH. In contrast, the second type of reference signal is a reference signal which is inserted into only an allocated resource block. The second type of reference signal can be subjected to a pre-coding process adaptively in the same way as data.

In addition, from one viewpoint, the first PDCCH is a control channel allocated in OFDM symbols in which the PDSCH is not allocated. Further, the second PDCCH is a control channel allocated in the OFDM symbols in which the PDSCH is allocated. In addition, from one viewpoint, the first PDCCH is a control channel in which signals are basically allocated over all PRBs (PRB of a first slot) of the downlink system band, and the second PDCCH is a control channel in which signals are allocated over PRB pairs (PRB) configured by the base station apparatus 3 within the downlink system band. In addition, although a detailed description will be made later, from one viewpoint, different signal configurations are used in the first PDCCH and the second PDCCH. A CCE structure described later is used in the signal configuration in the first PDCCH, and an enhanced CCE (eCCE) (second element) structure described later is used in the signal configuration in the second PDCCH. In other words, the first PDCCH and the second PDCCH are different in a minimum unit (element) of resources used in the configuration of one control channel, and respective control channels are configured to include one or more respective minimum units.

Further, in the communication system 1, the UpLink (UL) which is a communication direction from the mobile station apparatus 5 to the base station apparatus 3 or the RRH 4 is configured to include a Physical Uplink Shared CHannel (PUSCH), an uplink pilot channel (Uplink Reference Signal (UL RS), Sounding Reference Signal (SRS), and Demodulation Reference Signal (DM RS)), and a Physical Uplink Control CHannel (PUCCH). The channel means a medium used in transmission of signals. A channel used in a physical layer is termed a physical channel, whereas a channel used in a Medium Access Control (MAC) layer is termed a logical channel.

Further, the present invention may be applied to a communication system of a case, for example, where the cooperative communication is applied to the downlink, and of a case, for example, where transmission through a plurality of antennas is applied to the downlink, and for simplicity of explanation, although a case where the cooperative communication is not applied to the uplink and a case where transmission through a plurality of antennas are not applied to the uplink have been described, the present invention is not limited to such cases.

The PDSCH is a physical channel used in transmission and reception of data and control information of the downlink (different from the control information transmitted on the PDCCH). The PUSCH is a physical channel used in transmission and reception of data and control information of the uplink (different from the control information transmitted in the downlink). The PUCCH is a physical channel used in transmission and reception of control information of the uplink (Uplink Control Information (UCI)). As the types of the UCI, a reception confirmation acknowledgement (ACK/NACK) indicating a positive ACKnowledgement (ACK) or a Negative ACKnowledgement (NACK) for the data of the downlink of PDSCH, a Scheduling request (SR) indicating whether the allocation of a resource is requested or not, and the like are used. As the types of other physical channels, a Synchronization CHannel (SCH) used for synchronization establishment of the downlink, a Physical Random Access CHannel (PRACH) used for synchronization establishment of the uplink, a Physical Broadcast CHannel (PBCH) used in transmission of system information (also referred to as a System Information Block (SIB)) of the downlink, and the like are used. Further, the PDSCH is used in transmission of system information of the downlink.

The mobile station apparatus 5, the base station apparatus 3, or the RRH 4 allocate signals which are generated from control information, data, and the like in each physical channel, and transmit the signals. The mobile station apparatus 5, the base station apparatus 3, or the RRH 4 receives each physical channel in which signals generated from control information, data, and the like are mapped and transmitted. The data transmitted in the PDSCH or the PUSCH is referred to as a transport block. Further, an area which is managed by the base station apparatus 3 or the RRH 4 is referred to as a cell.

<Configuration of Downlink Time Frame>

Figure 10:
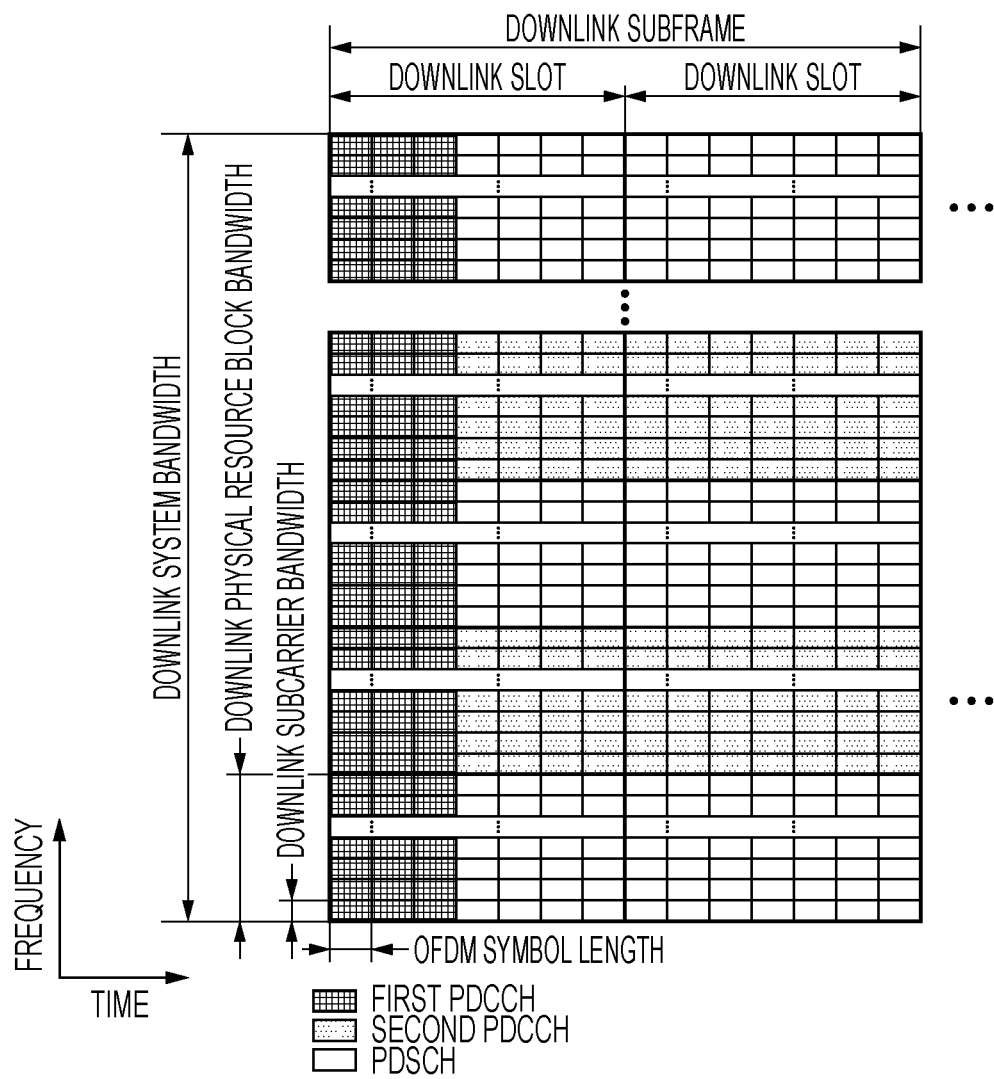
FIG. 10 is a diagram showing a schematic configuration of a time frame of a downlink from the base station apparatus 3 or the RRH 4 to the mobile station apparatus 5, according to the embodiment of the present invention.

FIG. 10 is a diagram showing a schematic configuration of a time frame of a downlink from the base station apparatus 3 or the RRH 4 to the mobile station apparatus 5, according to the embodiment of the present invention. In FIG. 10, the horizontal axis represents a time domain and the vertical axis represents a frequency domain. The downlink time frame is a unit of allocation of resources and the like, and is configured with a pair (also referred to as Physical Resource Block pair (PRB pair)) of Resource Blocks (RB) (also referred to as a Physical Resource Block (PRB)) configured with a frequency band and a time band having a predetermined width in the downlink. One downlink PRB pair (also referred to as a downlink Physical Resource Block pair (DL PRB pair)) is configured with two consecutive PRBs in the time domain in the downlink (also referred to as a DownLink Physical Resource Block (DL PRB)).

Further, in FIG. 10, one DL PRB is configured with 12 subcarriers in the frequency domain in the downlink (also referred to as a downlink subcarrier), and seven Orthogonal Frequency Division Multiplexing (OFDM) symbols in the time domain. The downlink system band (referred to as a downlink system band) is a downlink communication band of the base station apparatus 3 or the RRH 4. For example, the downlink system bandwidth (referred to as a downlink system bandwidth) is configured with a frequency bandwidth of 20 MHz.

In addition, a plurality of DL PRBs (DP PRB pairs) are allocated according to the downlink system bandwidth in the downlink system band. For example, the downlink system band of the frequency bandwidth of 20 MHz is configured with 110 DL PRBs (DP PRB pairs).

Further, in the time domain illustrated in FIG. 10, there are a slot configured with 7 OFDM symbols (also referred to as a downlink slot), and a subframe configured with 2 downlink slots (also referred to as a downlink subframe). In addition, a unit configured with one downlink subcarrier and one OFDM symbol is referred to as a Resource Element (RE) (downlink resource element). At least the PDSCH used in transmission of information data (referred to as a Transport Block) and the first PDCCH and the second PDCCH which are used in transmission of control information for the PDSCH are allocated in respective downlink subframes. In FIG. 10, the first PDCCH is configured with the first to third OFDM symbols in the downlink subframe, and the PDSCH and the second PDCCH are configured with the fourth to 14th OFDM symbols in the downlink subframe. In addition, the PDSCH and the second PDCCH are allocated in different DL PRB pairs. In addition, the number of OFDM symbols configuring the first PDCCH and the number of OFDM symbols configuring the PDSCH and the second PDCCH may vary depending on respective downlink subframes. In addition, the number of OFDM symbols configuring the second PDCCH may be fixed. For example, irrespective of the number of OFDM symbols configuring the first PDCCH, and the number of OFDM symbols configuring the PDSCH, the second PDCCH may be configured with the fourth to 14th OFDM symbols in the downlink subframe.

Further, in FIG. 10, one or more first PDCCHs are allocated in the resources that are indicated as the first PDCCH. Further, in FIG. 10, one or more second PDCCHs are allocated in the resources that are indicated as the second PDCCH. Further, in FIG. 10, one or more PDSCHs are allocated in the resources that are indicated as the PDSCH.

Although it is not illustrated in FIG. 10, the downlink pilot channels used in transmission of the Reference signal (RS) of the downlink (also referred to as a downlink reference signal) are Distributed and allocated in a plurality of the downlink resource elements. Here, the downlink reference signal is configured with the first type of reference signal, the second type of reference signal, and the third type of reference signal which are of at least different types. For example, the downlink reference signal is used in estimation of the channel change of the PDSCH and the PDCCH (first PDCCH and second PDCCH). The first type of reference signal is used in demodulation of the PDSCH and the first PDCCH and is referred to as a Cell specific RS (CRS). The second type of reference signal is used in demodulation of the PDSCH and the second PDCCH and is also referred to as a UE-specific RS. For example, the third type of reference signal is used only in estimation of the channel change, and is also referred to as a Channel State Information RS (CSI-RS). The downlink reference signal is a known signal in the communication system 1. In addition, the number of the downlink resource elements configuring the downlink reference signal may depend on the number of transmit antennas (antenna ports) in used in communication from the base station apparatus 3 and the RRH 4 to the mobile station apparatus 5. In the following description, a case where the CRS, the UE-specific RS, and the CSI-RS are respectively used as the first type of reference signal, the second type of reference signal and the third type of reference signal will be described. In addition, the UE-specific RS may be used in the demodulation of a PDSCH to which the cooperative communication is applied and a PDSCH to which the cooperative communication is not applied. In addition, the UE-specific RS may be used in the demodulation of a second PDCCH to which the cooperative communication (pre-coding process) is applied and a second PDCCH to which the cooperative communication is not applied.

Signals generated from the control information such as information indicating the allocation of the DL PRB pair to the PDSCH, information indicating the allocation of the UL PRB pair to the PUSCH, and a mobile station identifier (also referred to as a Radio Network Temporary Identifier (RNTI)), a modulation scheme, a coding rate, a retransmission parameter, a spatial multiplexing number, a pre-coding matrix, and a Transmission Power Control command (TPC command) are mapped in the PDCCH (the first PDCCH or the second PDCCH). The control information included in the PDCCH is referred to as Downlink Control Information (DCI). The DCI including information indicating allocation of DL PRB pair to the PDSCH is referred to as a downlink assignment (also referred to as DL assignment or Downlink grant), and the DCI including information indicating allocation of a UL PRB pair to the PUSCH is referred to as a uplink grant (also referred to as UL grant). In addition, the downlink assignment includes a transmission power control command for the PUCCH. In addition, the uplink assignment includes a transmission power control command for the PUSCH. In addition, one PDCCH includes only information indicating allocation of one PDSCH resource or information indicating allocation of one PUSCH resource, and does not include information indicating allocation of resources of a plurality of PDSCHs or information indicating allocation of resources of a plurality of PUSCHs.

Further, as information transmitted on the PDCCH, there is a Cyclic Redundancy Check (CRC) code. A relationship between the DCI, the RNTI, and CRC which are transmitted on the PDCCH will be described in detail. The CRC code is generated from the DCI using a predetermined generating polynomial. A process of an exclusive OR (also referred to as a scrambling) is performed on the generated CRC code using RNTI. The signals obtained by modulating a bit indicating the DCI and a bit (also referred to as a CRC masked by UE ID) generated by performing a process of the exclusive OR on the CRC code using RNTI are actually transmitted on the PDCCH.

The PDSCH resource is allocated in the same downlink subframe as the downlink subframe in which the PDCCH resource including downlink assignment used in the allocation of the PDSCH resource is allocated, in the time domain.

Figure 11:
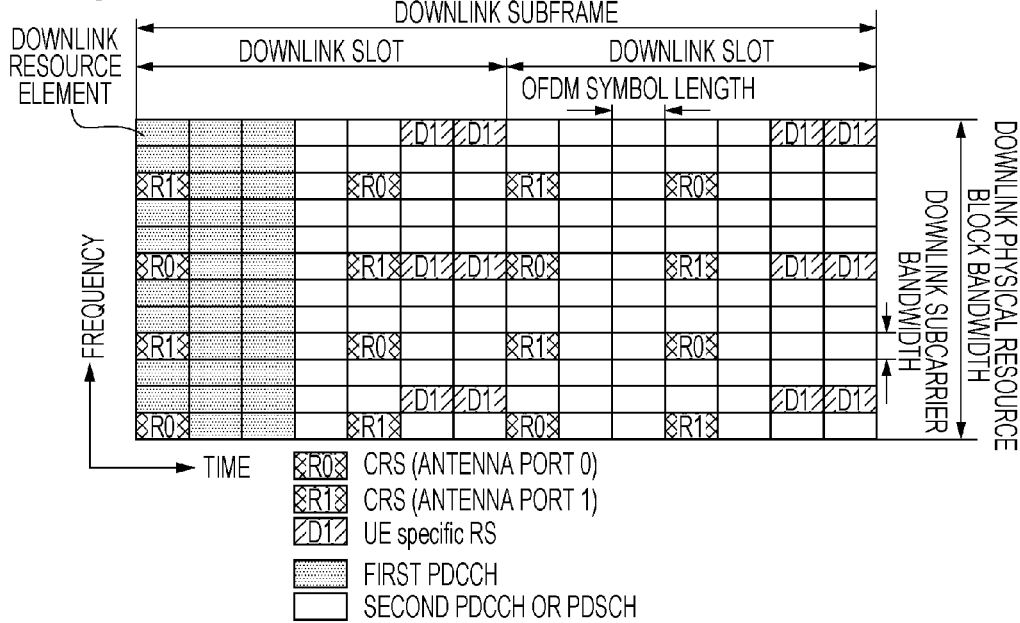
FIG. 11 is a diagram showing an example of mapping of the downlink reference signals within a downlink subframe of a communication system 1 according to an embodiment of the present invention.

The mapping of the downlink reference signal will be described. FIG. 11 is a diagram of an example of mapping of the downlink reference signals within the downlink subframe of the communication system 1 according to an embodiment of the present invention. For simplicity of description, although the mapping of the downlink reference signals within any one DL PRB pair is described in FIG. 11, an mapping method common to a plurality of DL PRB pairs within the downlink system band is used.

Among shaded downlink resource elements, R0 and R1 indicate the CRSs of antenna ports 0 and 1, respectively. Here, the antenna port means a logical antenna used in a signal process, and one antenna port may be configured with a plurality of physical antennas. With respect to the antenna ports used in transmission of CRS, the plurality of physical antennas configuring the same antenna port transmit the same signal. With respect to the antenna ports used in transmission of CRS, delay diversity or Cyclic Delay Diversity (CDD) may be applied using the plurality of physical antennas in the same antenna port, but other signal processes may not be used. Here, although FIG. 11 shows the case where the CRSs correspond to two antenna ports, the communication system of the present embodiment may correspond to different numbers of antenna ports, for example, CRSs for one antenna port or four antenna ports may be mapped to downlink resources. The CRSs may be allocated within all DL PRB pairs in the downlink system band.

Among shaded downlink resource elements, D1 indicates a downlink resource element in which UE-specific RS is allocated. Here, the antenna port means a logical antenna used in signal processing, one antenna port may be configured with a plurality of physical antennas. With respect to the antenna port used in the transmission of the UE-specific RS, signals subjected to different signal processes (for example, different phase rotation process) are transmitted through a plurality of physical antennas configuring the same antenna port. With respect to the antenna port used in the transmission of the UE-specific RS, beamforming is realized by using a plurality of physical antennas, in the same antenna port. When the UE-specific RS is transmitted by using a plurality of antenna ports, different codes are used in each antenna port. For example, walsh code is used as the code. That is, Code Division Multiplexing (CDM) is applied to the UE-specific RS for each antenna port. Here, with respect to the UE-specific RS, the length of code used in the CDM or the number of the downlink resource elements to be mapped vary depending on the control signal mapped to the DL PRB pair and the type (the number of antenna ports) of the signal process used in the data signal.

FIG. 11 illustrates an example of mapping of the UE-specific RS in the case in which the number of antenna ports used in the transmission of the UE-specific RS is one (antenna port 7), or two (antenna port 7 and antenna port 8). For example, when the number of antenna ports used in the transmission of the UE-specific RS in the base station apparatus 3 and the RRH 4 is two, the UE-specific RS is multiplexed and allocated by using a code of which the code-length is two, with two downlink resource elements in consecutive time domains (OFDM symbol) in the same frequency domain (subcarrier) as a unit (a unit of CDM). In other words, in this case, CDM is applied to the multiplexing of the UE-specific RS. In FIG. 11, the UE-specific RS of the antenna port 7 and the antenna port 8 is multiplexed by CDM in D1.

Figure 12:
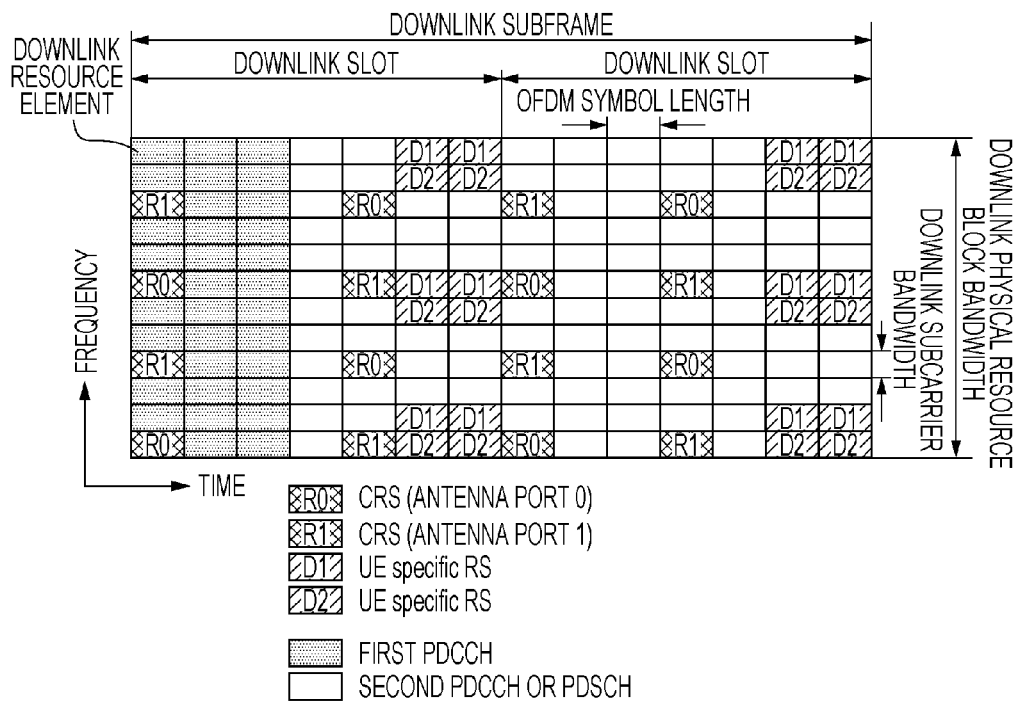
FIG. 12 is a diagram showing an example of mapping of the downlink reference signals within a downlink subframe of the communication system 1 according to the embodiment of the present invention.

FIG. 12 is a diagram illustrating an example of mapping of the downlink reference signal in the downlink subframe of the communication system 1 according to the embodiment of the present invention. Among shaded downlink resource elements, D1 and D2 indicate UE-specific RS. FIG. 12 illustrates an example of mapping of the UE-specific RS in the case in which the number of antenna ports used in the transmission of the UE-specific RS is three (antenna port 7, antenna port 8, and antenna port 9), or four (antenna port 7, antenna port 8, antenna port 9, and antenna port 10). For example, when the number of antenna ports used in the transmission of the UE-specific RS in the base station apparatus 3 and the RRH 4 is four, the number of the downlink resource elements to which the UE-specific RS is mapped is changed to double, and the UE-specific RS is multiplexed to and allocated in different downlink resource elements for every two antenna ports. In other words, in this case, CDM and Frequency Division Multiplexing (FDM) are applied to the multiplexing of the UE-specific RS. In FIG. 12, the UE-specific RS of the antenna port 7 and the antenna port 8 is multiplexed by CDM in D1, and the UE-specific RS of the antenna port 9 and the antenna port 10 is multiplexed by CDM in D2.

For example, when the number of antenna ports used in the transmission of the UE-specific RS in the base station apparatus 3 and the RRH 4 is eight, the number of the downlink resource elements to which the UE-specific RS is mapped is changed to double, and the UE-specific RS is multiplexed and allocated by using a code of which the code-length is four, with four downlink resource elements as a unit. In other words, in this case, CDMs having different code-lengths are applied to the multiplexing of the UE-specific RS.

Further, in the UE-specific RS, a scramble code is further superimposed on the code of each antenna port. For example, the scramble code is generated based on the cell ID (physical cell ID) and the scramble ID, which are notified from the base station apparatus 3 and the RRH 4. For example, the scramble code is generated from the pseudo-random sequence generated based on the cell ID and the scramble ID, which are notified from the base station apparatus 3 and the RRH 4. For example, the scramble ID is a value indicating 0 or 1. In addition, parameters passed individually to each mobile station apparatus 5 may be used in the generation of the scrambling codes used for the UE-specific RS. For example, each mobile station apparatus 5 is notified of a virtual cell ID as a parameter, from the base station apparatus 3. The UE-specific RS is allocated within the DL PRB pair of the PDSCH and the second PDCCH allocated to the mobile station apparatus 5 which is configured to use the UE-specific RS. Different scrambling methods may be used in the UE-specific RS allocated within the DL PRB pair which is allocated to the PDSCH and the UE-specific RS allocated within the DL PRB pair which is allocated to the second PDCCH. For example, with respect to the UE-specific RS allocated within the DL PRB pair which is allocated to the PDSCH, two virtual cell IDs are configured for the mobile station apparatus 5 by the base station apparatus 3, and which virtual cell ID is used is indicated by the downlink control information. For example, with respect to the UE-specific RS allocated within the DL PRB pair which is allocated to the second PDCCH, one virtual cell ID is configured for the mobile station apparatus 5 by the base station apparatus 3, and the scrambling ID of a fixed value such as 0 is used.

Further, the base station apparatus 3 and the RRH 4 may allocate the CRS signal to different downlink resource elements, or may allocate the CRS signal to the same downlink resource element. For example, when the cell IDs notified respectively from the base station apparatus 3 and the RRH 4 are different, the CRS signal may be allocated to different downlink resource elements. In a separate example, only base station apparatus 3 may allocate the CRS signal to some downlink resource elements, and the RRH 4 may not allocate the CRS signal to any downlink resource element. For example, when the cell ID is notified only from the base station apparatus 3, as described above, only the base station apparatus 3 may allocate the CRS signal to a part of the downlink resource element, and the RRH 4 may not allocate the CRS signal even to the downlink resource element. In a separate example, the base station apparatus 3 and the RRH 4 may allocate the CRS signal to the same downlink resource element, and the base station apparatus 3 and the RRH 4 may transmit the same sequence. For example, when the cell IDs notified from the base station apparatus 3 and the RRH 4 are the same, the CRS signal may be allocated as described above.

Figure 13:
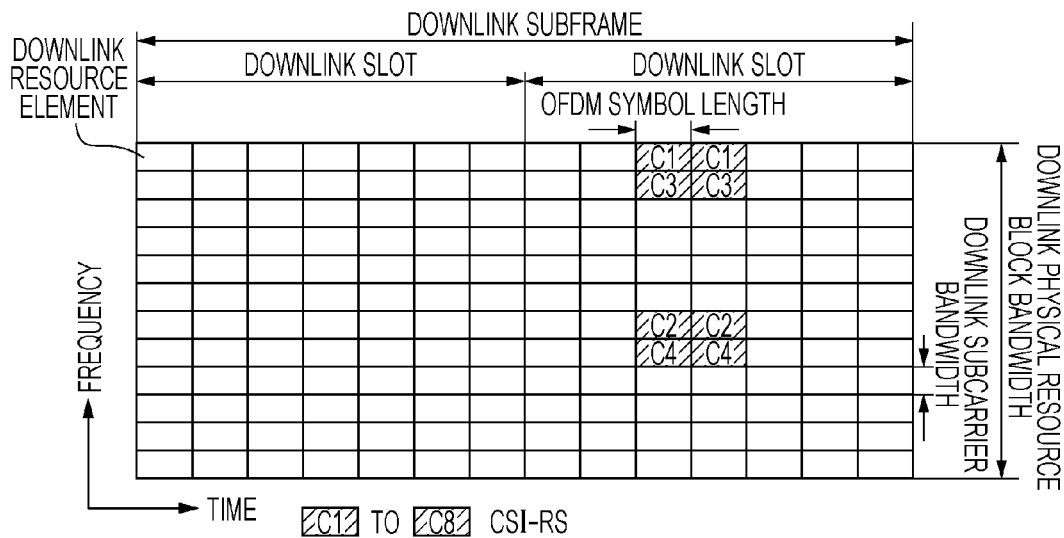
FIG. 13 is a diagram showing a DL PRB pair to which a Channel State Information-Reference Signals (CSI-RS) for eight antenna ports are mapped.

FIG. 13 is a diagram showing DL PRB pairs to which Channel State Information-Reference Signals (CSI-RS) for eight antenna ports are mapped. FIG. 13 shows a case where the CSI-RSs are mapped when the number (the number of CSI ports) of antenna ports used in the base station apparatus 3 and the RRH 4 is eight. In addition, in FIG. 13, the descriptions about the CRS, the UE-specific RS, the PDCCH, the PDSCH, and the like are omitted for simplicity of explanation.

The orthogonal codes (Walsh code) of two chips are used in each CDM groups, a CSI port (port of CSI-RS (antenna port, resource grid)) is allocated to each orthogonal code, and the CSI-RS is code division multiplexed for each two CSI port. Further, each CDM groups is frequency division multiplexed. By using four CDM groups, the CSI-RSs of eight antenna ports of the CSI ports 1 to 8 (antenna ports 15 to 22) are mapped. For example, in the CDM group C1 of the CSI-RS, the CSI-RSs of the CSI ports 1 and 2 (antenna ports 15 and 16) are code division multiplexed and mapped. In the CDM group C2 of the CSI-RS, the CSI-RSs of the CSI ports 3 and 4 (antenna ports 17 and 18) are code division multiplexed and mapped. In the CDM group C3 of the CSI-RS, the CSI-RSs of the CSI ports 5 and 6 (antenna ports 19 and 20) are code division multiplexed and mapped. In the CDM group C4 of the CSI-RS, the CSI-RSs of the CSI ports 7 and 8 (antenna ports 21 and 22) are code division multiplexed and mapped.

When the number of antenna ports of the CSI-RS of the base station apparatus 3 and the RRH 4 is eight, the base station apparatus 3 and the RRH 4 can configure the number of layers (the number of ranks and a spatial multiplexing number) applied to the PDSCH to eight at maximum. Further, the base station apparatus 3 and the RRH 4 can transmit the CSI-RS when the number of antenna ports of the CSI-RS is 1, 2 or 4. The base station apparatus 3 and the RRH 4 can transmit the CSI-RS for one antenna port or two antenna ports, by using the CDM group C1 of the CSI-RS illustrated in FIG. 13. The base station apparatus 3 and the RRH 4 can transmit the CSI-RS for four antenna ports, using the CDM groups C1 and C2 of the CSI-RS illustrated in FIG. 13.

Further, the base station apparatus 3 and the RRH 4 may allocate the CSI-RSs to different downlink resource elements, respectively, or may allocate the signal of CSI-RS to the same downlink resource element. For example, the base station apparatus 3 and the RRH 4 may allocate different downlink resource elements and/or different signal sequences to the CSI-RS, respectively. In the mobile station apparatus 5, the CSI-RS transmitted from the base station apparatus 3 and the CSI-RS transmitted from the RRH 4 are recognized as the CSI-RSs respectively corresponding to different antenna ports. The configuration (the number of antenna ports, resource location, and subframe to be transmitted) of the CSI-RS transmitted from the base station apparatus 3 and the configuration of CSI-RS transmitted from the RRH 4 are separately configured for the mobile station apparatus 5. Further, the configuration of CSI-RS transmitted from a plurality of RRHs 4 may be respectively and separately set for the mobile station apparatus 5.

The configuration of the CSI-RS (CSI-RS-Config-r10) is notified from the base station apparatus 3 and the RRH 4 to the mobile station apparatus 5. For example, the configuration of the CSI-RS includes at least information (antennaPortsCount-r10) indicating the number of antenna ports which are configured for the CSI-RS, information (subframeConfig-r10) indicating downlink subframes allocated for the CSI-RS, and information (ResourceConfig-r10) indicating the frequency domain for which the CSI-RS is allocated. The number of antenna ports of the CSI-RS may be, for example, any value of 1, 2, 4, and 8. As information indicating a frequency domain to which the CSI-RS is allocated, an index indicating a position of the first resource element among resource elements in which the CSI-RS corresponding to the antenna port 15 (CSI port 1) is used. If the position of the CSI-RS corresponding to the antenna port 15 is decided, the CSI-RSs corresponding to other antenna ports are uniquely decided based on the predetermined rule. As information indicating a downlink subframe in which the CSI-RS is allocated, the position and the period of the downlink subframe in which the CSI-RS is allocated are indicated by an index. For example, if the index of the subframeConfig-r10 is 5, the index indicates that the CSI-RS is allocated at every 10 subframes and the CSI-RS is allocated in the subframe 0 (the subframe number in the radio frame) among a radio frame with 10 subframes as a unit. Further, in a separate example, for example, if the index of the subframeConfig-r10 is 1, the index indicates that the CSI-RS is allocated at every five subframes and the CSI-RS is allocated in the subframes 1 and 6 among a radio frame with 10 subframes as a unit.

<Configuration of Uplink Time Frame>

Figure 14:
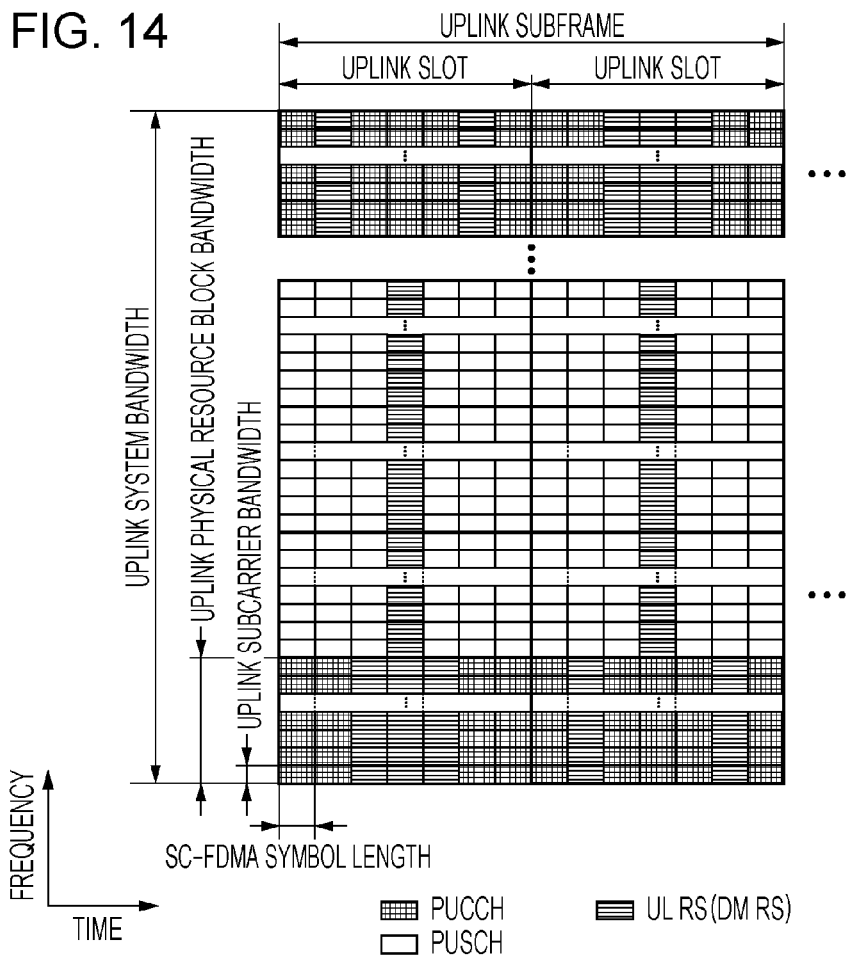
FIG. 14 is a diagram showing a schematic configuration of a time frame of an uplink from the mobile station apparatus 5 to the base station apparatus 3 and the RRH 4, according to the embodiment of the present invention.

FIG. 14 is a diagram showing a schematic configuration of the uplink time frame from the mobile station apparatus 5 to the base station apparatus 3 and the RRH 4, according to the embodiment of the present invention. In FIG. 13, the horizontal axis represents a time domain and the vertical axis represents a frequency domain. The uplink time frame is a unit of allocation of a resource and the like, and is configured with pairs (also referred to as an UpLink Physical Resource Block pair (UL PRB pair)) of Physical Resource Blocks (RB) (PRB) configured with the frequency band and the time band of a predetermined width of the uplink. One UL PRB pair is configured with two consecutive uplink PRBs in the time domain in the uplink (also referred to as an UpLink Physical Resource Block (UL PRB)).

Further, in FIG. 14, one UL PRB is configured with 12 subcarriers in the frequency domain in the uplink (also referred to as a uplink subcarrier) and seven Single-Carrier Frequency Division Multiple access (SC-1-DMA) symbols in the time domain. A system band of the uplink (referred to as an uplink system band) is uplink communication bands of the base station apparatus 3 and the RRH 4. For example, a system bandwidth of the uplink (referred to as an uplink system bandwidth) is configured with a frequency bandwidth of 20 MHz.

In addition, a plurality of UL PRB pairs are allocated in the uplink system band according to the uplink system bandwidth. For example, the uplink system band of a frequency bandwidth of 20 MHz is configured with 110 UL PRB pairs. Further, in the time domain illustrated in FIG. 14, there are a slot (referred to as an uplink slot) configured with seven SC-1-DMA symbols, and a subframe (referred to as an uplink subframe) configured with two uplink slots. In addition, a unit configured with one uplink subcarrier and one SC-FDMA symbol is referred to as a resource element (referred to as an uplink resource element).

At least the PUSCH used in transmission of information data, the PUCCH used in transmission of the uplink Control Information (UCI), and the UL RS(DM RS) for demodulation (channel change estimation) of the PUSCH and the PUCCH are allocated in each uplink subframe. Further, although not shown, the PRACH used for synchronization establishment of the uplink is allocated in any uplink subframe. Further, although not shown, the UL RS (SRS) used in measurement of channel quality and synchronization deviation, and the like is allocated in any uplink subframe. The PUCCH is used for transmitting a UCI (ACK/NACK) indicating Acknowledgement (ACK) or Negative Acknowledgement (NACK) for data received using the PDSCH, a UCI (SR: Scheduling Request) indicating at least whether a request for the uplink resource allocation is made or not, and a UCI (CQI: Channel Quality Indicator) indicating reception quality of the downlink (also referred to as channel quality).

In addition, when the mobile station apparatus 5 indicates to the base station apparatus 3 that it makes a request for uplink resource allocation, the mobile station apparatus 5 transmits signals on the PUCCH for transmission of the SR. The base station apparatus 3 recognizes that the mobile station apparatus 5 makes a request for the uplink resource allocation, from the result in which signals are detected on the PUCCH resource for transmission of the SR. When the mobile station apparatus 5 indicates to the base station apparatus 3 that it does not make a request for uplink resource allocation, the mobile station apparatus 5 does not transmit any signals on the pre-allocated PUCCH resource for transmission of the SR. The base station apparatus 3 recognizes that the mobile station apparatus 5 does not make a request for the uplink resource allocation, from the result in which signals are not detected on the PUCCH resource for transmission of the SR.

Further, different types of signal configurations are used for the PUCCH in a case where the UCI configured with ACK/NACK is transmitted, a case where the UCI configured with the SR is transmitted, and a case where the UCI configured with the CQI is transmitted. The PUCCH used in the transmission of the ACK/NACK is referred to as a PUCCH format 1a or a PUCCH format 1b. In the PUCCH format 1a, Binary Phase Shift Keying (BPSK) is used as a modulation scheme of modulation information regarding the ACK/NACK. In the PUCCH format 1a, one bit of information is represented from a modulation signal. In the PUCCH format 1b, Quadrature Phase Shift Keying (QPSK) is used as a modulation scheme of modulation information regarding the ACK/NACK. In the PUCCH format 1b, two bits of information are represented from a modulation signal. The PUCCH used in the transmission of the SR is referred to as a PUCCH format 1. The PUCCH used in the transmission of CQI is referred to as a PUCCH format 2. The PUCCH used in the simultaneous transmission of the CQI and the ACK/NACK is referred to as a PUCCH format 2a or a PUCCH format 2b. In the PUCCH format 2a and the PUCCH format 2b, a reference signal (DM RS) of an uplink pilot channel is multiplied by a modulation signal generated from the ACK/NACK information. In the PUCCH format 2a, one bit of information regarding the ACK/NACK and information of CQI are transmitted. In the PUCCH format 2b, two-bit information regarding the ACK/NACK and information of CQI are transmitted.

In addition, one PUSCH is configured with one or more UL PRB pairs, one PUCCH is in a symmetrical relationship with the frequency domain in the uplink system band, and configured with two UL PRBs located in different uplink slots, and one PRACH is configured with six UL PRB pairs. For example, in FIG. 14, one UL PRB pair used in the PUCCH is configured with the UL PRB having the lowest frequency in the first uplink slot and the UL PRB having the highest frequency in the second uplink slot within the uplink subframe. Further, if it is configured such that simultaneous transmission of the PUSCH and the PUCCH is not performed, when the PUCCH resource and the PUSCH resource are allocated in the same uplink subframe, the mobile station apparatus 5 transmits signals using only the PUSCH resource. Furthermore, if it is configured such that simultaneous transmission of the PUSCH and the PUCCH is performed, when the PUCCH resource and the PUSCH resource are allocated in the same uplink subframe, the mobile station apparatus 5 may transmit signals by using both the PUCCH resource and the PUSCH resource, basically.

The UL RS is a signal used in the uplink pilot channel. The UL RS is configured with a DeModulation Reference Signal (DM RS) used in the estimation of the channel of the PUSCH and the PUCCH and a Sounding Reference Signal (SRS) used in the measurement of the channel quality for frequency scheduling and the adaptive modulation of the PUSCH of the base station apparatus 3 and the RRH 4 and the measurement of the synchronization deviation between the base station apparatus 3, the RRH 4 and the mobile station apparatus 5. In addition, for simplicity of explanation, the SRS is not illustrated in FIG. 14. When the DM RS is allocated in the same UL PRB as in the PUSCH and is allocated in the same UL PRB as in the PUCCH, the DM RS is allocated in different SC-FDMA symbols. The DM RS is a known signal in the communication system 1 which is used in the estimation of the channel change of the PUSCH and the PUCCH.

When the DM RS is allocated in the same UL PRB as in the PUSCH, it is allocated in the fourth SC-FDMA symbol within the uplink slot. When the DM RS is allocated within the same UL PRB as the PUCCH including ACK/NACK, it is allocated in the third, fourth and fifth SC-FDMA symbols within the uplink slot. When the DM RS is allocated in the same UL PRB as the PUCCH including the SR, it is allocated in the third, fourth and fifth SC-FDMA symbols within the uplink slot. When the DM RS is allocated within the same UL PRB as the PUCCH including the CQI, it is allocated in the second and sixth SC-FDMA symbols within the uplink slot.

The SRS is allocated within the UL PRB decided by the base station apparatus 3, and allocated in the 14th SC-FDMA symbol within the uplink subframe (the seventh SC-FDMA symbol of the second uplink slot in the uplink subframe). The SRS may be allocated only in the uplink subframe of a period decided by the base station apparatus 3 (also referred to as a Search Reference Signal subframe; SRS subframe)) in the cell. The base station apparatus 3 allocates a period of transmitting a SRS for every mobile station apparatus 5 and UL PRB allocated to the SRS in the SRS subframe.

Although FIG. 14 shows a case where the PUCCHs are allocated in the UL PRB nearest the edge in the frequency domain of the uplink system band, the second and third UL PRBs from the edge of the uplink system band may be used for the PUCCH.

In addition, a code multiplexing in the frequency domain and a code multiplexing in the time domain are used in the PUCCH. The code multiplexing in the frequency domain is processed by multiplying a modulation signal obtained through modulation of the uplink control information and each code of a code sequence in a unit of a subcarrier. The code multiplexing in the time domain is processed by multiplying a modulation signal obtained through modulation of the uplink control information and each code of a code sequence in a unit of a SC-FDMA symbol. A plurality of PUCCHs are allocated in the same UL PRB, different codes are allocated to respective PUCCHs, and the code multiplexing in the frequency domain or the time domain is realized by the allocated codes. The code multiplexing in the frequency domain and the time domain is used in the PUCCH (referred to as a PUCCH format 1a or a PUCCH format 1b) used for transmitting an ACK/NACK. The code multiplexing in the frequency domain and the time domain is used in the PUCCH (referred to as the PUCCH format 1) used for transmitting the SR. The code multiplexing in the frequency domain is used in the PUCCH (referred to as a PUCCH format 2, a PUCCH format 2a or a PUCCH format 2b) used for transmitting the CQI.

FIG. 15 is a diagram illustrating the configuration and the number of ACK/NACK PUCCH resource in the communication system according to the embodiment of the present invention. Here, FIG. 15 illustrates an example of the PUCCH resource for which the PUCCH format 1a or the PUCCH format 1b is used.

FIG. 15 illustrates the case in which the 24 PUCCH resources for ACK/NACK are configured in each uplink subframe. Further, FIG. 15 illustrates the case in which two UL PRB pairs (a UL PRB pair 5 and a UL PRB pair 6), four code sequences in the frequency domain (codes in the frequency domain) (a code 1 in the frequency domain, a code 2 in the frequency domain, a code 3 in the frequency domain, and a code 4 in the frequency domain), three code sequences in the time domain (codes in the time domain) (a code 1 in the time domain, a code 2 in the time domain, and a code 3 in the time domain) are used in the ACK/NACK PUCCH resource. The UL PRB pairs, the code sequences in the frequency domain, and the code sequences in the time domain of the number different from the number illustrated in FIG. 15 may be used, and the PUCCH resource of the number different from the number illustrated in FIG. 15 may be configured. Respective PUCCH resources illustrated in FIG. 15 are configured with different combinations of the UL PRB pair, the code sequence in the frequency domain, and the code sequence in the time domain, and are orthogonal in the frequency domain, the code region in the frequency domain, or the code region in the time domain. Different numbering (PUCCH resource index) is performed on the PUCCH resources configured with different combinations of the UL PRB pair, the code sequence in the frequency domain, and the code sequence in the time domain.

Note that in FIG. 15, frequency hopping between slots applied to the PUCCH is not described for simplification of explanation. For example, FIG. 15 illustrates a configuration of resource of a first uplink slot of the uplink subframe, and UL PRB resource which is an object in the frequency domain in the uplink system band is configured in a second uplink slot of the uplink subframe. For example, in the uplink system band configured with 110 UL PRB pairs, the PUCCH 1 is configured with the UL PRB of a UL PRB pair 105, the code 1 in the frequency domain, and the code 1 in the time domain in the second uplink slot of the uplink subframe. Further, sequence hopping may be applied to the code sequence in the frequency domain configured with the first uplink slot of the uplink subframe and the code sequence in the frequency domain configured with the second uplink slot of the uplink subframe. Further, sequence hopping may be applied to the code sequence in the time domain configured with the first uplink slot of the uplink subframe and the code sequence in the time domain configured with the second uplink slot of the uplink subframe.

In the time domain, the PUSCH resource is allocated in the uplink subframe after a predetermined number (for example, four) from the downlink subframe in which the PDCCH resource including the uplink grant used in the allocation of the PUSCH resource is allocated.

The PDSCH resource is mapped in the same downlink subframe as the downlink subframe in which the PDCCH resource including a downlink assignment used in the allocation of the PDSCH resource is mapped, in the time domain.

<Configuration of First PDCCH>

The first PDCCH is configured with a plurality of Control Channel Elements (CCE). The number of CCEs used in each downlink system band depends on the downlink system bandwidth, the number of OFDM symbols configuring the first PDCCH, and the number of the downlink reference signals of the downlink pilot channel (CRS) according to the number of the transmit antennas of the base station apparatus 3 (or the RRH 4) used in the communication. As described below, the CCE is configured with a plurality of the downlink resource elements.

Figure 16:
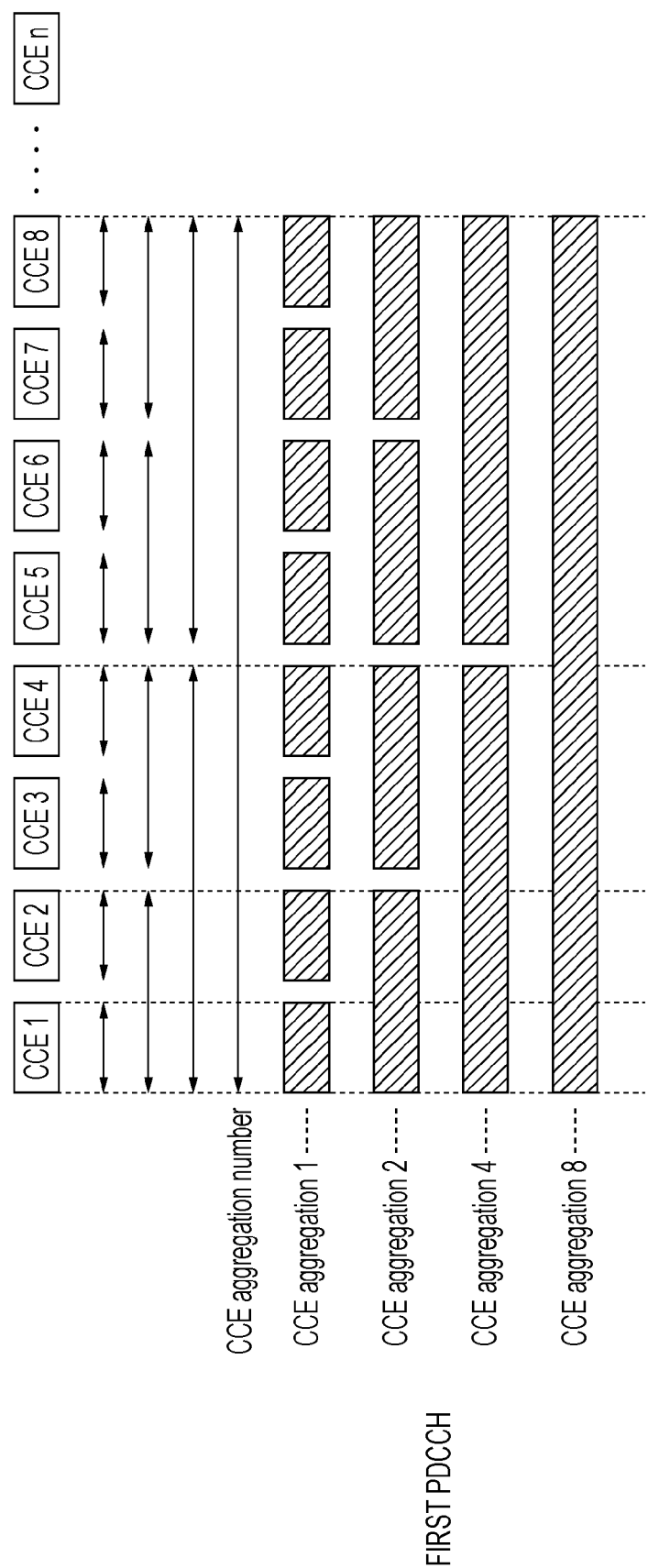
FIG. 16 is a diagram illustrating a logical relationship between a first PDCCH and a CCE of the communication system 1 according to the embodiment of the present invention.

FIG. 16 is a diagram illustrating a logical relationship between the first PDCCH and the CCE of the communication system 1 according to the embodiment of the present invention. The numbers for identifying CCEs are given to the CCEs used between the base station apparatus 3 (or the RRH 4) and the mobile station apparatus 5. The CCE numbering is performed on the basis of a predetermined rule. Here, CCE t indicates the CCE of the CCE number t. The first PDCCH is configured with an aggregation formed of a plurality of CCEs (CCE Aggregation). Hereinafter, the number of CCEs configuring an aggregation is referred to as "CCE aggregation number" (CCE aggregation level). The CCE aggregation number configuring the first PDCCH is configured according to a coding rate which is configured in the first PDCCH and the number of bits of the DCI included in the first PDCCH by the base station apparatus 3. Further, hereinafter, the aggregation configured with n CCEs is referred to as "CCE aggregation n".

For example, the base station apparatus 3 configures the first PDCCH with one CCE (CCE aggregation1), configures the first PDCCH with two CCEs (CCE aggregation2), configures the first PDCCH with four CCEs (CCE aggregation4), and configures the first PDCCH with eight CCEs (CCE aggregation8). For example, the base station apparatus 3 uses the CCE aggregation number having a small number of CCEs for use in configuring the first PDCCH for the mobile station apparatus 3 having a good channel quality, and uses the CCE aggregation number having a great number of CCEs for use in configuring the first PDCCH for the mobile station apparatus 3 having a bad channel quality. Further, for example, when the base station apparatus 3 transmits DCI having a small number of bits, the base station apparatus 3 uses the CCE aggregation number having a small number of CCEs for use in configuring the first PDCCH, and when the base station apparatus 3 transmits DCI having a great number of bits, the base station apparatus 3 uses the CCE aggregation number having a great number of CCEs for use in configuring the first PDCCH.

In FIG. 16, those represented by the diagonal lines mean first PDCCH candidates. The first PDCCH candidates are to be subjected to a decoding detection of the first PDCCH by the mobile station apparatus 5, and the first PDCCH candidates are configured independently for each CCE aggregation number. The first PDCCH candidates configured for each CCE aggregation number are respectively configured with different one or more CCEs. The number of the first PDCCH candidates is configured independently for each CCE aggregation number. The first PDCCH candidates configured for each CCE aggregation number are configured with consecutive numbers of CCEs. The mobile station apparatus 5 performs a decoding detection of the first PDCCH on the first PDCCH candidates of the number which is configured for each CCE aggregation number. In addition, when the mobile station apparatus 5 determines that the first PDCCH addressed to the mobile station apparatus 5 is detected, the mobile station apparatus 5 may not perform (may stop) the decoding detection of the first PDCCH for some first PDCCH candidates which are configured.

Figure 17:
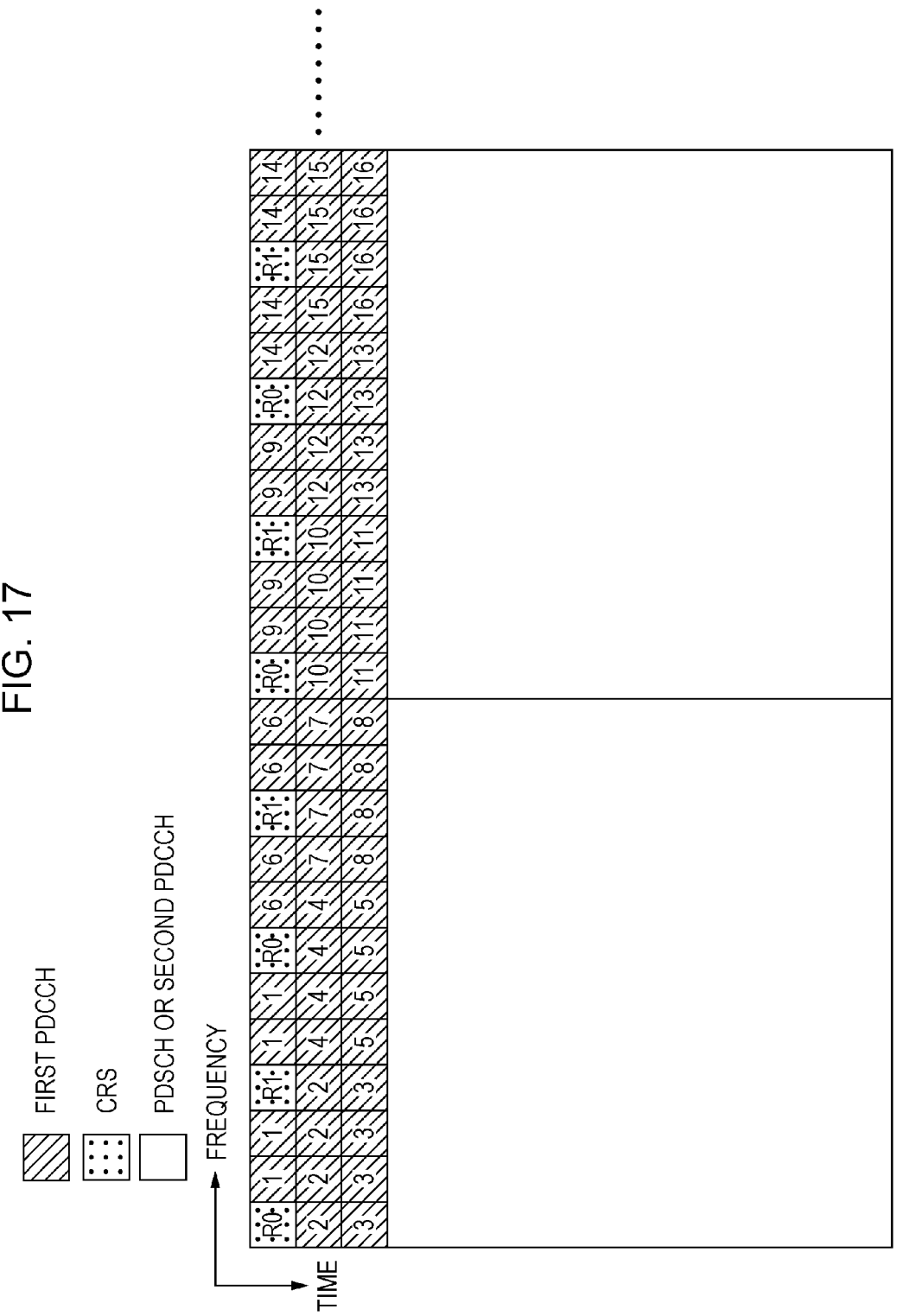
FIG. 17 is a diagram showing an example of mapping of a resource element group in a downlink subframe of the communication system 1 according to the embodiment of the present invention.

A plurality of downlink resource elements configuring the CCE are configured with a plurality of resource element groups (also referred to as a REG, mini-CCE). The resource element group is configured with a plurality of the downlink resource elements. For example, one resource element group is configured with four downlink resource elements. FIG. 17 is a diagram showing an example of mapping of a resource element group in a downlink subframe of the communication system 1 according to the embodiment of the present invention. Here, the resource element group used in the first PDCCH is shown, and the portions that are not related (PDSCH, second PDCCH, UE-specific RS, and CSI-RS) are neither shown nor described. Here, a case where the first PDCCH is configured with the first to third OFDM symbols and the downlink reference signals (R0 and R1) corresponding to the CRS of two transmit antennas (antenna port 0 and antenna port 1) are shown. In FIG. 17, the vertical axis represents a frequency domain and the horizontal axis represents a time domain.

In the mapping example of FIG. 17, one resource element group is configured with four adjacent downlink resource elements in the frequency domain. FIG. 17 shows that the downlink resource elements having the same code of the first PDCCH attached therein belong to the same resource element group. In addition, the resource element group is configured while the resource elements R0 (downlink reference signal of the antenna port 0) and R1 (downlink reference signal of the antenna port 1) in which the downlink reference signals are allocated are skipped. FIG. 17 shows that numbering (code "1") is performed from a resource element group of the first OFDM symbols having the lowest frequency, numbering (code "2") is subsequently performed for a resource element group of the second OFDM symbols having the lowest frequency, and numbering (code "3") is subsequently performed for a resource element group of the third OFDM symbols having the lowest frequency. FIG. 17 shows that numbering (code "4") is subsequently performed for a resource element group of the second OFDM symbols, in which the downlink reference signals are not allocated, adjacent to the frequency of the resource element group subjected to the numbering (code "2"), and numbering (code "5") is subsequently performed for a resource element group of the third OFDM symbols, in which the downlink reference signals are not allocated, adjacent to the frequency of the resource element group subjected to the numbering (code "3"). FIG. 17 shows that numbering (code "6") is subsequently performed for a resource element group of the first OFDM symbols adjacent to the frequency of the resource element group subjected to the numbering (code "1"), numbering (code "7") is subsequently performed for a resource element group of the second OFDM symbols adjacent to the frequency of the resource element group subjected to the numbering (code "4"), and numbering (code "8") is subsequently performed for a resource element group of the third OFDM symbols adjacent to the frequency of the resource element group subjected to the numbering (code "5"). The same numbering is performed for the following resource element groups.

The CCE is configured with a plurality of resource element groups illustrated in FIG. 17. For example, one CCE is configured with nine different resource element groups which are Distributed in the frequency domain and the time domain. Specifically, in the CCEs used in the first PDCCH, all resource element groups subjected to the numbering as illustrated in FIG. 17 are subjected to interleaving in units of resource element groups using a block interleaver for all downlink system bands, and one CCE is configured with nine resource element groups of consecutive numbers after being interleaved.

<Configuration of Second PDCCH>

A region in which a second PDCCH may be mapped (for simplicity of explanation, hereinafter, referred to as a second PDCCH region) (ePDCCH region) is configured (set) for the mobile station apparatus 5. The unit of mapping of resource configuring one second PDCCH is a set of DL PRB pairs of a predetermined number, and is one second PDCCH region. One or more second PDCCH regions may be configured for the mobile station apparatus 5. For example, in a plurality of mobile station apparatuses 5 in which a plurality of second PDCCH regions are configured, some second PDCCH regions can be configured with a plurality of common DL PRB pairs, and another part of the second PDCCH regions can be configured with a plurality of different DL PRB pairs. The mobile station apparatus 5 performs a decoding process for detecting the second PDCCH, in each of the plurality of configured second PDCCH regions. In addition, the second PDCCH region may be referred to as an enhanced Physical Downlink Control Channel Set (ePDCCH set).

Figure 18:
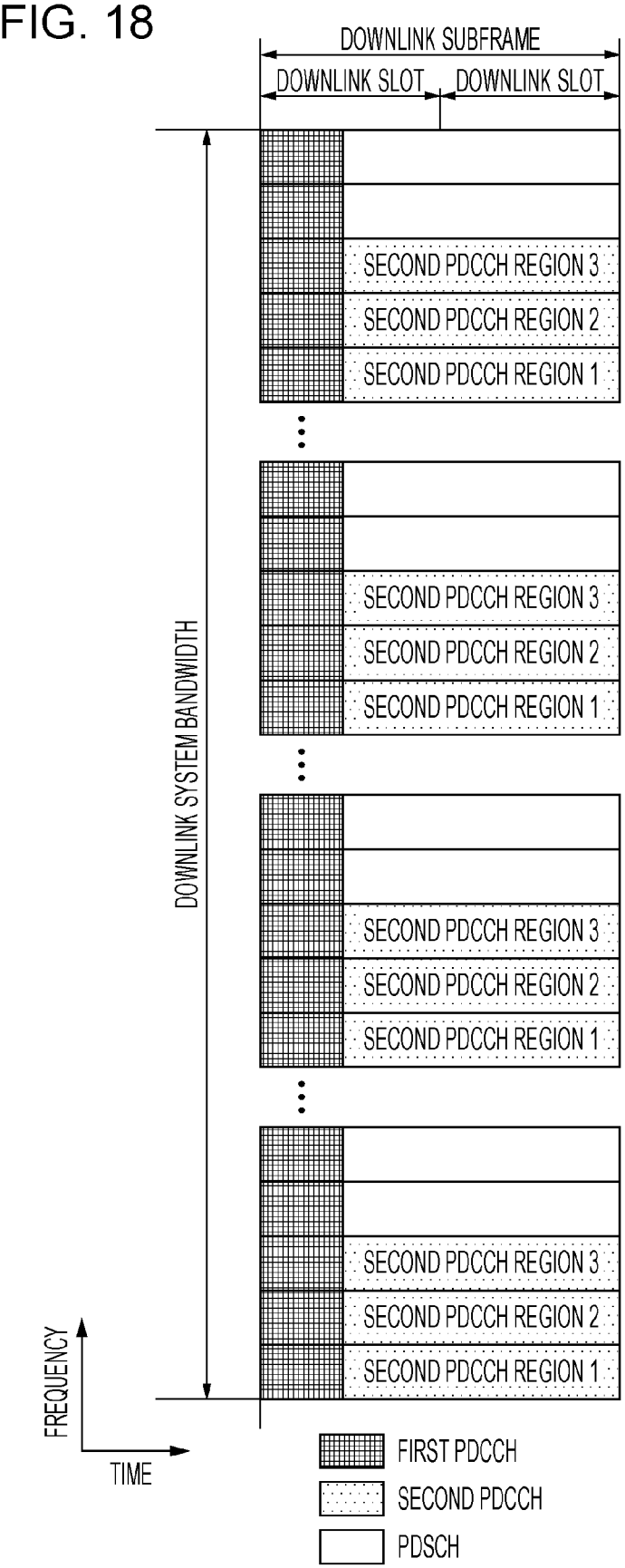
FIG. 18 is a diagram showing an example of a schematic configuration of the second PDCCH in the communication system 1 according to the embodiment of the present invention.

FIG. 18 is a diagram illustrating an example of a schematic configuration of the second PDCCH region in the communication system 1 according to an embodiment of the present invention. The base station apparatus 3 can configure (set, arrange) a plurality of second PDCCH regions (a second PDCCH region 1, a second PDCCH region 2, and a second PDCCH region 3) in a downlink system band. One second PDCCH region is configured with a plurality of DL PRB pairs. For example, one second PDCCH region is configured with four DL PRB pairs. For example, a plurality of DL PRB pairs configuring one second PDCCH region may be configured with the DL PRB pairs which are distributed in the frequency domain as illustrated in FIG. 18, and may be configured with the DL PRB pairs which are consecutive in the frequency domain. For example, the base station apparatus 3 can configure the second PDCCH region for each of a plurality of mobile station apparatuses 5. In FIG. 18, the second PDCCH region 1, the second PDCCH region 2, and the second PDCCH region 3 are respectively configured with different DL PRB pairs.

With respect to each of the second PDCCH regions which are configured in the mobile station apparatus 5, different transmission methods may be set in signals to be mapped. For example, a beamforming process suitable for the mobile station apparatus 5 is applied to a certain second PDCCH region which is configured in the mobile station apparatus 5. For example, a random beamforming process is applied to a certain second PDCCH region which is configured in the mobile station apparatus 5. Here, the beamforming process suitable for the mobile station apparatus 5 means that an optimal pre-coding process is performed based on the channel state information (Precoding Matrix Indicator: PMI) notified from the mobile station apparatus 5 to the base station apparatus 3. Here, the random beamforming process means that a randomly selected pre-coding process (a process in which a pre-coding matrix is randomly selected and multiplied in a signal) is performed on the resource of each DL PRB pair configuring one second PDCCH. For example, the beamforming process that is suitable for the mobile station apparatus 5 is applied to a mobile station apparatus 5 which slowly moves and of which the channel state information is fed back to the base station apparatus 3 as appropriate. For example, the random beamforming process is applied to a mobile station apparatus 5 which moves fast and of which the channel state information is not fed back to the base station apparatus 3 as appropriate. In the second PDCCH in which the beamforming process that is suitable for the mobile station apparatus 5 is performed, the same pre-coding process is performed on all signals transmitted in the second PDCCH. In the second PDCCH in which the random beamforming process is performed, the same pre-coding process is not performed on all signals transmitted in the second PDCCH and a different pre-coding process is performed on the different signals. For example, in the second PDCCH in which the random beamforming process is performed, a different pre-coding process is performed on the signals mapped in the different DL PRB pairs. Preferably, in the second PDCCH in which the random beamforming process is performed, pre-coding matrixes that are orthogonal with each other are used for signals mapped in the different DL PRB pairs.

In the DL PRB pair, the same pre-coding process is applied to the second PDCCH signal and the UE-specific RS which are transmitted to the same mobile station apparatus 5. In the DL PRB pair in which signals of the second PDCCH to be subjected to the beamforming process suitable for the mobile station apparatus are mapped, different pre-coding processes may be performed for different second PDCCH signals for different mobile station apparatuses 5. In DL PRB pair in which signals of the second PDCCH to be subjected to the random beamforming process are mapped, the same pre-coding process may be performed for different second PDCCH signals for different mobile station apparatuses 5.

Figure 19:
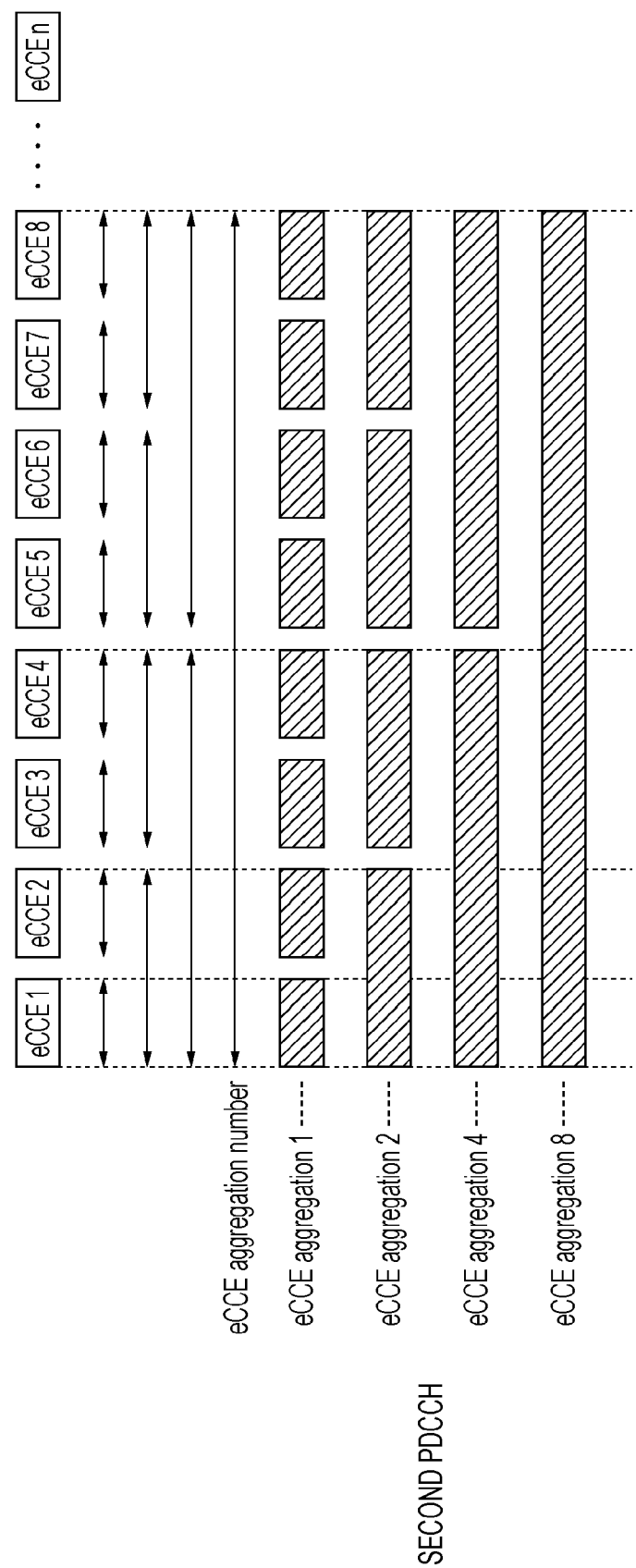
FIG. 19 is a diagram illustrating a logical relationship between the second PDCCH and an E-CCE of the communication system 1 according to the embodiment of the present invention.

One second PDCCH is configured with one or more eCCEs (second element). FIG. 19 is a diagram illustrating a logical relationship between the second PDCCH and the eCCE of the communication system 1 according to the embodiment of the present invention. The numbers for identifying E-CCEs are given to the eCCEs used between the base station apparatus 3 (or the RRH 4) and the mobile station apparatus 5. The eCCE numbering is performed based on predetermined rules. Here, eCCE t indicates the eCCE of the eCCE number t. The second PDCCH is configured with an aggregation configured with a plurality of eCCEs (eCCE aggregation). Hereinafter, the number of eCCEs configuring the aggregation is referred to as "eCCE aggregation number" (eCCE aggregation level). For example, the eCCE aggregation number configuring the second PDCCH is configured according to a coding rate which is configured in the second PDCCH and the number of bits of the DCI included in the second PDCCH in the base station apparatus 3. Further, hereinafter, the aggregation configured with n eCCEs is referred to as "eCCE aggregation n".

For example, the base station apparatus 3 configures the second PDCCH with one eCCE (eCCE aggregation1), configures the second PDCCH with two eCCEs (eCCE aggregation2), configures the second PDCCH with four eCCEs (eCCE aggregation4), and configures the second PDCCH with eight eCCEs (eCCE aggregation8). For example, the base station apparatus 3 uses the eCCE aggregation number having a small number of eCCEs for use in configuring the second PDCCH for the mobile station apparatus 3 having a good channel quality, and uses the eCCE aggregation number having a great number of eCCEs for use in configuring the second PDCCH for the mobile station apparatus 3 having a bad channel quality. Further, for example, when the base station apparatus 3 transmits a DCI having a small number of bits, the base station apparatus 3 uses the eCCE aggregation number having a small number of eCCEs for use in configuring the second PDCCH, and when the base station apparatus 3 transmits a DCI having a large number of bits, the base station apparatus 3 uses the eCCE aggregation number having a great number of eCCEs for use in configuring the second PDCCH.

In FIG. 19, those represented by the diagonal lines mean second PDCCH candidates. The second ePDCCH candidates are to be subjected to the decoding detection of the second PDCCH by the mobile station apparatus 5, and the second PDCCH candidates are configured independently for each eCCE aggregation number. The second PDCCH candidates configured for each eCCE aggregation number are respectively configured with different one or more VRBs. The number of the second PDCCH candidates is configured independently for each eCCE aggregation number. The second PDCCH candidates configured for each eCCE aggregation number are configured with consecutive numbers of eCCEs. The mobile station apparatus 5 performs a decoding detection of the second PDCCH on the second PDCCH candidates of the number which is configured for each VRB aggregation number. In addition, when the mobile station apparatus 5 determines that it detects the second PDCCH addressed to the mobile station apparatus 5, the decoding detection of the second PDCCH may not be performed (may be stopped) for some second PDCCH candidates which are configured.

The number of eCCEs configured in one second PDCCH region depends on the number of DL PRB pairs configuring the second PDCCH region. For example, the amount of resources corresponding to one eCCE (the number of resource elements) is substantially equal to the amount of resources obtained by removing resources that cannot be used for the signals of the second PDCCH (resource elements used in the downlink reference signal and the first PDCCH), from four resources into which the resource of one DL PRB pair is divided. For example, 16 eCCEs are configured in the second PDCCH region configured with four DL PRB pairs. Further, in the embodiment of the present invention, for simplicity of explanation, a description has been mainly made of the case in which one second PDCCH region is configured with four DL PRB pairs and 16 eCCEs are configured in one second PDCCH region, but the present invention is not limited to such a case. For example, one second PDCCH region may be configured with DL PRB pairs of the number other than four. For example, the amount of resources corresponding to one eCCE (the number of resource elements) may be the amount different from the amount of resources obtained by removing resources that cannot be used for the signals of the second PDCCH (resource elements used in the downlink reference signal and the first PDCCH), from four resources into which the resource of one DL PRB pair is divided, and may be substantially equal to the amount of resources obtained by removing resources that cannot be used for the signals of the second PDCCH (resource elements used in the downlink reference signal and the first PDCCH), from two resources into which the resource of one DL PRB pair is divided.

Two types of methods are used as a mapping method of resources configuring the second PDCCH. For convenience of explanation, the methods are referred to as a Localized mapping (a first mapping method) and a Distributed mapping (a second mapping method). The transmission of the second PDCCH using the resources configured by the Localized mapping is referred to as Localized transmission. The transmission of the second PDCCH using the resources configured by the Distributed mapping is referred to as Distributed transmission. For example, a beamforming process suitable for the mobile station apparatus 5 is applied to the Localized transmission. For example, the random beamforming process described above is applied to the Distributed transmission. The Localized mapping is a method in which one eCCE is mapped to resources in one DL PRB pair. The Distributed mapping is a method in which one eCCE is mapped to resources in a plurality of DL PRB pairs. For example, in the Distributed mapping, one eCCE is mapped to some resources in each of four DL PRB pairs of the second PDCCH region. In other words, in the Localized mapping, one eCCE is configured with physical resources in one DL PRB pair. In the Distributed mapping, one eCCE is configured with some resources in each of the plurality of DL PRB pairs.

Figure 20:
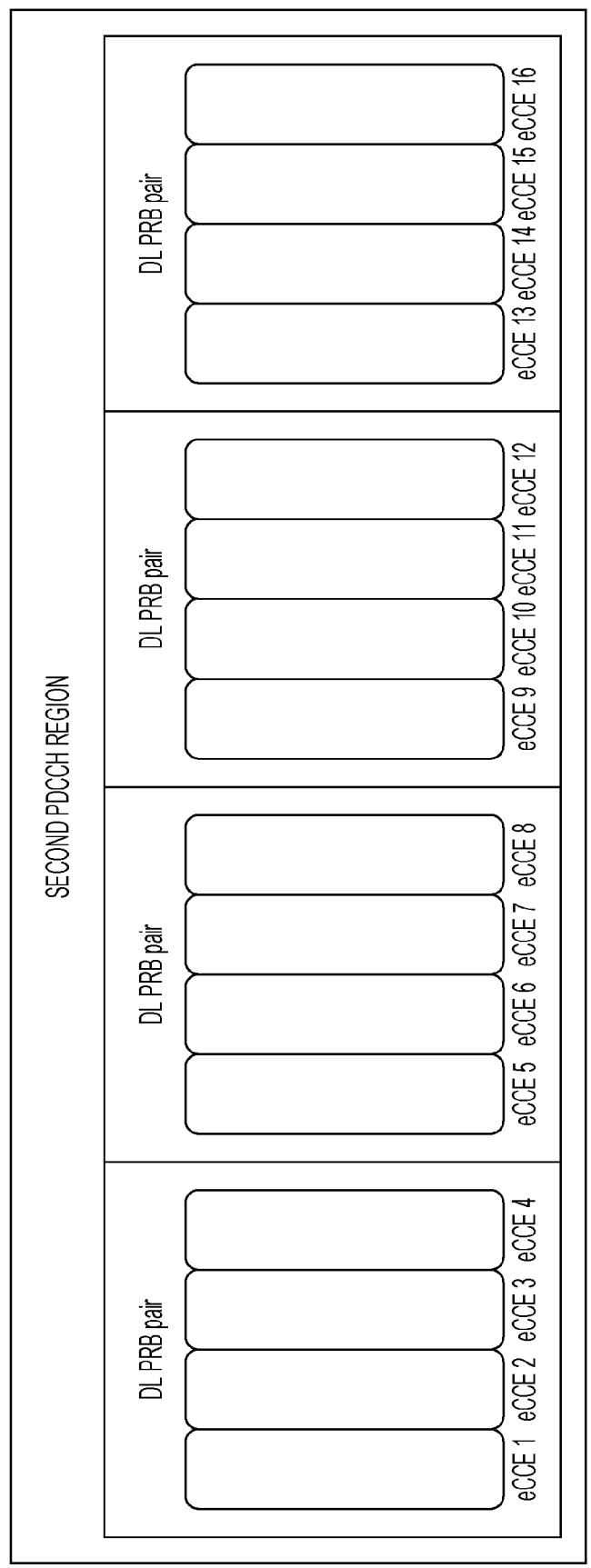
FIG. 20 is a diagram illustrating an example of Localized mapping of the embodiment of the present invention.

FIG. 20 is a diagram illustrating an example of the Localized mapping of the embodiment of the present invention. Here, the case is illustrated in which one second PDCCH region is configured with four DL PRB pairs, four eCCEs are configured in one DL PRB pair, and 16 eCCEs (eCCE1, eCCE2, eCCE3, eCCE4, eCCE5, eCCE6, eCCE7, eCCE8, eCCE9, eCCE10, eCCE11, eCCE12, eCCE13, eCCE14, eCCE15, and eCCE16) are configured in one second PDCCH region. For example, in FIG. 20, each DL PRB pair corresponds to each DL PRB pair configuring the second PDCCH region in FIG. 18. In FIG. 20, one mass (a mass configured with four eCCEs of consecutive numbers) (a mass configured with eCCE1, eCCE2, eCCE3, and eCCE4, a mass configured with eCCE5, eCCE6, eCCE7, and eCCE8, a mass configured with eCCE9, eCCE10, eCCE11, and eCCE12, and a mass configured with eCCE13, eCCE14, eCCE15, and eCCE16) means resources of one DL PRB pair. Further, in FIG. 20, physically, the horizontal axis does not mean a frequency domain and the vertical axis does not mean a time domain. FIG. 20 conceptually represents that one DL PRB pair is divided into four resources and one eCCE is configured with the divided resources. Further, FIG. 20 does not mean that all resources in the DL PRB pair are configured with eCCEs, and for example, the resource in which the UE-specific RS is allocated may be excluded in advance from the resources configuring the eCCE. A physical resource configuring one eCCE which has been configured by employing the Localized mapping will be described later.

Figure 21:
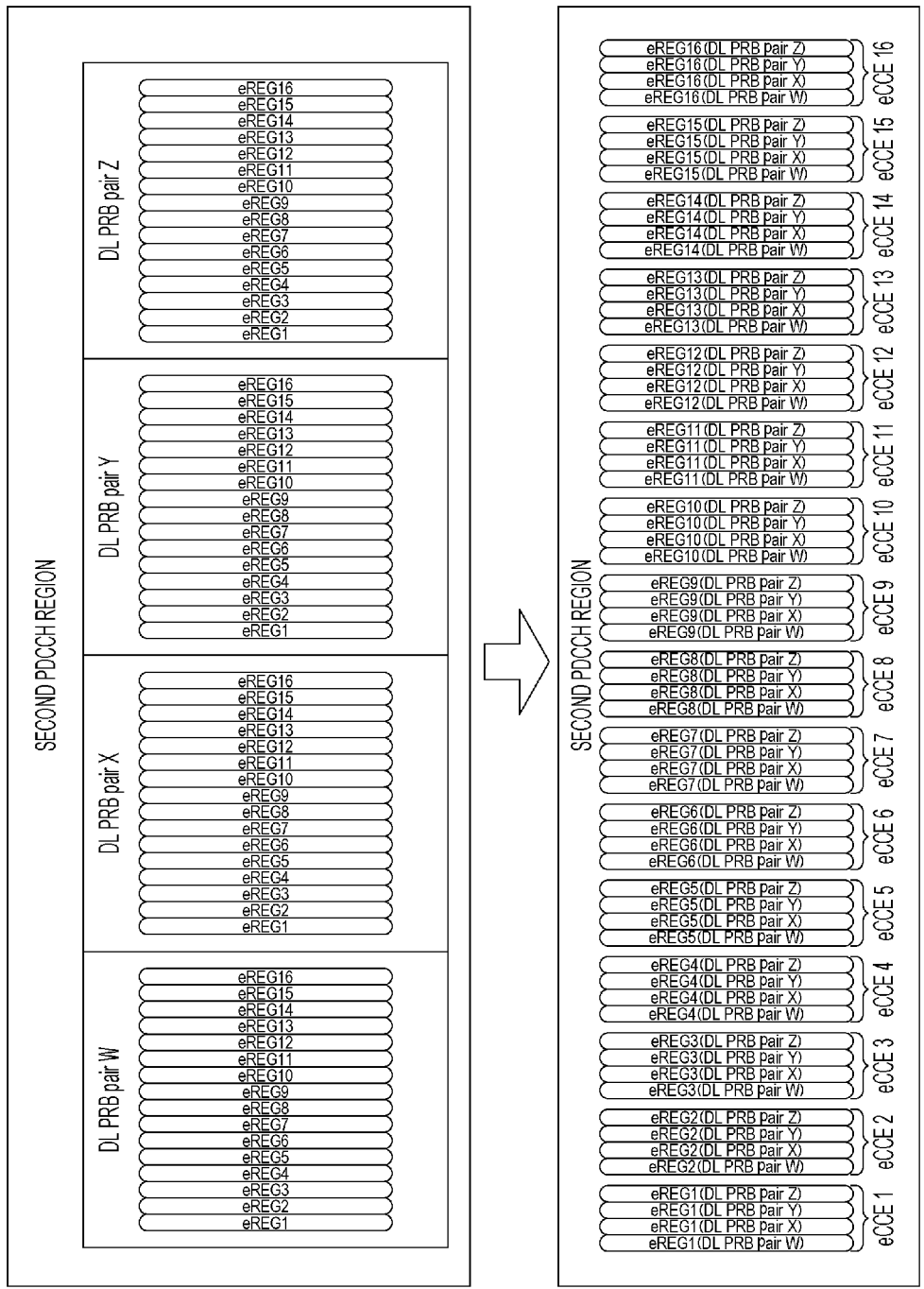
FIG. 21 is a diagram illustrating an example of Distributed mapping of the embodiment of the present invention.

FIG. 21 is a diagram illustrating an example of the Distributed mapping of the embodiment of the present invention. Here, the case is illustrated in which one second PDCCH region is configured with four DL PRB pairs (a DL PRB pair W, a DL PRB pair X, a DL PRB pair Y, and a DL PRB pair Z), 16 eREGs (enhanced Resource Element Group) (eREG1, eREG2, eREG3, eREG4, eREG5, eREG6, eREG7, eREG8, eREG9, eREG10, eREG11, eREG12, eREG13, eREG14, eREG15, and eREG16) are configured in one DL PRB pair, and 16 eCCEs (eCCE1, eCCE2, eCCE3, eCCE4, eCCE5, eCCE6, eCCE7, eCCE8, eCCE9, eCCE10, eCCE11, eCCE12, eCCE13, eCCE14, eCCE15, and eCCE16) are configured in one second PDCCH region. Here, eREG (first element) is an element having a smaller amount of resources that that of the eCCE, and one eCCE is configured with a plurality of eREGs. For example, one eCCE is configured with four eREGs. For example, in FIG. 21, each DL PRB pair corresponds to each DL PRB pair configuring the second PDCCH region illustrated in FIG. 18. Each eCCE is configured by arranging a plurality of eREGs of a different DL PRB pair. For example, the eCCE is four eREGs of four DL PRB pairs, and is configured with resources obtained by collecting one eREG from each DL PRB pair.

In FIG. 21, eCCE1 is configured with eREG1 of a DL PRB pair W, eREG1 of a DL PRB pair X, eREG1 of a DL PRB pair Y, and eREG1 of a DL PRB pair Z, eCCE2 is configured with eREG2 of a DL PRB pair W, eREG2 of a DL PRB pair X, eREG2 of a DL PRB pair Y, and eREG2 of a DL PRB pair Z, eCCE3 is configured with eREG3 of a DL PRB pair W, eREG3 of a DL PRB pair X, eREG3 of a DL PRB pair Y, and eREG3 of a DL PRB pair Z, and the eCCE4 is configured with eREG4 of a DL PRB pair W, eREG4 of a DL PRB pair X, eREG4 of a DL PRB pair Y, and eREG4 of a DL PRB pair Z, eCCE5 is configured with eREG5 of a DL PRB pair W, eREG5 of a DL PRB pair X, eREG5 of a DL PRB pair Y, and eREG5 of a DL PRB pair Z, eCCE6 is configured with eREG6 of a DL PRB pair W, eREG6 of a DL PRB pair X, eREG6 of a DL PRB pair Y, and eREG6 of a DL PRB pair Z, eCCE7 is configured with eREG7 of a DL PRB pair W, eREG7 of a DL PRB pair X, eREG7 of a DL PRB pair Y, and eREG7 of a DL PRB pair Z, eCCE8 is configured with eREG8 of a DL PRB pair W, eREG8 of a DL PRB pair X, eREG8 of a DL PRB pair Y, and eREG8 of a DL PRB pair Z, eCCE9 is configured with eREG9 of a DL PRB pair W, eREG9 of a DL PRB pair X, eREG9 of a DL PRB pair Y, and eREG9 of a DL PRB pair Z, eCCE10 is configured with eREG10 of a DL PRB pair W, eREG10 of a DL PRB pair X, eREG10 of a DL PRB pair Y, and eREG10 of a DL PRB pair Z, eCCE11 is configured with eREG11 of a DL PRB pair W, eREG11 of a DL PRB pair X, eREG11 of a DL PRB pair Y, and eREG11 of a DL PRB pair Z, eCCE12 is configured with eREG12 of a DL PRB pair W, eREG12 of a DL PRB pair X, eREG12 of a DL PRB pair Y, and eREG12 of a DL PRB pair Z, eCCE13 is configured with eREG13 of a DL PRB pair W, eREG3 of a DL PRB pair X, eREG13 of a DL PRB pair Y, and eREG13 of a DL PRB pair Z, eCCE14 is configured with eREG14 of a DL PRB pair W, eREG14 of a DL PRB pair X, eREG14 of a DL PRB pair Y, and eREG14 of a DL PRB pair Z, eCCE15 is configured with eREG15 of a DL PRB pair W, eREG15 of a DL PRB pair X, eREG15 of a DL PRB pair Y, and eREG15 of a DL PRB pair Z, and the eCCE16 is configured with eREG16 of a DL PRB pair W, eREG16 of a DL PRB pair X, eREG16 of a DL PRB pair Y, and eREG16 of a DL PRB pair Z.

Further, in FIG. 21, physically, the horizontal axis does not mean a frequency domain and the vertical axis does not mean a time domain, but conceptually represents that one DL PRB pair is divided into 16 resources and one eCCE is configured with four divided resources of four different DL PRB pairs. Further, FIG. 21 does not mean that all resources in the DL PRB pair are configured with eREGs, and for example, the resource in which the UE-specific RS is allocated may be excluded in advance from the resources configuring the eREG. The physical resources configuring one eREG which has been configured by employing the Distributed mapping will be described later.

Further, the eCCE which has been configured by employing the Localized mapping may be configured by using the eREG illustrated in FIG. 21. The eCCE which has been configured by employing the Localized mapping is configured with four eREGs in one DL PRB pair. For example, the numbers of the eREGs configuring the eCCE which has been configured by employing the Localized mapping are consecutive. With respect to the eCCEs (eCCE1, eCCE2, eCCE3, eCCE4, eCCE5, eCCE6, eCCE7, eCCE8, eCCE9, eCCE10, eCCE11, eCCE12, eCCE13, eCCE14, eCCE15, and eCCE16) which have been configured by employing the Localized mapping illustrated in FIG. 20, the eCCE1 is configured with eREG1, eREG2, eREG3, and eREG4 of the DL PRB pair W illustrated in FIG. 21, the eCCE2 is configured with eREG5, eREG6, eREG7, and eREG8 of the DL PRB pair W illustrated in FIG. 21, the eCCE3 is configured with eREG9, eREG10, eREG11, and eREG12 of the DL PRB pair W illustrated in FIG. 21, the eCCE4 is configured with eREG13, eREG14, eREG15, and eREG16 of the DL PRB pair W illustrated in FIG. 21, the eCCE5 is configured with eREG1, eREG2, eREG3, and eREG4 of the DL PRB pair X illustrated in FIG. 21, the eCCE6 is configured with eREG5, eREG6, eREG7, and eREG8 of the DL PRB pair X illustrated in FIG. 21, the eCCE7 is configured with eREG9, eREG10, eREG11, and eREG12 of the DL PRB pair X illustrated in FIG. 21, the eCCE8 is configured with eREG13, eREG14, eREG15, and eREG16 of the DL PRB pair X illustrated in FIG. 21, the eCCE9 is configured with eREG1, eREG2, eREG3, and eREG4 of the DL PRB pair Y illustrated in FIG. 21, the eCCE10 is configured with eREG5, eREG6, eREG7, and eREG8 of the DL PRB pair Y illustrated in FIG. 21, the eCCE11 is configured with eREG9, eREG10, eREG11, and eREG12 of the DL PRB pair Y illustrated in FIG. 21, the eCCE12 is configured with eREG13, eREG14, eREG15, and eREG16 of the DL PRB pair Y illustrated in FIG. 21, the eCCE13 is configured with eREG1, eREG2, eREG3, and eREG4 of the DL PRB pair Z illustrated in FIG. 21, the eCCE14 is configured with eREG5, eREG6, eREG7, and eREG8 of the DL PRB pair Z illustrated in FIG. 21, the eCCE15 is configured with eREG9, eREG10, eREG11, and eREG12 of the DL PRB pair Z illustrated in FIG. 21, and the eCCE16 is configured with eREG13, eREG14, eREG15, and eREG16 of the DL PRB pair Z illustrated in FIG. 21. The following description will be given of the case in which the eCCE which is configured through the Localized mapping also is configured with a plurality of eREGs and the definition in common to the eREG used for configuring the eCCE which is configured through the Localized mapping is used as the definition of the eREG (which physical resources it is configured).

Figure 22:
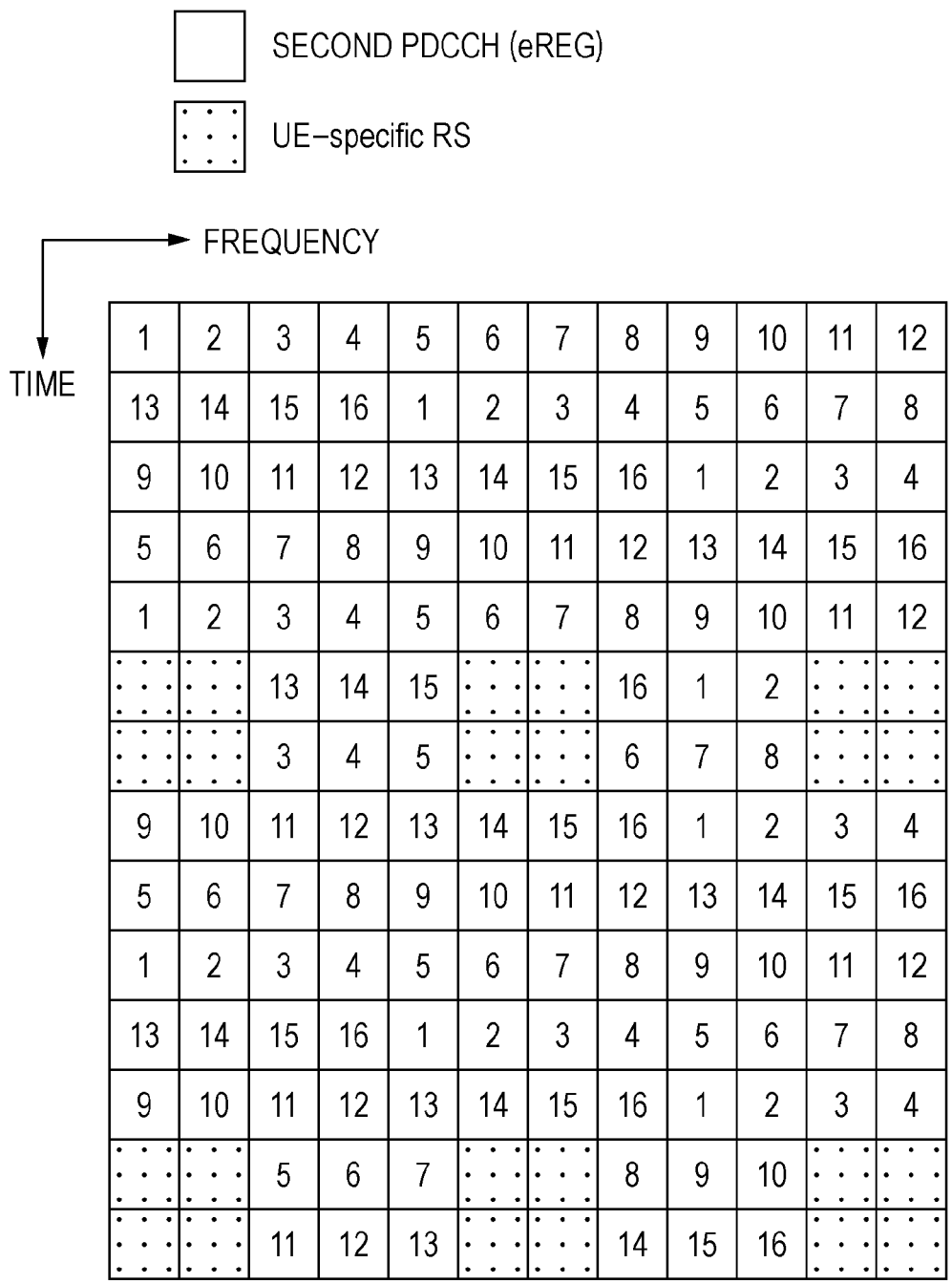
FIG. 22 is a diagram illustrating an example of a configuration of eREG of the embodiment of the present invention.

FIG. 22 is a diagram illustrating an example of a configuration of eREG of the embodiment of the present invention. Here, one DL PRB pair is illustrated. In FIG. 22, one square corresponds to one RE. In FIG. 22, the vertical axis represents a time domain and the horizontal axis represents a frequency domain. Here, the case is illustrated in which UE-specific RSs corresponding to four antenna ports (antenna port 7, antenna port 8, antenna port 9, and antenna port 10) are configured. 168 REs are configured in one DL PRB pair. 24 REs are configured for the UE-specific RSs corresponding to four antenna ports. eREGs are configured by using the remaining REs if the REs configured for the UE-specific RS is removed from the REs configured in the one DL PRB pair. Here, the eREGs are configured by using 144 REs in the one DL PRB pair. FIG. 22 illustrates the case in which 16 eREGs are configured in the one DL PRB pair. Here, one eREG is configured with 9 REs obtained by dividing 144 REs by 16.

Nine REs configuring one eREG will be described in detail. The numbering starts from a RE configured with the subcarrier of the lowest frequency and an OFDM symbol of the earliest time, in the DL PRB pair. Next, the numbering for the REs is performed in the frequency direction in order, if the numbering for the RE configured with the subcarrier of the highest frequency in the OFDM symbol is performed, the numbering for the RE configured with the subcarrier of the lowest frequency and the subsequent OFDM symbol is continuously performed. The same process as the above process is performed on the REs configured with different subcarriers and the remaining REs configured with different OFDM symbols, and the numbering is performed up to the RE configured with the OFDM symbol of the latest time and the subcarrier of the highest frequency. Here, the numbering of the REs configuring eREG is performed while skipping the REs configured for the UE-specific RS. Further, numbering is performed, starting from the number '1', in order of '2', '3', '4', '5', '6', '7', '8', '9', '10', '11', '12', '13', '14', '15', and '16'. If numbering up to '16' is performed, the numbering is repeated starting from '1' again. One eREG is configured with nine REs denoted by the same number. For example, the eREG1 is configured with nine REs denoted by the number '1', the eREG2 is configured with nine REs denoted by the number '2', the eREG3 is configured with nine REs denoted by the number '3', the eREG4 is configured with nine REs denoted by the number '4', the eREG5 is configured with nine REs denoted by the number '5', the eREG6 is configured with nine REs denoted by the number '6', the eREG7 is configured with nine REs denoted by the number '7', the eREG8 is configured with nine REs denoted by the number '8', the eREG1 is configured with nine REs denoted by the number '9', the eREG10 is configured with nine REs denoted by the number '10', the eREG11 is configured with nine REs denoted by the number '11', the eREG12 is configured with nine REs denoted by the number '12', the eREG13 is configured with nine REs denoted by the number '13', the eREG14 is configured with nine REs denoted by the number '14', the eREG15 is configured with nine REs denoted by the number '15', and the eREG16 is configured with nine REs denoted by the number '16'.

Although the eREG is configured as FIG. 22, other signals, the signal of the second PDCCH is not mapped in REs in which for example, a CRS, a first PDCCH, and a CSI-RS are mapped. Accordingly, a rate matching process and a de-rate matching process in the processes of transmitting and receiving signals of the second PDCCH are performed in the base station apparatus 3 and the mobile station apparatus 5, depending on the number of bits that can be transmitted and received in the resources of eREG other than the REs in which the CRS, the first PDCCH, and the CSI-RS are mapped.

FIG. 23 is a diagram illustrating an example of a configuration of eREG of the embodiment of the present invention. FIG. 23 is different from FIG. 22 in that UE-specific RSs corresponding to two antenna ports (antenna port 7 and antenna port 8) are configured. In FIG. 23, all eREGs are not configured with REs of the same number, but eREG1, eREG2, eREG3, eREG4, eREG5, eREG6, eREG7, eREG8, eREG9, eREG10, eREG11, and eREG12 are respectively configured with ten REs, and eREG13, eREG14, eREG15, and eREG16 are respectively configured with nine REs.

Different resource mapping methods (Localized mapping and Distributed mapping) may be applied to the second PDCCH region. For example, the second PDCCH configured with eCCE configured by the Localized mapping is referred to as Localized ePDCCH. For example, the second PDCCH configured with eCCE configured by the Distributed mapping is referred to as Distributed ePDCCH.

For example, the Localized ePDCCH is configured with one eCCE (eCCE aggregation1), two eCCEs (eCCE aggregation2), or four eCCEs (eCCE aggregation4). The Localized ePDCCH having the eCCE aggregation number of two or greater is configured with a plurality of eCCEs of which eCCE numbers are consecutive. The Localized ePDCCH having the eCCE aggregation number of two or greater is configured with a plurality of eCCEs configured with resources in the same DL PRB pair. For example, in FIG. 20, the Localized ePDCCH of the eCCE aggregation2 is configured with eCCE1 and eCCE2, eCCE3 and eCCE4, eCCE5 and eCCE6, eCCE7 and eCCE8, eCCE9 and eCCE10, eCCE11 and eCCE12, eCCE13 and eCCE14, or eCCE15 and eCCE16. For example, in FIG. 20, the Localized ePDCCH of the eCCE aggregation4 is configured with eCCE1, eCCE2, eCCE3 and eCCE4, or eCCE5, eCCE6, eCCE7, and eCCE8, or eCCE9, eCCE10, eCCE11 and eCCE12, or eCCE13, eCCE14, eCCE15, and eCCE16.

For example, the Distributed ePDCCH is configured with one eCCE (eCCE aggregation1), two eCCEs (eCCE aggregation2), four eCCEs (eCCE aggregation4), or eight eCCEs (eCCE aggregation8). The Distributed ePDCCH having the eCCE aggregation number of two or greater is configured with a plurality of eCCEs of which eCCE numbers are consecutive. For example, in FIG. 21, the Distributed ePDCCH of the eCCE aggregation2 is configured with eCCE1 and eCCE2, eCCE3 and eCCE4, eCCE5 and eCCE6, eCCE7 and eCCE8, eCCE9 and eCCE10, eCCE11 and eCCE12, eCCE13 and eCCE14, or eCCE15 and eCCE16. For example, in FIG. 21, the Distributed ePDCCH of the eCCE aggregation4 is configured with eCCE1, eCCE2, eCCE3 and eCCE4, or eCCE5, eCCE6, eCCE7, and eCCE8, or eCCE9, eCCE10, eCCE11 and eCCE12, or eCCE13, eCCE14, eCCE15, and eCCE16. For example, in FIG. 21, the Distributed ePDCCH of the eCCE aggregation8 is configured with eCCE1, eCCE2, eCCE3, eCCE4, eCCE5, eCCE6, eCCE7, and eCCE8, or eCCE9, eCCE10, eCCE11 and eCCE12, eCCE13, eCCE14, eCCE15, and eCCE16.

The second PDCCH region configured with common DL PRB pairs is configured in common for a plurality of mobile station apparatuses 5. Different second PDCCHs are transmitted and received for different mobile station apparatuses 5, by using different eCCEs of the second PDCCH region. When the second PDCCH region configured with common DL PRB pairs is configured in common, different resource mapping methods are applied to different mobile station apparatuses 5, and the Distributed ePDCCH and the Localized ePDCCH are transmitted and received to different mobile station apparatuses 5 in the second PDCCH region, the eREG in which the Distributed ePDCCH is transmitted and received and the eREG in which the Localized ePDCCH is transmitted and received are different. For example, in a certain DL PRB pair, eREG1, eREG2, eREG3, eREG4, eREG5, eREG6, eREG7, and eREG8 may be used as resources of one or more Distributed ePDCCHs, and eREG9, eREG10, eREG11, eREG12, eREG13, eREG14, eREG15, and eREG16 may be used as resources of one or more Localized ePDCCHs. The mobile station apparatus 5 assumes a resource mapping method which is applied to a configured second PDCCH region and performs a process of receiving, demodulating, and decoding the second PDCCH. The base station apparatus 3 may determine one type of resource mapping method which is applied to a certain configured second PDCCH region, and perform a process of arranging and transmitting a plurality of second PDCCHs, or may determine both two types of resource mapping methods which are applied to a configured second PDCCH region, and performs a process of arranging and transmitting a plurality of second PDCCHs.

One or more second PDCCH regions are configured for the mobile station apparatus 5 by the base station apparatus 3. For example, two second PDCCH regions are configured which includes a second PDCCH region to which the Distributed mapping and the random beamforming process are applied and a second PDCCH region to which the Localized mapping and the beamforming process suitable for the mobile station apparatus 5 are applied. For example, two second PDCCH regions to which the Distributed mapping and the random beamforming process are applied are configured in the mobile station apparatus 5.

The mobile station apparatus 5 is designated (set, configured) to perform a process of detecting (monitoring) the second PDCCH in the second PDCCH region that is configured by the base station apparatus 3. The designation of monitoring of the second PDCCH may be made automatically (implicitly) by the second PDCCH region being configured for the mobile station apparatus 5, or may be made explicitly by the signaling different from the signaling indicating the configuration of the second PDCCH region. With respect to a plurality of mobile station apparatuses 5, the same second PDCCH region may be designated by the base station apparatus 3. The mobile station apparatus 5 does not perform the process of detecting the second PDCCH for all eCCEs of the second PDCCH region, but performs the process of detecting the second PDCCH for the limited eCCEs. For example, an ePDCCH candidate for detecting the second PDCCH is designated for each eCCE aggregation number.

First, the configuration of the ePDCCH candidate of the Localized ePDCCH in the second PDCCH region will be described by using FIG. 20. 16 ePDCCH candidates (an ePDCCH candidate1, an ePDCCH candidate2, an ePDCCH candidate3, an ePDCCH candidate4, an ePDCCH candidate5, an ePDCCH candidate6, an ePDCCH candidate7, an ePDCCH candidate8, an ePDCCH candidate9, an ePDCCH candidate10, an ePDCCH candidate11, an ePDCCH candidate12, an ePDCCH candidate13, an ePDCCH candidate14, an ePDCCH candidate15, and an ePDCCH candidate16) are configured as the ePDCCH candidate of the Localized ePDCCH of the eCCE aggregation), in the second PDCCH region. In the eCCE aggregation), the ePDCCH candidate1 is configured with eCCE1, the ePDCCH candidate2 is configured with eCCE2, the ePDCCH candidate3 is configured with eCCE3, the ePDCCH candidate4 is configured with eCCE4, the ePDCCH candidate5 is configured with eCCE5, the ePDCCH candidate6 is configured with eCCE6, the ePDCCH candidate7 is configured with eCCE7, the ePDCCH candidate8 is configured with eCCE8, the ePDCCH candidate9 is configured with eCCE9, the ePDCCH candidate10 is configured with eCCE10, the ePDCCH candidate11 is configured with eCCE11, the ePDCCH candidate12 is configured with eCCE12, the ePDCCH candidate13 is configured with eCCE13, the ePDCCH candidate14 is configured with eCCE14, the ePDCCH candidate15 is configured with eCCE15, and the ePDCCH candidate16 is configured with eCCE16.

Eight ePDCCH candidates (an ePDCCH candidate1, an ePDCCH candidate2, an ePDCCH candidate3, an ePDCCH candidate4, an ePDCCH candidate5, an ePDCCH candidate6, an ePDCCH candidate7, and an ePDCCH candidate8) are configured as the ePDCCH candidate of the Localized ePDCCH of the eCCE aggregation2, in the second PDCCH region. In the eCCE aggregation2, the ePDCCH candidate1 is configured with eCCE1 and eCCE2, the ePDCCH candidate2 is configured with eCCE3 and eCCE4, the ePDCCH candidate3 is configured with eCCE5 and eCCE6, the ePDCCH candidate4 is configured with eCCE7 and eCCE8, the ePDCCH candidate5 is configured with eCCE9 and eCCE10, the ePDCCH candidate6 is configured with eCCE11 and eCCE12, the ePDCCH candidate7 is configured with eCCE13 and eCCE14, and the ePDCCH candidate8 is configured with eCCE15 and eCCE16.

Four ePDCCH candidates (an ePDCCH candidate1, an ePDCCH candidate2, an ePDCCH candidate3, and an ePDCCH candidate4) are configured as the ePDCCH candidate of the Localized ePDCCH of the eCCE aggregation4, in the second PDCCH region. In the eCCE aggregation4, the ePDCCH candidate1 is configured with eCCE1, eCCE2, eCCE3, and eCCE4, the ePDCCH candidate2 is configured with eCCE5, eCCE6, eCCE7, and eCCE8, the ePDCCH candidate3 is configured with eCCE9, eCCE10, eCCE11, and eCCE12, and the ePDCCH candidate4 is configured with eCCE13, eCCE14, eCCE15, and eCCE16.

Next, the configuration of the ePDCCH candidate of the Distributed ePDCCH in the second PDCCH region will be described by using FIG. 21. 16 ePDCCH candidates (an ePDCCH candidate1, an ePDCCH candidate2, an ePDCCH candidate3, an ePDCCH candidate4, an ePDCCH candidate5, an ePDCCH candidate6, an ePDCCH candidate7, an ePDCCH candidate8, an ePDCCH candidate9, an ePDCCH candidate10, an ePDCCH candidate11, an ePDCCH candidate12, an ePDCCH candidate13, an ePDCCH candidate14, an ePDCCH candidate15, and an ePDCCH candidate16) are configured as the ePDCCH candidate of the Distributed ePDCCH of the eCCE aggregation), in the second PDCCH region. In the eCCE aggregation), the ePDCCH candidate1 is configured with eCCE1, the ePDCCH candidate2 is configured with eCCE2, the ePDCCH candidate3 is configured with eCCE3, the ePDCCH candidate4 is configured with eCCE4, the ePDCCH candidate5 is configured with eCCE5, the ePDCCH candidate6 is configured with eCCE6, the ePDCCH candidate7 is configured with eCCE7, the ePDCCH candidate8 is configured with eCCE8, the ePDCCH candidate9 is configured with eCCE9, the ePDCCH candidate10 is configured with eCCE10, the ePDCCH candidate11 is configured with eCCE11, the ePDCCH candidate12 is configured with eCCE12, the ePDCCH candidate13 is configured with eCCE13, the ePDCCH candidate14 is configured with eCCE14, the ePDCCH candidate15 is configured with eCCE15, and the ePDCCH candidate16 is configured with eCCE16.

Eight ePDCCH candidates (an ePDCCH candidate1, an ePDCCH candidate2, an ePDCCH candidate3, an ePDCCH candidate4, an ePDCCH candidate5, an ePDCCH candidate6, an ePDCCH candidate7, and an ePDCCH candidate8) are configured as the ePDCCH candidate of the Distributed ePDCCH of the eCCE aggregation2, in the second PDCCH region. In the eCCE aggregation2, the ePDCCH candidate1 is configured with eCCE1 and eCCE2, the ePDCCH candidate2 is configured with eCCE3 and eCCE4, the ePDCCH candidate3 is configured with eCCE5 and eCCE6, the ePDCCH candidate4 is configured with eCCE7 and eCCE8, the ePDCCH candidate5 is configured with eCCE9 and eCCE10, the ePDCCH candidate6 is configured with eCCE11 and eCCE12, the ePDCCH candidate7 is configured with eCCE13 and eCCE14, and the ePDCCH candidate8 is configured with eCCE15 and eCCE16.

Four ePDCCH candidates (an ePDCCH candidate1, an ePDCCH candidate2, an ePDCCH candidate3, and ePDCCH candidate4) are configured as the ePDCCH candidate of the Distributed ePDCCH of the eCCE aggregation4, in the second PDCCH region. In the eCCE aggregation4, the ePDCCH candidate1 is configured with eCCE1, eCCE2, eCCE3, and eCCE4, the ePDCCH candidate2 is configured with eCCE5, eCCE6, eCCE7, and eCCE8, the ePDCCH candidate3 is configured with eCCE9, eCCE10, eCCE11, and eCCE12, and the ePDCCH candidate4 is configured with eCCE13, eCCE14, eCCE15, and eCCE16.

Two ePDCCH candidates (an ePDCCH candidate1 and an ePDCCH candidate2) are configured as the ePDCCH candidate of the Distributed ePDCCH of the eCCE aggregation8, in the second PDCCH region. In the eCCE aggregation8, the ePDCCH candidate1 is configured with eCCE1, eCCE2, eCCE3, eCCE4, eCCE5, eCCE6, eCCE7, and eCCE8, and the ePDCCH candidate2 is configured with eCCE9, eCCE10, eCCE11, eCCE12, eCCE13, eCCE14, eCCE15, and eCCE16.

For example, whether to perform a process of detecting a second PDCCH for any ePDCCH candidate for each second PDCCH region is indicated by a bitmap configured with one bit for each ePDCCH candidate (is referred to as ePDCCH candidate bitmap). The mobile station apparatus 5 performs the process of detecting a second PDCCH for the ePDCCH candidate denoted by bit '1', and the mobile station apparatus 5 does not perform the process of detecting a second PDCCH for the ePDCCH candidate denoted by bit '0'. The ePDCCH candidate bitmap for each eCCE aggregation number is notified from the base station apparatus 3 to the mobile station apparatus 5.

Before communication using the second PDCCH is started, information indicating the configuration (designation and configuring) of the second PDCCH region is exchanged between the base station apparatus 3 and the mobile station apparatus 5. For example, the information is exchanged using a Radio Resource Control (RRC) signaling. Specifically, the mobile station apparatus 5 receives information indicating the position (allocation) of the DL PRB pairs of the second PDCCH region from the base station apparatus 3. Further, information indicating the type (Localized mapping or Distributed mapping) of the resource mapping of eCCE for each second PDCCH region is notified from the base station apparatus 3 to the mobile station apparatus 5. In addition, a configuration is possible in which other types of information other than information explicitly indicating the type of the resource mapping applied to the second PDCCH region is notified from the base station apparatus 3 to the mobile station apparatus 5, and the mobile station apparatus 5 implicitly recognizes the type of resource mapping of the eCCE of the second PDCCH based on the information. For example, information indicating a transmission method of the second PDCCH in each second PDCCH region is notified from the base station apparatus 3 to the mobile station apparatus 5. When the information indicates a transmission method in which a beamforming process suitable for the mobile station apparatus 5 is applied, the mobile station apparatus 5 recognizes that the resource mapping of the eCCE of the second PDCCH region is Localized mapping, and when the information indicates a transmission method in which a random beamforming process is applied, the mobile station apparatus 5 recognizes that the resource mapping of the eCCE of the second PDCCH region is Distributed mapping. Further, only when resource mapping of the eCCE of a certain second PDCCH is configured in advance as a default and the resource mapping of the eCCE different from the configuring is used, information indicating the fact may be notified to the mobile station apparatus 5 from the base station apparatus 3. Further, it may be determined in advance that one of the types of resource mapping of the eCCE, for example, Distributed mapping is to be applied, in some second PDCCH regions.

The mobile station apparatus 5 performs demodulation of the signals of the second PDCCH by using a UE-specific RS received within the second PDCCH region which is configured by the base station apparatus 3, and performs a process of detecting the second PDCCH addressed to the mobile station apparatus 5. The mobile station apparatus 5 performs demodulation of signals of the second PDCCH, by using the UE-specific RS in the DL PRB pair to which the resource for performing demodulation belongs. The association between the eREG and a certain antenna port is configured in advance, and the mobile station apparatus 5 performs demodulation of signals of the second PDCCH, by using the UE-specific RS of the antenna port which is determined based on the eREG configuring the second PDCCH. Further, in the second PDCCH region to which the Localized mapping is applied and the second PDCCH region to which the Distributed mapping is applied, another association may be used with respect to the association between the eREG in the DL PRB pair and the antenna port.

In the following description, control signals mapped to the second PDCCH will be described. The control signal mapped to the second PDCCH is processed for each piece of control information (DCI) for one mobile station apparatus 5, and is subjected to a scramble process, a modulation process, a layer mapping process, a pre-coding process and the like. Here, the layer mapping process means some MIMO signal processes performed when transmission through a plurality of antennas is applied to the second PDCCH. Further, a common pre-coding process can be performed on the control signal mapped to the second PDCCH and the UE-specific RS. At this time, it is preferable that the pre-coding process be performed by a pre-coding weighting suitable for the unit of the mobile station apparatus 5.

Further, the UE-specific RS is multiplexed by the base station apparatus 3 in the DL PRB pair in which the second PDCCH is allocated. The mobile station apparatus 5 performs the demodulation process on the signals of the second PDCCH by the UE-specific RS. As the UE-specific RS used in demodulation of the second PDCCH, the UE-specific RS of the antenna port corresponding to the eREG or the eCCE configuring the second PDCCH is used. The antenna port corresponding to the eREG or the eCCE of the second PDCCH is configured in advance.

For example, in FIG. 20, the second PDCCH region to which the Localized mapping is applied is configured in advance such that the eCCE1, the eCCE5, the eCCE9, and the eCCE13 correspond to the antenna port 7, the eCCE2, the eCCE6, the eCCE10, and the eCCE14 correspond to the antenna port 8, the eCCE3, the eCCE7, the eCCE11, and the eCCE15 correspond to the antenna port 9, the eCCE4, the eCCE8, the eCCE12, and the eCCE16 correspond to the antenna port 10, and such a configuring is used in the case, for example, in which the UE-specific RS of four antenna ports are configured in the second PDCCH region as illustrated in FIG. 22. For example, in FIG. 20, the second PDCCH region to which the Localized mapping is applied is configured in advance such that the eCCE1, the eCCE5, the eCCE9, and the eCCE13 correspond to the antenna port 7, the eCCE2, the eCCE6, the eCCE10, and the eCCE14 correspond to the antenna port 7, the eCCE3, the eCCE7, the eCCE11, and the eCCE15 correspond to the antenna port 8, the eCCE4, the eCCE8, the eCCE12, and the eCCE16 correspond to the antenna port 8, and such a configuring is used in the case, for example, in which the UE-specific RS of two antenna ports are configured in the second PDCCH region as illustrated in FIG. 23.

For example, in FIG. 21, the second PDCCH region to which the Distributed mapping is applied is configured in advance such that the eCCE1, the eCCE2, the eCCE3, and the eCCE4 correspond to the antenna port 7, the eCCE5, the eCCE6, the eCCE7, and the eCCE8 correspond to the antenna port 8, the eCCE9, the eCCE10, the eCCE11, and the eCCE12 correspond to the antenna port 9, the eCCE13, the eCCE14, the eCCE15, and the eCCE16 correspond to the antenna port 10, and such a configuring is used in the case, for example, in which the UE-specific RS of four antenna ports are configured in the second PDCCH region as illustrated in FIG. 22. For example, in FIG. 21, the second PDCCH region to which the Distributed mapping is applied is configured in advance such that the eCCE1, the eCCE2, the eCCE3, and the eCCE4 correspond to the antenna port 7, the eCCE5, the eCCE6, the eCCE7, and the eCCE8 correspond to the antenna port 7, the eCCE9, the eCCE10, the eCCE11, and the eCCE12 correspond to the antenna port 8, the eCCE13, the eCCE14, the eCCE15, and the eCCE16 correspond to the antenna port 8, and such a configuring is used in the case, for example, in which the UE-specific RS of two antenna ports are configured in the second PDCCH region as illustrated in FIG. 23.

When the eCCEs of the Distributed mapping are configured with the eREG illustrated in FIG. 21, and with respect to the eCCEs of the Localized mapping illustrated in FIG. 20, the eCCE1 of the Localized mapping is configured with eREG1, eREG2, eREG3 and eREG4 of the DL PRB pair W, the eCCE2 of the Localized mapping is configured with eREG5, eREG6, eREG7 and eREG8 of the DL PRB pair W, the eCCE3 of the Localized mapping is configured with eREG9, eREG10, eREG11 and eREG12 of the DL PRB pair W, the eCCE4 of the Localized mapping is configured with eREG13, eREG14, eREG15 and eREG16 of the DL PRB pair W, the eCCE5 of the Localized mapping is configured with eREG1, eREG2, eREG3 and eREG4 of the DL PRB pair X, the eCCE6 of the Localized mapping is configured with eREG5, eREG6, eREG7 and eREG8 of the DL PRB pair X, the eCCE7 of the Localized mapping is configured with eREG9, eREG10, eREG11 and eREG12 of the DL PRB pair X, the eCCE8 of the Localized mapping is configured with eREG13, eREG14, eREG15 and eREG16 of the DL PRB pair X, the eCCE9 of the Localized mapping is configured with eREG1, eREG2, eREG3 and eREG4 of the DL PRB pair Y, the eCCE10 of the Localized mapping is configured with eREG5, eREG6, eREG7 and eREG8 of the DL PRB pair Y, the eCCE11 of the Localized mapping is configured with eREG9, eREG10, eREG11 and eREG12 of the DL PRB pair Y, the eCCE12 of the Localized mapping is configured with eREG13, eREG14, eREG15 and eREG16 of the DL PRB pair Y, the eCCE13 of the Localized mapping is configured with eREG1, eREG2, eREG3 and eREG4 of the DL PRB pair Z, the eCCE14 of the Localized mapping is configured with eREG5, eREG6, eREG7 and eREG8 of the DL PRB pair Z, the eCCE15 of the Localized mapping is configured with eREG9, eREG10, eREG11 and eREG12 of the DL PRB pair Z, and the eCCE16 of the Localized mapping is configured with eREG13, eREG14, eREG15 and eREG16 of the DL PRB pair Z, each eREG and each antenna port correspond with each other, and the mobile station apparatus 5 may determine the antenna port of the UE-specific RS used in demodulation from the eREG configuring the second PDCCH. For example, the second PDCCH region to which the Localized mapping is applied and the second PDCCH region to which the Distributed mapping is applied are configured in advance such that the eREG1, the eREG2, the eREG3, and the eREG4 correspond to the antenna port 7, the eREG5, the eREG6, the eREG7, and the eREG8 correspond to the antenna port 8, the eREG9, the eREG10, the eREG11, and the eREG12 correspond to the antenna port 9, the eREG13, the eREG14, the eREG15, and the eREG16 correspond to the antenna port 10, and such a configuring is used in the case, for example, in which the UE-specific RS of four antenna ports are configured in the second PDCCH region as illustrated in FIG. 22. For example, the second PDCCH region to which the Localized mapping is applied and the second PDCCH region to which the Distributed mapping is applied are configured in advance such that the eREG1, the eREG2, the eREG3, the eREG4, the eREG5, the eREG6, the eREG7, and the eREG8 correspond to the antenna port 7, and the eREG9, the eREG10, the eREG11, the eREG12, the eREG13, the eREG14, the eREG15, and the eREG16 correspond to the antenna port 8, and such a configuring is used in the case, for example, in which the UE-specific RS of two antenna ports are configured in the second PDCCH region as illustrated in FIG. 23.

In addition, when the eCCE aggregation number is two or greater, control may be performed such that only one antenna port is used for the second PDCCH. For example, when the Localized ePDCCH of the eCCE aggregation2 is configured with the eCCE1 and the eCCE2 which are illustrated in FIG. 20, and a configuring is made in advance such that the eCCE1 corresponds to the antenna port 7, and the eCCE2 corresponds to the antenna port 8, the base station apparatus 3 may transmit the signals of the Localized ePDCCH and the UE-specific RS to the mobile station apparatus 5, by using only the antenna port 7 or the antenna port 8, and the mobile station apparatus 5 may demodulate the signals of the Localized ePDCCH by using the UE-specific RS of the antenna port 7 or the antenna port 8. Further, in the eCCE aggregation4, control may be performed such that only two antenna ports are used for the second PDCCH. For example, when the Localized ePDCCH of the eCCE aggregation4 is configured with the eCCE1, the eCCE2, the eCCE3, and the eCCE4 which are illustrated in FIG. 20, and a configuring is made in advance such that the eCCE1 corresponds to the antenna port 7, the eCCE2 corresponds to the antenna port 8, the eCCE3 corresponds to the antenna port 9, and the eCCE4 corresponds to the antenna port 10, the base station apparatus 3 may transmit the signals of the eCCE1 and the eCCE2 of the Localized ePDCCH and the UE-specific RS to the mobile station apparatus 5, by using only the antenna port 7 or the antenna port 8, and transmit the signals of the eCCE3 and the eCCE4 of the Localized ePDCCH and the UE-specific RS to the mobile station apparatus 5, by using only the antenna port 9 or the antenna port 10, and the mobile station apparatus 5 may demodulate the signals of the eCCE1 and the eCCE2 of the Localized ePDCCH by using the UE-specific RS of the antenna port 7 or the antenna port 8, and demodulate the signals of the eCCE3 and the eCCE4 of the Localized ePDCCH by using the UE-specific RS of the antenna port 9 or the antenna port 10. In this case, the base station apparatus 3 forms the antenna port used for transmission of signals of the eCCE1 and the eCCE2, and the antenna port used for transmission of signals of the eCCE3 and the eCCE4, by a common pre-coding process such that it is possible to improve the characteristics of the channel estimation in the mobile station apparatus 5. With respect to a plurality of eCCEs configuring the Localized ePDCCH, a plurality of eCCEs corresponding to a plurality of antenna ports in which the UE-specific RSs are mapped in the same downlink resource element may be transmitted by using any antenna port, and a plurality of eCCEs corresponding to a plurality of antenna ports in which the UE-specific RSs are mapped in different downlink resource elements may be transmitted by using respectively different antenna ports.

Figure 24:
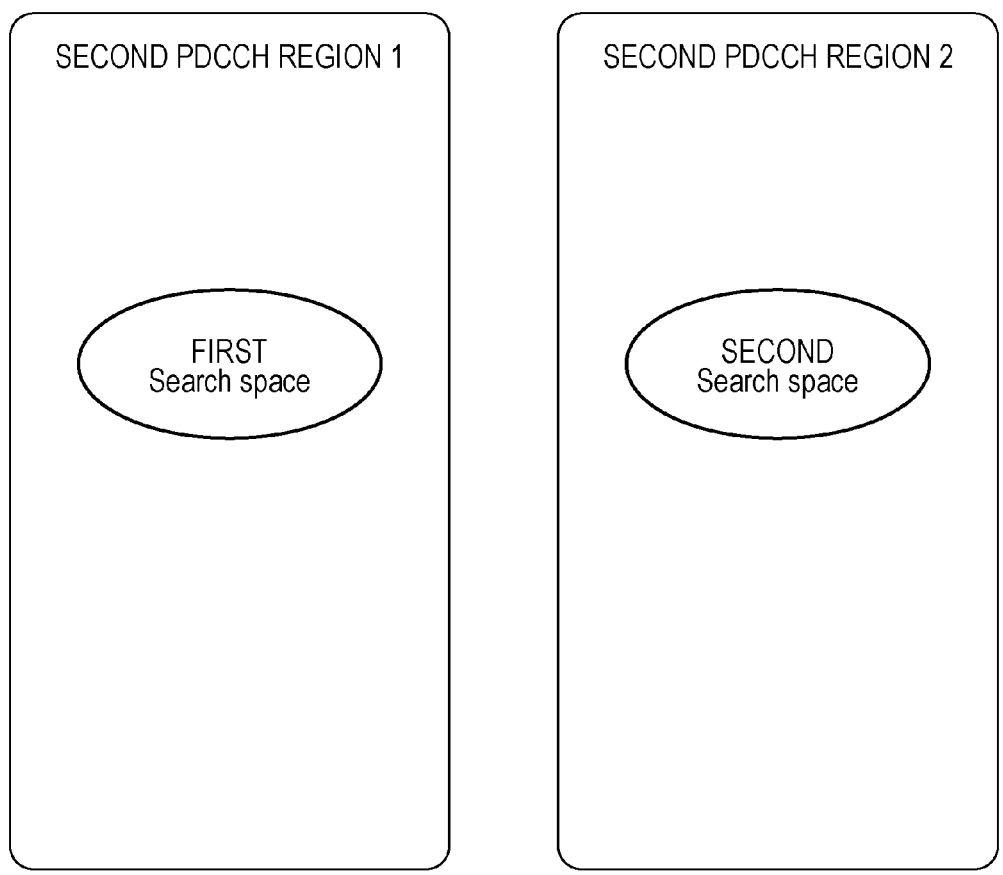
FIG. 24 is a diagram illustrating an example of monitoring of a second PDCCH of the mobile station apparatus 5 according to the embodiment of the present invention.

FIG. 24 is a diagram illustrating an example of monitoring of the second PDCCH of the mobile station apparatus 5 according to the embodiment of the present invention. FIG. 24 describes the case in which two second PDCCH regions (second PDCCH region 1 and second PDCCH region 2) are configured for the mobile station apparatus 5. In the mobile station apparatus 5, a search space is configured in each second PDCCH region. The search space means a logical region in which the mobile station apparatus 5 performs decoding detection of the second PDCCH in the second PDCCH region. The search space is configured with a plurality of second PDCCH candidates. The second PDCCH candidates are to be subjected to the decoding detection of the second PDCCH by the mobile station apparatus 5. For each eCCE aggregation number, different second PDCCH candidates are configured with different eCCEs (including one eCCE, and a plurality of eCCEs).

In the mobile station apparatus 5 in which a plurality of second PDCCH regions are configured, a plurality of search spaces (first search space, second search space) are configured. For example, the Distributed mapping is applied to some second PDCCH region of a plurality of second PDCCH regions configured in the mobile station apparatus 5, and the Localized mapping is applied to some different second PDCCH region.

The number of second PDCCH candidates of the first search space may be different from the number of candidates of the second PDCCH of the second search space. Further, in a certain eCCE aggregation number, the number of second PDCCH candidates of the first search space and the number of second PDCCH candidates of the second search space may be the same; and in different eCCE aggregation number, the number of second PDCCH candidates of the first search space and the number of second PDCCH candidates of the second search space may be different. Further, in a certain eCCE aggregation number, the number of second PDCCH candidates of the first search space may be more than the number of second PDCCH candidates of the second search space; and in different eCCE aggregation number, the number of second PDCCH candidates of the first search space may be less than the number of second PDCCH candidates of the second search space. Further, the second PDCCH candidate of a certain eCCE aggregation number may be configured in the search space of one second PDCCH region, and may not be configured in the search space of the other second PDCCH region. Further, the number of second PDCCH candidates of the search space in one second PDCCH region may be changed, depending on the number of second PDCCH regions configured in the mobile station apparatus 5. For example, the number of second PDCCH candidates of the search space in one second PDCCH region may be reduced, with an increase in the number of the second PDCCH regions configured in the mobile station apparatus 5.

In the communication system 1, as illustrated in FIG. 15, a plurality of PUCCH resources for transmission and reception of ACK/NACK (hereinafter, referred to as ACK/NACK PUCCH) are prepared. In the prepared resources of ACK/NACK PUCCH, the ACK/NACK PUCCH resource for which the UL PRB pairs configuring the ACK/NACK PUCCH resource are located near to the edge in the uplink system band is used for transmission and reception of ACK/NACK (hereinafter, referred to as SPS ACK/NACK) for PDSCH of a scheduling (Persistent scheduling, Semi-Persistent scheduling: SPS) in which PDCCH is not basically used for resource allocation of PDSCH. During the SPS, the base station apparatus 3 notifies in advance the mobile station apparatus 5 of a DL PRB pair in which the PDSCH for a mobile station apparatus 5 may be allocated and transmitted by the base station apparatus 3, and the mobile station apparatus 5 performs demodulation and decoding of the PDSCH from the notified DL PRB pair, checks CRC, confirms whether or not the PDSCH addressed to the mobile station apparatus is transmitted, and when it is determined that there is the PDSCH addressed to the mobile station apparatus 5, the mobile station apparatus 5 uses the detected data. Since during the SPS, one or more DL PRB pairs as the resource of the frequency domain are notified to the mobile station apparatus 5 in advance and a downlink subframe in which PDSCH may be allocated is indicated, the period of the downlink subframe as the resource of the time domain is notified to the mobile station apparatus 5 in advance. In this manner, during the SPS, the resource to which the PDSCH is actually allocated is not indicated by the first PDCCH and a first PDCCH is not used. Since the first PDCCH is not used, the ACK/NACK PUCCH resources are implicitly indicated depending on the CCE index, and an allocation method cannot be used, the base station apparatus 3 explicitly notifies the mobile station apparatus 5 of the resource of the PUCCH used for the PDSCH of SPS by using signaling.

It is preferable from the viewpoint of effective utilization of the uplink resource that the ACK/NACK PUCCH resource which is continuous to the ACK/NACK PUCCH resource which is allocated for the SPS ACK/NACK be used, with respect to the ACK/NACK PUCCH resource for the PDSCH of scheduling (dynamic scheduling) in which PDCCH is basically used for the resource allocation of the PDSCH. Since the number of mobile station apparatuses 5 using the SPS is not constant and varies, it is preferable that the ACK/NACK PUCCH resources of all uplink system bands in which the ACK/NACK PUCCH resource for the PDSCH of the dynamic scheduling is started (started to use) can be controlled by the base station apparatus 3. Further, in the dynamic scheduling, the actual allocation of the PDSCH is indicated by the first PDCCH, and the ACK/NACK PUCCH resource is implicitly allocated to the mobile station apparatus 5, according to the CCE index of one or more CCEs used in the first PDCCH. Hereinafter, the ACK/NACK for PDSCH of the dynamic scheduling is referred to as Dynamic ACK/NACK.

In order to realize the above demands, information indicating the ACK/NACK PUCCH resource in which the association with the CCE index is started is notified to the mobile station apparatus 5 from the base station apparatus 3. In the embodiment of the present invention, in the dynamic scheduling in which the second PDCCH is basically used for the resource allocation of PDSCH, the ACK/NACK PUCCH resources are allocated implicitly to the mobile station apparatus 5 according to the eCCE indexes of one or more eCCEs used in the second PDCCH. In the embodiment of the present invention, the base station apparatus 3 configures the ACK/NACK PUCCH resource in which the association with the eCCE index of the second PDCCH region is started, with respect to each of a plurality of second PDCCH regions configured in the mobile station apparatus 5, and notifies the mobile station apparatus 5 of the information by using RRC signaling, the mobile station apparatus 5 recognizes the ACK/NACK PUCCH resource in which the association with the eCCE indexes of the respective configured second PDCCH regions is started, based on the received information, and the base station apparatus 3 and the mobile station apparatus 5 transmits and receives the ACK/NACK PUCCH. As the information indicating the ACK/NACK PUCCH resource in which the association with the eCCE index is started, an offset indicating a difference between the PUCCH resource index of the ACK/NACK PUCCH resource in which the association with the eCCE index is started and the PUCCH resource index of the first number of the ACK/NACK PUCCH resource of the uplink system band (hereinafter, referred to as PUCCH resource offset) is used.

A method of implicitly allocating the ACK/NACK PUCCH resource from eCCEs configuring the second PDCCH will be described. The eCCE of the second PDCCH region and the ACK/NACK PUCCH resource are associated based on a predetermined rule. The identification number of eCCE (eCCE index) and the identification number of the ACK/NACK PUCCH resource (PUCCH resource index) are associated in advance, and the PUCCH resource index of the value to which the PUCCH resource offset is added is associated with the eCCE index. For example, the mobile station apparatus 5 transmits ACK/NACK for data of PDSCH of which the allocation of resource is indicated by the second PDCCH (signal obtained by modulating the information of ACK/NACK), by using the ACK/NACK PUCCH resource corresponding to the eCCE having the smallest number, among eCCEs used in the second PDCCH from which DCI addressed to the mobile station apparatus 5 is detected. The base station apparatus 3 recognizes the allocation between the eCCE and the ACK/NACK PUCCH resource in the same manner as the mobile station apparatus 5, and allocates the eCCEs used in the second PDCCH in view of the ACK/NACK PUCCH resource allocated in the mobile station apparatus 5. In other words, the mobile station apparatus 5 recognizes the ACK/NACK PUCCH resource allocated to the mobile station apparatus 5, based on the eCCEs used in the second PDCCH from which DCI addressed to the mobile station apparatus 5 is detected.

Figure 25:
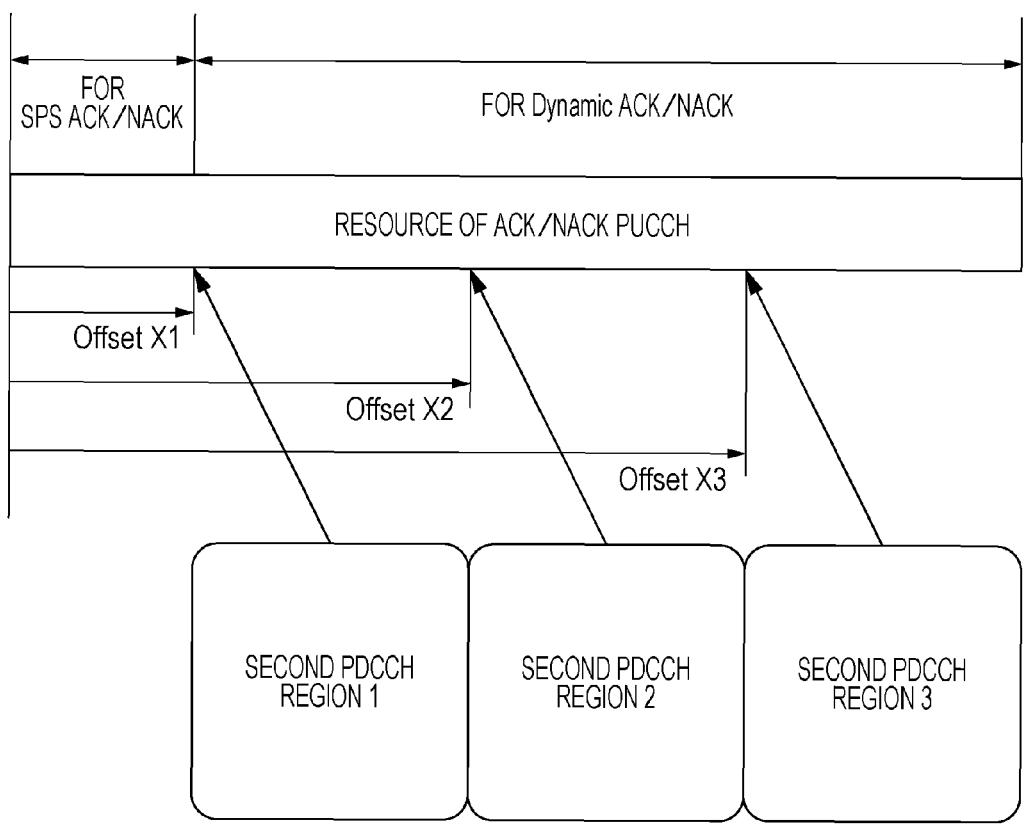
FIG. 25 is a diagram conceptually describing association between ACK/NACK PUCCH resource and eCCE of the second PDCCH region of the embodiment of the present invention.

FIG. 25 is a diagram conceptually describing association between the ACK/NACK PUCCH resource and eCCE of the second PDCCH region of the embodiment of the present invention. Here, the case will be described in which the base station apparatus 3 configures three second PDCCH regions (a second PDCCH region 1, a second PDCCH region 2, and a second PDCCH region 3) in the communication system 1. The resources having the PUCCH resource indexes of the first half among the ACK/NACK PUCCH resources of the uplink system band are used for SPS ACK/NACK. The resources having the numbers subsequent to the PUCCH resources for the SPS ACK/NACK are used for the Dynamic ACK/NACK. The association with the eCCE of the second PDCCH region 1 is started from the resource having the number next to the PUCCH resources for the SPS ACK/NACK. The PUCCH resource index in which the association with the eCCE of the second PDCCH region 1 is started is a value obtained by adding the Offset X1 to the PUCCH resource index of the first number of the ACK/NACK PUCCH resource of the uplink system band. Next, the association with the eCCE of the second PDCCH region 2 is started from the resource of the number next to the ACK/NACK PUCCH resource corresponding to the eCCE of which the eCCE index of the second PDCCH region 1 is the last number. The PUCCH resource index in which the association with the eCCE of the second PDCCH region 2 is started is a value obtained by adding the Offset X2 to the PUCCH resource index of the first number of the ACK/NACK PUCCH resource of the uplink system band. Next, the association with the eCCE of the second PDCCH region 3 is started from the resource of the number next to the ACK/NACK PUCCH resource corresponding to the eCCE of which the eCCE index of the second PDCCH region 2 is the last number. The PUCCH resource index in which the association with the eCCE of the second PDCCH region 3 is started is a value obtained by adding the Offset X3 to the PUCCH resource index of the first number of the ACK/NACK PUCCH resource of the uplink system band. In addition, with respect to the Offset X1, the Offset X2, and the Offset X3, there is a relationship that Offset X1<Offset X2<Offset X3.

The base station apparatus 3 configures the PUCCH resource offset for each second PDCCH region configured for the mobile station apparatus 5, and notifies the mobile station apparatus 5 of the PUCCH resource offset which is configured for each second PDCCH region. The mobile station apparatus 5 is notified of the PUCCH resource offset for each second PDCCH region configured in the mobile station apparatus 5 from the base station apparatus 3, and recognizes the ACK/NACK PUCCH resource corresponding to the eCCE of each second PDCCH region. For example, the mobile station apparatus 5 for which the second PDCCH region 1 and the second PDCCH region 2 are configured is notified of Offset X1 as the PUCCH resource offset used in the second PDCCH region 1 and is notified of Offset X2 as the PUCCH resource offset used in the second PDCCH region 2. For example, the mobile station apparatus 5 for which the second PDCCH region 1 and the second PDCCH region 3 are configured is notified of Offset X1 as the PUCCH resource offset used in the second PDCCH region 1 and is notified of Offset X3 as the PUCCH resource offset used in the second PDCCH region 3. In addition, the offset is notified from the base station apparatus 3 to the mobile station apparatus 5 by using RRC signaling.

As described above, the PUCCH resource offset is configured for each second PDCCH region and used, such that it is possible to use different ACK/NACK PUCCH resources for the eCCEs of different second PDCCH regions, and prevent the different mobile station apparatuses for which the PDSCHs are allocated to the second PDCCH in different second PDCCH regions from using the same ACK/NACK PUCCH resource, in other words, it is possible to avoid the collision of the uplink signals between the mobile station apparatuses 5. Further, the base station apparatus 3 can appropriately control the ACK/NACK PUCCH resources for dynamic ACK/NACK which are prepared in the uplink system band according to the number of second PDCCH regions configured for a plurality of mobile station apparatuses 5, and avoid an increase in the overhead on the ACK/NACK PUCCH of the uplink system band. If the eCCEs of the second PDCCH region configured with DL PRB pairs are determined in advance according to the DL PRB pairs which are physically configured, and different ACK/NACK PUCCH resources are prepared for the eCCEs of the second PDCCH region configured with DL PRB pairs which may all be DL PRB pairs, the collision of the ACK/NACK signals between the mobile station apparatuses 5 is avoided, but the overhead on the ACK/NACK PUCCH of the uplink system band is increased significantly. According to the embodiment of the present invention, it is possible to avoid collision of ACK/NACK signals between the mobile station apparatuses 5, while avoiding an increase in uplink overhead.

<Overall Configuration of Base Station Apparatus 3>

Figure 1:
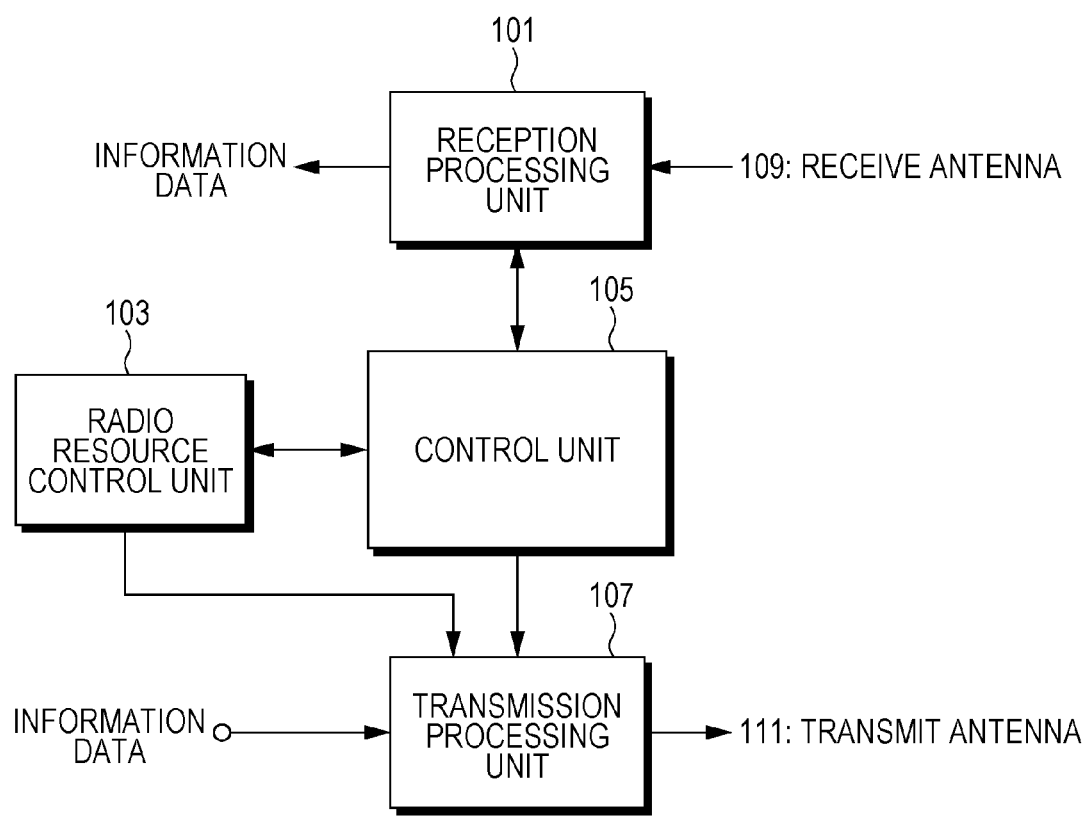
FIG. 1 is a schematic block diagram showing a configuration of a base station apparatus 3 according to an embodiment of the present invention.

Hereinafter, the configuration of the base station apparatus 3 according to the present embodiment will be described with reference to FIGS. 1 to 3. FIG. 1 is a schematic block diagram showing a configuration of the base station apparatus 3 according to an embodiment of the present invention. As illustrated in FIG. 1, the base station apparatus 3 is configured to include a reception processing unit (a second reception processing unit) 101, a radio resource control unit (a second radio resource control unit) 103, a control unit 105, and a transmission processing unit (a second transmission processing unit) 107.

The reception processing unit 101 demodulates and decodes reception signals of the PUCCH and the PUSCH which are received from the mobile station apparatus 5 by the receive antenna 109 according to an instruction of the control unit 105 using the UL RS, and extracts control information and information data. The reception processing unit 101 performs a process to extract UCI on the uplink subframe and the UL PRB in which the base station apparatus 3 allocates the PUCCH resource to the mobile station apparatus 5. The control unit 105 instructs which process the reception processing unit 101 is to perform for which uplink subframe and which UL PRB. For example, the control unit 105 instructs the reception processing unit 101 to perform a detection process of performing a multiplication and a combining of code sequences in the time domain and a multiplication and a combining of code sequences in the frequency domain for the signals in the PUCCH for ACK/NACK (PUCCH format 1a and PUCCH format 1b). The control unit 105 instructs the reception processing unit 101 of code sequences in the frequency domain and/or the code sequences in the time domain which are used in the process of detecting UCI from the PUCCH. The reception processing unit 101 outputs the extracted UCI to the control unit 105 and outputs information data to a higher layer. The details of the reception processing unit 101 will be described later.

Further, the reception processing unit 101 detects (receives) a preamble sequence from the reception signal of the PRACH which is received by the receive antenna 109 from the mobile station apparatus 5, according to an instruction of the control unit 105. Further, the reception processing unit 101 performs estimation of an arrival timing (reception timing) together with the detection of the preamble sequence. The reception processing unit 101 performs a process to detect the preamble sequence for the uplink subframe and the UL PRB pair in which the base station apparatus 3 allocates the PRACH resource. The reception processing unit 101 outputs information regarding the estimated arrival timing to the control unit 105.

Further, the reception processing unit 101 measures channel quality of one or more UL PRB (UL PRB pair), using a SRS received from the mobile station apparatus 5. Further, the reception processing unit 101 detects (calculates and measures) synchronization deviation of the uplink, using the SRS received from the mobile station apparatus 5. The control unit 105 instructs which process the reception processing unit 101 is to perform for which uplink subframe and which UL PRB (UL PRB pair). The reception processing unit 101 outputs information regarding the measured channel quality and detected synchronization deviation of the uplink to the control unit 105. The details of the reception processing unit 101 will be described later.

The radio resource control unit 103 configures allocation of the resource for the PDCCH (the first PDCCH and the second PDCCH), allocation of the resource for the PUCCH, allocation of the DL PRB pair for the PDSCH, allocation of the UL PRB pair for the PUSCH, allocation of the resource for the PRACH, allocation of the resource for the SRS, modulation schemes·coding rates·transmission power control values·phase rotation amounts (weighting value) used in the pre-coding process of various channels, a phase rotation amount (weighting value) used in the pre-coding process of the UE-specific RS, and the like. Further, the radio resource control unit 103 configures the code sequence of the frequency domain, the code sequence of the time domain for the PUCCH, and the like. Further, the radio resource control unit 103 configures a plurality of second PDCCH regions, and configures the DL PRB pair used in each second PDCCH region. Further, the radio resource control unit 103 configures a resource mapping method of eCCE of each second PDCCH region for each mobile station apparatus 5. Further, the radio resource control unit 103 configures a PUCCH resource offset for each second PDCCH region. Some pieces of information which are configured by the radio resource control unit 103 are notified to the mobile station apparatus 5 through the transmission processing unit 107, and for example, information indicating DL PRB pairs in the second PDCCH region, information indicating a resource mapping method of eCCE of the second PDCCH region, and information indicating a PUCCH resource offset for each second PDCCH region are notified to the mobile station apparatus 5.

Further, the radio resource control unit 103 configures allocation of the PDSCH radio resource, based on the UCI which is obtained using the PUCCH in the reception processing unit 101 and is input through the control unit 105. For example, when ACK/NACK obtained using the PUCCH is input, the radio resource control unit 103 performs allocation of the PDSCH resource shown by the NACK in the ACK/NACK with respect to the mobile station apparatus 5.

The radio resource control unit 103 outputs various control signals to the control unit 105. For example, the control signals include a control signal indicating a method of resource mapping of the second PDCCH region, a control signal indicating a ACK/NACK PUCCH resource, a control signal indicating allocation of the second PDCCH resource, a control signal indicating a phase rotation amount used in the pre-coding process, and the like.

The control unit 105 performs control such as allocation of the DL PRB pair for the PDSCH, allocation of the resource for the PDCCH, configuring of a modulation scheme for the PDSCH, configuring of the coding rates for the PDSCH and the PDCCH (eCCE aggregation number of the second PDCCH), configuring of the UE-specific RS of the second PDCCH region, configuring of the antenna port for transmitting the eCCE signal, and configuring of the pre-coding process for the PDSCH, the PDCCH and the UE-specific RS for the transmission processing unit 107, based on the control signal which is input from the radio resource control unit 103. Further, the control unit 105 generates DCI to be transmitted using the PDCCH based on the control signal which is input from the radio resource control unit 103 and outputs the DCI to the transmission processing unit 107. The DCI transmitted using the PDCCH is a downlink assignment, an uplink grant, and the like. Further, the control unit 105 performs control such that information indicating the second PDCCH region, information indicating a resource mapping method of the eCCE of the second PDCCH region, information indicating a PUCCH resource offset for each second PDCCH region, and the like are transmitted to the mobile station apparatus 5 through the transmission processing unit 107 by using the PDSCH.

The control unit 105 performs control such as allocation of the UL PRB pair for the PUSCH, allocation of the resource for the PUCCH, configuring of modulation schemes of the PUSCH and the PUCCH, configuring of a coding rate of the PUSCH, a detection process for the PUCCH, configuring of a code sequence for the PUCCH, allocation of the resource for the PRACH, and allocation of the resource for the SRS, for the reception processing unit 101, based on the control signal which is input from the radio resource control unit 103. For example, the control unit 105 performs configuring of the ACK/NACK PUCCH resource to be subjected to the reception process for the reception processing unit 101 in order to achieve the ACK/NACK for the PDSCH for which resource allocation is indicated by the second PDCCH. Further, the control unit 105 inputs the UCI transmitted using the PUCCH by the mobile station apparatus 5 through the reception processing unit 101 and outputs the input UCI to the radio resource control unit 103.

Further, if information indicating an arrival timing of the detected preamble sequence and information indicating synchronization deviation of the uplink which is detected from the received SRS is input by the reception processing unit 101, the control unit 105 calculates an adjustment value of a transmission timing of the uplink (TA value, TA: Timing Advance, Timing Adjustment, Timing Alignment). Information indicating the calculated adjustment value of the transmission timing of the uplink (TA command) is notified to the mobile station apparatus 5 through the transmission processing unit 107.

The transmission processing unit 107 generates a signal transmitted using the PDCCH and PDSCH based on the control signal which is input from the control unit 105, and transmits the generated signals through the transmit antenna 111. The transmission processing unit 107 transmits information indicating the second PDCCH region, information indicating a resource mapping method of eCCE of each second PDCCH region, information indicating a PUCCH resource offset for each second PDCCH region which are input from the radio resource control unit 103, information data which is input from the higher layer, and the like, by using the PDSCH, to the mobile station apparatus 5, and transmits DCI which is input from the control unit 105, to the mobile station apparatus 5, by using the PDCCH (the first PDCCH and the second PDCCH). Further, the transmission processing unit 107 transmits the CRS, the UE-specific RS, and the CSI-RS. In addition, for simplicity of explanation, hereinafter, it is assumed that information data includes information regarding various types of control. The details of the transmission processing unit 107 will be described later.

<Configuration of Transmission Processing Unit 107 of Base Station Apparatus 3>

Hereinafter, the details of the transmission processing unit 107 of the base station apparatus 3 will be described. FIG. 2 is a schematic block diagram showing a configuration of a transmission processing unit 107 of the base station apparatus 3 according to the embodiment of the present invention. As illustrated in FIG. 2, the transmission processing unit 107 is configured to include a plurality of physical downlink shared channel processing units 201-1 to 201-M (hereinafter, denoted by the physical downlink shared channel processing unit 201 including the physical downlink shared channel processing units 201-1 to 201-M), a plurality of physical downlink control channel processing units 203-1 to 203-M (hereinafter, denoted by the physical downlink control channel processing unit 203 including the physical downlink control channel processing units 203-1 to 203-M), a downlink pilot channel processing unit 205, a pre-coding processing unit 231, a multiplexing unit 207, an Inverse Fast Fourier Transform (IFFT) unit 209, a Guard Interval (GI) insertion unit 211, a D/A (Digital/Analog converter; a digital-to-analog conversion) unit 213, a transmission Radio Frequency (RF) unit 215, and a transmit antenna 111. In addition, since each physical downlink shared channel processing unit 201 and each physical downlink control channel processing unit 203 respectively have the same configuration and function, one of them will be described as a representative thereof. In addition, for simplicity of explanation, it is assumed that the transmit antenna 111 is configured by a plurality of transmit antennas being arranged.

Figure 2:
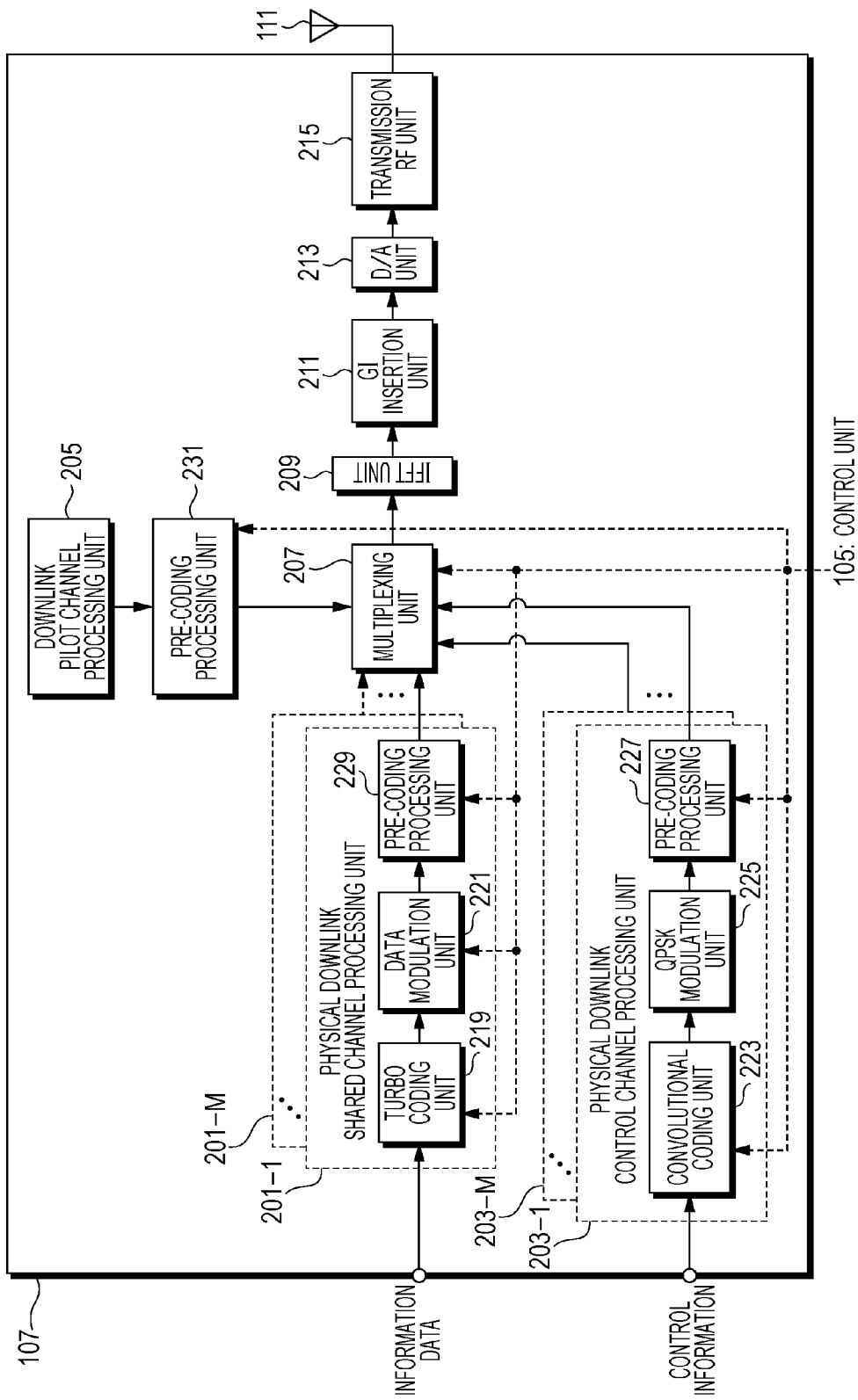
FIG. 2 is a schematic block diagram showing a configuration of a transmission processing unit 107 of the base station apparatus 3 according to the embodiment of the present invention.
Figure 3:
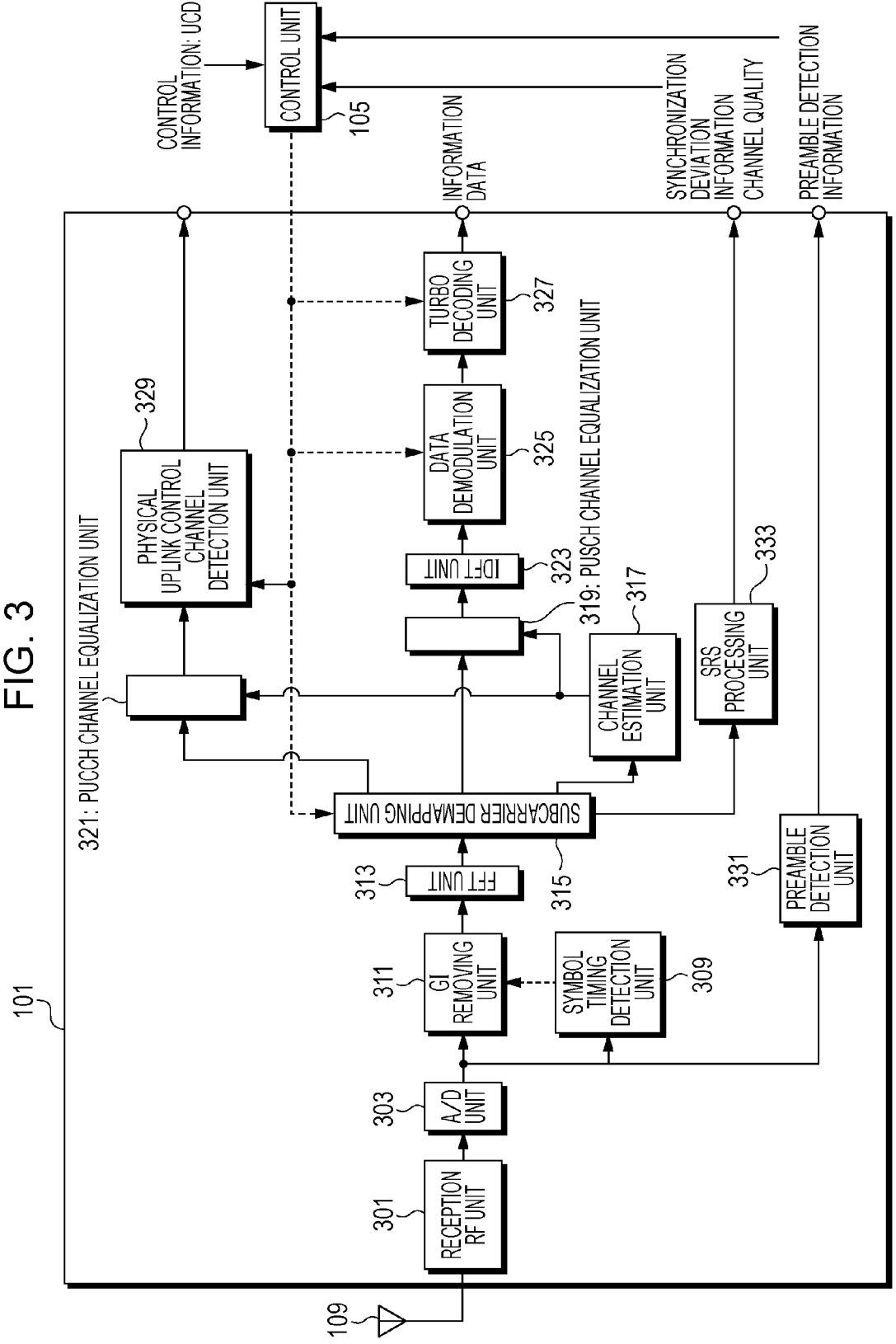
FIG. 3 is a schematic block diagram showing a configuration of a reception processing unit 101 of the base station apparatus 3 according to the embodiment of the present invention.

Further, as illustrated in FIG. 2, each physical downlink shared channel processing unit 201 includes a turbo coding unit 219, a data modulation unit 221 and a pre-coding processing unit 229. Further, as illustrated in FIG. 2, each physical downlink control channel processing unit 203 includes a convolutional coding unit 223, a QPSK modulation unit 225 and a pre-coding processing unit 227. The physical downlink shared channel processing unit 201 performs a baseband signal process for transmitting information data addressed to the mobile station apparatus 5 in an OFDM scheme. The turbo coding unit 219 performs a turbo coding for enhancing error tolerance of data on the information data which is input in a coding rate which is input from the control unit 105, and outputs the information data to the data modulation unit 221. The data modulation unit 221 modulates the data coded by the turbo coding unit 219 by a modulation scheme which is input from the control unit 105, for example, modulation schemes such as a Quadrature Phase Shift Keying (QPSK), a 16 Quadrature Amplitude Modulation (16QAM), and a 64 Quadrature Amplitude Modulation (64AQM) and generates a signal sequence of modulation symbols. The data modulation unit 221 outputs the generated signal sequence to the pre-coding processing unit 229. The pre-coding processing unit 229 performs a pre-coding process (beamforming process) on signals which are input from the data modulation unit 221 and outputs the signals to the multiplexing unit 207. Here, it is preferable that the pre-coding process perform phase rotation or the like on the generated signals such that the mobile station apparatus 5 efficiently performs reception (for example, such that reception power becomes maximum and interference becomes minimum). In addition, when the pre-coding process is not performed on signals which are input from the data modulation unit 221, the pre-coding processing unit 229 outputs the signals which are input from the data modulation unit 221, as they are, to the multiplexing unit 207.

The physical downlink control channel processing unit 203 performs a baseband signal process for transmission in an OFDM scheme on the DCI which is input from the control unit 105. The convolutional coding unit 223 performs a convolutional coding for enhancing error tolerance of the DCI based on a coding rate which is input from the control unit 105. Here, the DCI is controlled in units of bits. Further, the coding rate of the DCI which is transmitted in the second PDCCH is associated with the eCCE aggregation number which is configured. Further, the convolutional coding unit 223 performs a rate matching for adjusting the number of output bits for bits subjected to a convolutional coding process based on the coding rate which is input from the control unit 105. The convolutional coding unit 223 outputs the coded DCI to the QPSK modulation unit 225. The QPSK modulation unit 225 modulates the DCI which is coded by the convolutional coding unit 223 in a QPSK modulation scheme, and outputs the signal sequence of the modulation symbols which are modulated to the pre-coding processing unit 227. The pre-coding processing unit 227 performs the pre-coding process on the signal which is input from the QPSK modulation unit 225, and outputs the signal to the multiplexing unit 207. In addition, the pre-coding processing unit 227 outputs signals which are input from the QPSK modulation unit 225 while not being subjected to the pre-coding process to the multiplexing unit 207.

The downlink pilot channel processing unit 205 generates downlink reference signals (CRS, UE-specific RS, and CSI-RS) which are known signals for the mobile station apparatus 5 so as to be output to the pre-coding processing unit 231. The pre-coding processing unit 231 outputs the CRS, and the CSI-RS which are input from the downlink pilot channel processing unit 205 while not being subjected to the pre-coding process to the multiplexing unit 207. The pre-coding processing unit 231 performs a pre-coding process on the UE-specific RS which is input from the downlink pilot channel processing unit 205, and outputs the UE-specific RS subjected to the multiplexing unit 207. For example, the pre-coding processing unit 231 performs the pre-coding process of the beamforming process suitable for the mobile station apparatus 5 on the UE-specific RS. For example, the pre-coding processing unit 231 performs the pre-coding process of the random beamforming process on the UE-specific RS. The pre-coding processing unit 231 performs the same process as the process which has been performed on the PDSCH by the pre-coding processing unit 229 and/or the process which has been performed on the second PDCCH by the pre-coding processing unit 227 on the UE-specific RS. More specifically, the pre-coding processing unit 231 performs the pre-coding process on the eCCE signal, and performs the same pre-coding process on UE-specific RS in which the eCCE and the antenna port are associated. Therefore, when the mobile station apparatus 5 demodulates the second PDCCH signal to which the pre-coding process is applied, the UE-specific RS can be used in the estimation of the equalization channel including the fluctuation in the channel (transmission path) in the downlink and the phase rotation by the pre-coding processing unit 227. In other words, it is not necessary for the base station apparatus 3 to notify the mobile station apparatus 5 of information (phase rotation amount) of the pre-coding process by the pre-coding processing unit 227, and the mobile station apparatus 5 can demodulate the signal subjected to the pre-coding process.

The multiplexing unit 207 multiplexes signals which are input from the downlink pilot channel processing unit 205, signals which are input from each physical downlink shared channel processing unit 201, and signals which are input from each physical downlink control channel processing unit 203 into the downlink subframe, according to an instruction from the control unit 105. The control signals regarding the allocation of the DL PRB pair for the PDSCH which is configured by the radio resource control unit 103, the allocation of the resources for the PDCCHs (the first PDCCH and the second PDCCH), and the resource mapping method of eCCE of the second PDCCH are input to the control unit 105, and the control unit 105 controls the process of the multiplexing unit 207 based on the control signal. For example, the multiplexing unit 207 multiplexes the second PDCCH signals to the downlink resource by the eCCE aggregation number which is configured by the radio resource control unit 103. The multiplexing unit 207 outputs the multiplexed signals to the IFFT unit 209.

The IFFT unit 209 performs inverse fast Fourier transform and performs modulation of an OFDM scheme on the signals multiplexed by the multiplexing unit 207, and outputs the signals to the GI insertion unit 211. The GI insertion unit 211 generates a digital signal of a baseband configured with symbols in an OFDM scheme by inserting a guard interval to the signal on which the IFFT unit 209 performs modulation of an OFDM scheme. As known already, the guard interval is generated by replicating a portion of the top or end of the OFDM symbol to be transmitted. The GI insertion unit 211 outputs the generated digital signal of a baseband to the D/A unit 213. The D/A unit 213 converts the digital signal of a baseband which is input from the GI insertion unit 211 into an analog signal and outputs the signals to the transmission RF unit 215. The transmission RF unit 215 generates the in-phase component and the orthogonal component of the intermediate frequency, from the analog signal which is input from the D/A unit 213, and removes the excess frequency component with respect to the intermediate frequency band. Next, the transmission RF unit 215 converts the signals of the intermediate frequency into the signals of a high frequency (up-convert), removes the excess frequency component, amplifies the power, and transmits the signals to the mobile station apparatus 5 through the transmit antenna 111.

<Configuration of Reception Processing Unit 101 of Base Station Apparatus 3>

Hereinafter, the details of the reception processing unit 101 of the base station apparatus 3 will be described. FIG. 3 is a schematic block diagram showing a configuration of the reception processing unit 101 of the base station apparatus 3 according to the embodiment of the present invention. As illustrated in FIG. 3, the reception processing unit 101 is configured to include a reception RF unit 301, an A/D (Analog/Digital converter; analog-to-digital conversion) unit 303, a symbol timing detection unit 309, a GI removing unit 311, a FFT unit 313, a subcarrier demapping unit 315, a channel estimation unit 317, a PUSCH channel equalization unit 319, a PUCCH channel equalization unit 321, an IDFT unit 323, a data demodulation unit 325, a turbo decoding unit 327, a physical uplink control channel detection unit 329, a preamble detection unit 331, and a SRS processing unit 333.

The reception RF unit 301 appropriately amplifies the signals which are received in the receive antenna 109, converts the amplified signals to signals of the intermediate frequency (down-convert), removes the unnecessary frequency component, controls the amplification level so as to appropriately maintain the signal level, and performs orthogonal demodulation, based on the in-phase component and the quadrature-phase component of the received signals. The reception RF unit 301 outputs the analog signal subjected to the orthogonal demodulation, to the A/D unit 303. The A/D unit 303 converts the analog signal subjected to the orthogonal demodulation by the reception RF unit 301 into the digital signal, and outputs the converted digital signal to the symbol timing detection unit 309 and the GI removing unit 311.

The symbol timing detection unit 309 detects the timing of the symbol, based on the signals which are input by the A/D unit 303, and outputs a control signal indicating a timing of the detected symbol boundary to the GI removing unit 311. The GI removing unit 311 removes a portion corresponding to the guard interval from signals which are input by the A/D unit 303, based on the control signal from the symbol timing detection unit 309, and outputs the signal of a remaining part to the FFT unit 313. The FFT unit 313 performs fast Fourier transform on signals which are input from the GI removing unit 311, performs demodulation of a DFT-Spread-OFDM scheme and outputs the signals to the subcarrier demapping unit 315. In addition, the number of points of the FFT unit 313 is the same as the number of points of the IFFT unit of the mobile station apparatus 5 described later.

The subcarrier demapping unit 315 separates the signals demodulated by the NFT unit 313 into a DM RS, a SRS, a signal of the PUSCH and a signal of the PUCCH, based on the control signal which is input from the control unit 105. The subcarrier demapping unit 315 outputs the separated DM RS to the channel estimation unit 317, the separated SRS to the SRS processing unit 333, the separated signals of the PUSCH to the PUSCH channel equalization unit 319, and the separated PUCCH signals to the PUCCH channel equalization unit 321.

The channel estimation unit 317 estimates the change in the channel using the DM RS separated by the subcarrier demapping unit 315 and the known signal. The channel estimation unit 317 outputs the estimated channel estimation value to the PUSCH channel equalization unit 319 and the PUCCH channel equalization unit 321. The PUSCH channel equalization unit 319 equalizes the amplitude and the phase of the PUSCH signal which is separated by the subcarrier demapping unit 315 based on the channel estimation value which is input from the channel estimation unit 317. Here, the equalization represents a process to restore the change in the channel that the signal receives during the wireless communication. The PUSCH channel equalization unit 319 outputs the adjusted signal to the IDFT unit 323.

The IDFT unit 323 performs an inverse discrete Fourier transform on the signals which are input from the PUSCH channel equalization unit 319 and outputs the transformed signals to the data demodulation unit 325. The data demodulation unit 325 demodulates the PUSCH signals which are converted by the IDFT unit 323, and outputs the demodulated PUSCH signal to the turbo decoding unit 327. The demodulation is the demodulation corresponding to a modulation scheme used in the data modulation unit of the mobile station apparatus 5, and the modulation scheme is input by the control unit 105. The turbo decoding unit 327 decodes information data from the PUSCH signal which is input from the data demodulation unit 325 and demodulated. The coding rate is input by the control unit 105.

The PUCCH channel equalization unit 321 equalizes the amplitude and the phase of the PUCCH signal which is separated by the subcarrier demapping unit 315 based on the channel estimation value which is input from the channel estimation unit 317. The PUCCH channel equalization unit 321 outputs the equalized signal to the physical uplink control channel detection unit 329.

The physical uplink control channel detection unit 329 demodulates and decodes the signals which are input from the PUCCH channel equalization unit 321 so as to detect a UCI. The physical uplink control channel detection unit 329 performs separation of the code-multiplexed signals in the frequency domain and/or the time domain. The physical uplink control channel detection unit 329 performs a process to detect the ACK/NACK, the SR, and the CQI from the code-multiplexed PUCCH signals in the frequency domain and/or the time domain, using the code sequence used on the transmission side. Specifically, the physical uplink control channel detection unit 329 multiplies the signal for each subcarrier of the PUCCH by each code of a code sequence and combines signals multiplied by each code, as a detection process using the code sequence in the frequency domain, that is, a process to separate the code-multiplexed signals in the frequency domain. Specifically, the physical uplink control channel detection unit 329 multiplies the signal for each SC-FDMA symbol of the PUCCH by each code of a code sequence and combines signals multiplied by each code, as a detection process using the code sequence in the time domain, that is, a process to separate the code-multiplexed signals in the time domain. In addition, the physical uplink control channel detection unit 329 configures a detection process for the PUCCH signal based on the control signal from the control unit 105.

The SRS processing unit 333 measures the channel quality using the SRS which is input from the subcarrier mapping unit 315 in the subcarrier, and outputs the measurement result of the channel quality of the UL PRB (UL PRB pair) to the control unit 105. The control unit 105 instructs the SRS processing unit 333 from which uplink subframe and from which UL PRB (UL PRB pair) signals are to be measured for the channel quality of the mobile station apparatus 5. Further, the SRS processing unit 333 detects the synchronization deviation of the uplink using the SRS which is input from the subcarrier mapping unit 315 in the subcarrier, and outputs information (synchronization deviation information) indicating the synchronization deviation of the uplink to the control unit 105. In addition, the SRS processing unit 333 may perform a process to detect the synchronization deviation of the uplink from the reception signal in the time domain. The specific process may perform the same process as the process performed in the preamble detection unit 331 described later.

The preamble detection unit 331 performs a process to detect (receive) the preamble transmitted for the reception signal corresponding to the PRACH, based on the signal which is input by the A/D unit 303. Specifically, the preamble detection unit 331 performs a correlation process with the replica signal which may be transmitted and is generated using each preamble sequence, for the reception signals of various timings within the guard time. For example, when the correlation value is higher than a threshold that is configured in advance, the preamble detection unit 331 determines that the same signal as the preamble sequence used in the generation of the replica signal used in the correlation process is transmitted from the mobile station apparatus 5. Then, the preamble detection unit 331 determines the timing having the highest correlation value as the arrival timing of the preamble sequence. Then, the preamble detection unit 331 generates preamble detection information including at least information indicating the detected preamble sequence and information indicating the arrival timing and outputs the information to the control unit 105.

The control unit 105 performs control of the subcarrier demapping unit 315, the data demodulation unit 325, the turbo decoding unit 327, the channel estimation unit 317, and the physical uplink control channel detection unit 329, based on the control information (DCI) which is transmitted to the mobile station apparatus 5 using the PDCCH by the base station apparatus 3 and the control information (RRC signaling) which is transmitted using the PDSCH. Further, the control unit 105 ascertains with which resource (the uplink subframe, the UL PRB (UL PRB pair), the code sequence of the frequency domain, and the code sequence of the time domain) the PRACH, the PUSCH, the PUCCH, and the SRS which have been transmitted (having a possibility of being transmitted) by each mobile station apparatus 5 is configured, based on the control information transmitted to the mobile station apparatus 5 by the base station apparatus 3.

<Overall Configuration of Mobile Station Apparatus 5>

Figure 4:
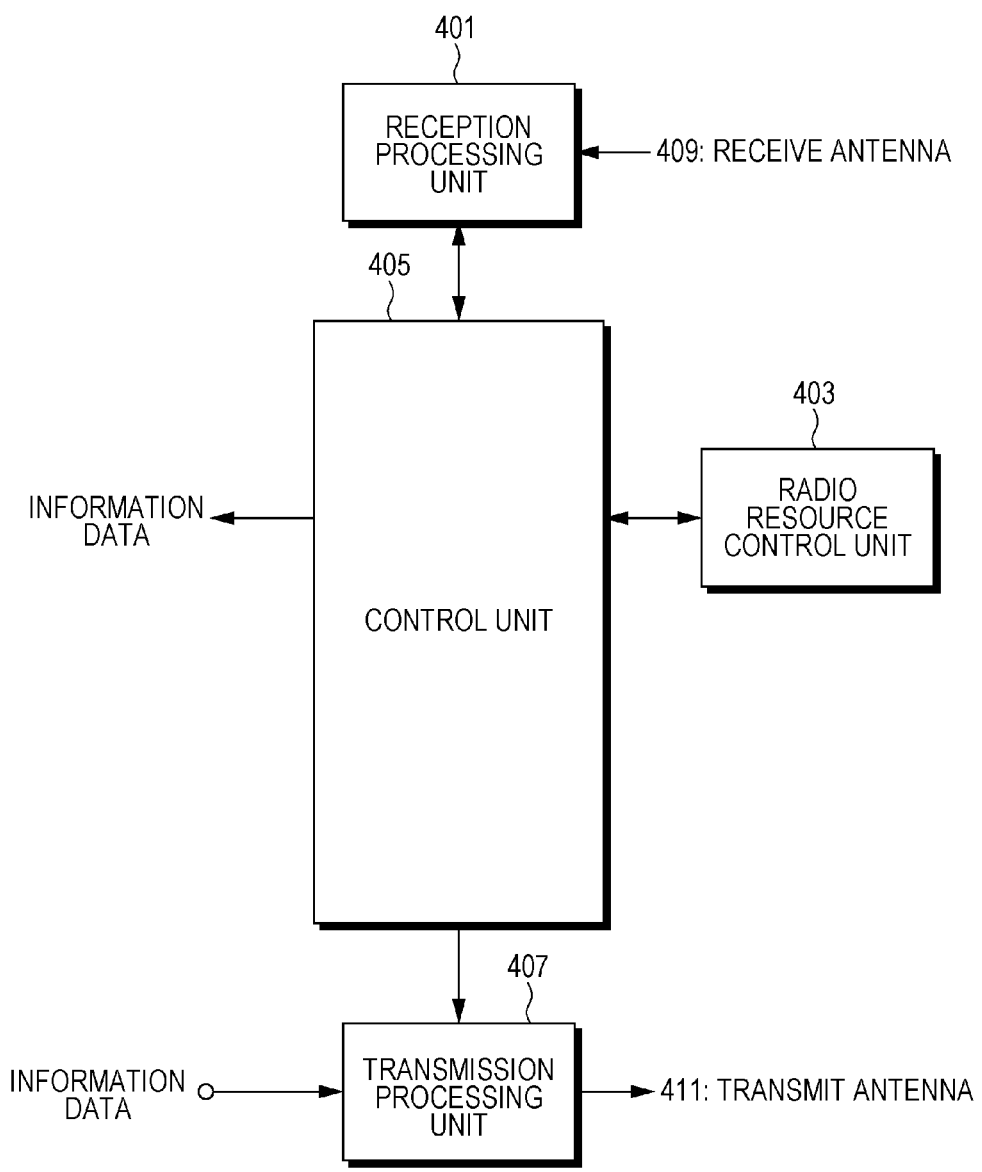
FIG. 4 is a schematic block diagram showing a configuration of a mobile station apparatus 5 according to the embodiment of the present invention.
Figure 5:
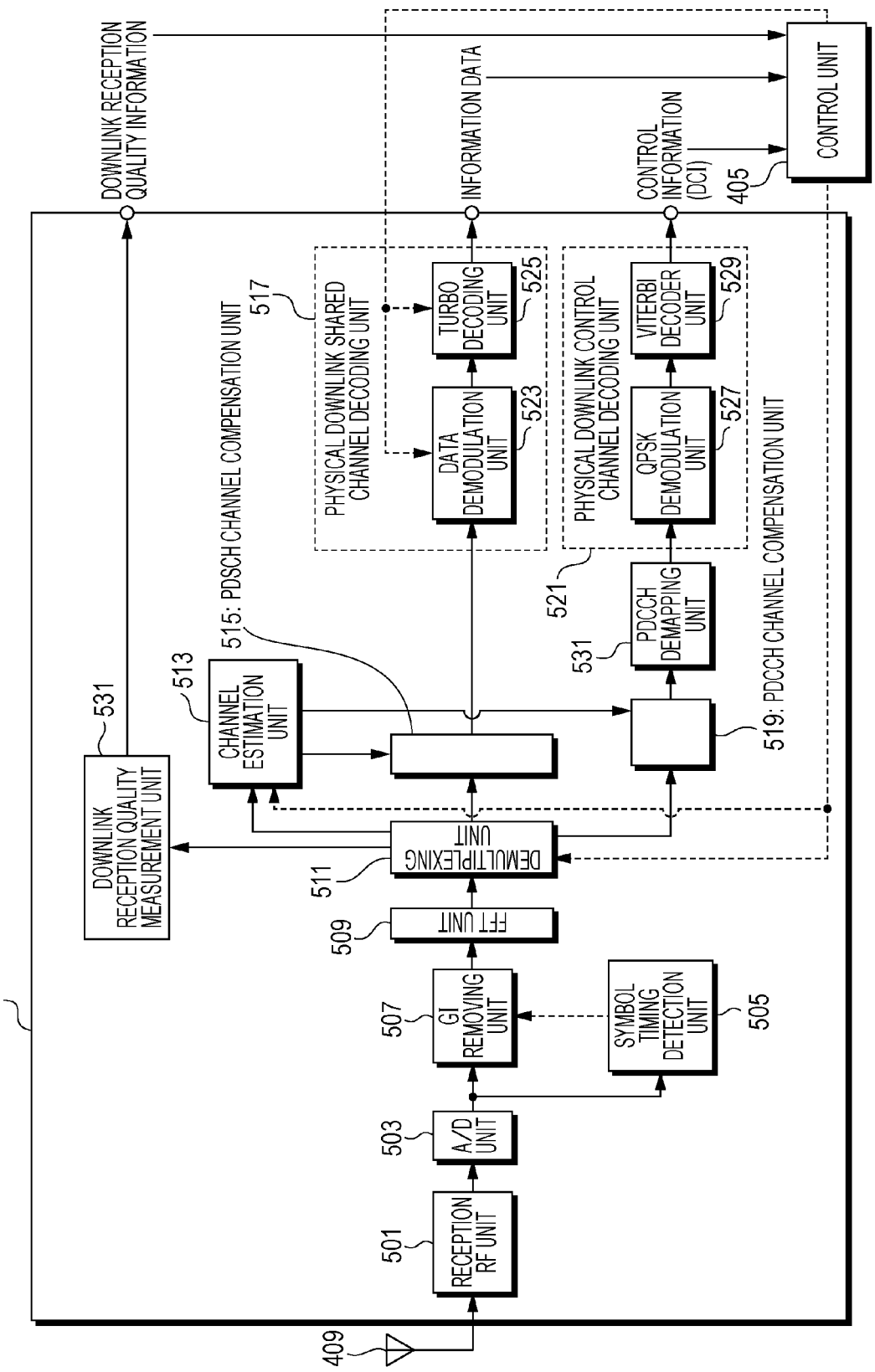
FIG. 5 is a schematic block diagram showing a configuration of a reception processing unit 401 of the mobile station apparatus 5 according to the embodiment of the present invention.

Hereinafter, the configuration of the mobile station apparatus 5 according to the present embodiment will be described using FIGS. 4 to 6. FIG. 4 is a schematic block diagram showing the configuration of a mobile station apparatus 5 according to the embodiment of the present invention. As illustrated in FIG. 4, the mobile station apparatus 5 is configured to include a reception processing unit (a first reception processing unit) 401, a radio resource control unit (a first radio resource control unit) 403, a control unit (a first control unit) 405, and a transmission processing unit (a first transmission processing unit) 407.

The reception processing unit 401 receives signals from the base station apparatus 3, and demodulates and decodes the reception signal according to the instruction of the control unit 405. When the signals of the PDCCH (the first PDCCH and the second PDCCH) addressed to the mobile station apparatus 5 are detected, the reception processing unit 401 outputs the DCI obtained by decoding the PDCCH signal to the control unit 405. For example, the reception processing unit 401 performs a process to detect the second PDCCH addressed to the mobile station apparatus 5 in the search space within the second PDCCH region which is designated from the base station apparatus 3. For example, the reception processing unit 401 performs a process of configuring a search space for the candidate of the eCCE aggregation number and detecting the second PDCCH addressed to the mobile station apparatus 5. For example, the reception processing unit 401 performs estimation of the channel by using the UE-specific RS in the second PDCCH region which is designated by the base station apparatus 3, performs demodulation of the second PDCCH signal, and performs a process of detecting signals including the control information addressed to the mobile station apparatus 5. For example, the reception processing unit 401 performs demodulation of second PDCCH signals by using the UE-specific RS of the antenna port corresponding to eCCEs or eREGs configuring the ePDCCH candidate for performing the detection process.

Further, the reception processing unit 401 outputs information data obtained by decoding the PDSCH addressed to the mobile station apparatus 5 to a higher layer through the control unit 405, based on the instruction of the control unit 405 after the DCI included in the PDCCH is output to the control unit 405. The downlink assignment among the DCI included in the PDCCH includes information indicating the allocation of the PDSCH resource. Further, the reception processing unit 401 outputs the control information, which is obtained by decoding the PDSCH and is generated in the radio resource control unit 103 of the base station apparatus 3, to the control unit 405, and outputs control information to the radio resource control unit 403 of the mobile station apparatus 5 through the control unit 405. For example, the control information generated by the radio resource control unit 103 of the base station apparatus 3 includes information indicating DL PRB pair of the second PDCCH region, information indicating a resource mapping method of eCCE of each second PDCCH region, and information indicating a PUCCH resource offset for each second PDCCH region.

Further, the reception processing unit 401 outputs information indicating the second PDCCH region from which the second PDCCH is detected and information indicating the eCCEs configuring the detected second PDCCH, to the control unit 405.

Further, the reception processing unit 401 outputs the Cyclic Redundancy Check (CRC) code included in the PDSCH to the control unit 405. Although it is not described in the description of the base station apparatus 3, the transmission processing unit 107 of the base station apparatus 3 generates the CRC code from the information data and transmits the information data and the CRC code in the PDSCH. The CRC code is used in the mobile station apparatus 5 to determine whether data that is included in the PDSCH is incorrect, or is not incorrect. For example, when information generated from the data by using a generator polynomial which is determined in advance in the mobile station apparatus 5 and a CRC code which is generated in the base station apparatus 3 and is transmitted in the PDSCH are the same, it is determined that data is not incorrect. When information generated from the data by using a generator polynomial which is determined in advance in the mobile station apparatus 5 and a CRC code which is generated in the base station apparatus 3 and is transmitted in the PDSCH are different, it is determined that data is incorrect.

Further, the reception processing unit 401 measures reception quality of the downlink (Reference Signal Received Power (RSRP)), and outputs the measurement result to the control unit 405. The reception processing unit 401 measures (calculates) the RSRP from the CRS or the CSI-RS, based on the instruction from the control unit 405. The details of the reception processing unit 401 will be described later.

The control unit 405 confirms data which is transmitted from the base station apparatus 3 using the PDSCH, and is input by the reception processing unit 401, outputs the information data among data to the higher layer, and controls the reception processing unit 401 and the transmission processing unit 407, based on the control information generated in the radio resource control unit 103 of the base station apparatus 3 among data. Further, the control unit 405 controls the reception processing unit 401 and the transmission processing unit 407, based on the instruction from the radio resource control unit 403. For example, the control unit 405 controls the reception processing unit 401 so as to perform a process to detect the second PDCCH for the signals within the DL PRB pair of the second PDCCH region which is instructed from the radio resource control unit 403. For example, the control unit 405 controls the reception processing unit 401 so as to perform demapping of the eCCE resource of the second PDCCH region, based on the information indicating a method of eCCE resource mapping of the second PDCCH region which is instructed from the radio resource control unit 403. Here, the demapping of the eCCE resource of the second PDCCH region means, for example, as illustrated in FIGS. 20 and 21, a process of configuring (forming, building, and creating) second PDCCH candidates to be subjected to a detection process from the signals within the second PDCCH region. Further, the control unit 405 controls a region for performing a process to detect the second PDCCH within the second PDCCH region for the reception processing unit 401. Specifically, the control unit 405 indicates (configures) the eCCE aggregation number for configuring the search space for each second PDCCH region, and second PDCCH candidates for performing a process of detecting the second PDCCH in the second PDCCH region, to the reception processing unit 401 for each eCCE aggregation number. Further, the control unit 405 controls the reception processing unit 401 so as to use the UE-specific RS of the antenna port corresponding to the demodulation of each eCCE signal.

The control unit 405 configures the PUCCH resource offset for each second PDCCH region, based on the instruction from the radio resource control unit 403. The control unit 405 determines and selects the resource (PUCCH resource index) of the ACK/NACK PUCCH for transmitting the ACK/NACK for the PDSCH of which resource allocation is performed by the second PDCCH, based on the information indicating the second PDCCH region from which the second PDCCH is detected, information indicating eCCE (eCCE index), and a PUCCH resource offset for each second PDCCH region which is configured, which are input from the reception processing unit 401 so as to control the transmission processing unit 407.

Further, the control unit 405 controls the reception processing unit 401 and the transmission processing unit 407, based on the DCI which is transmitted from the base station apparatus 3 by using the PDCCH and input by the reception processing unit 401. Specifically, the control unit 405 controls the reception processing unit 401 mainly based on the detected downlink assignment, and controls the transmission processing unit 407 mainly based on the detected uplink grant. Further, the control unit 405 controls the transmission processing unit 407, based on the control information indicating the transmission power control command of the PUCCH included in the downlink assignment. The control unit 405 compares information generated by using a generator polynomial which is determined in advance from the data which is input from the reception processing unit 401 with a CRC code which is input from the reception processing unit 401, determines whether data is incorrect or not, and generates ACK/NACK. The generated ACK/NACK is transmitted from the transmission processing unit 407. Further, the control unit 405 generates SR and CQI, based on the instruction from the radio resource control unit 403. Further, the control unit 405 controls the transmission timing of the signal of the transmission processing unit 407, based on the adjustment value of the uplink transmission timing that has been notified from the base station apparatus 3. Further, the control unit 405 controls the transmission processing unit 407 so as to transmit the information indicating the reception quality (RSRP) of the downlink which is input by the reception processing unit 401.

The radio resource control unit 403 stores and holds control information which is generated in the radio resource control unit 103 of the base station apparatus 3, and notified by the base station apparatus 3, and performs control of the reception processing unit 401 and the transmission processing unit 407 through the control unit 405. In other words, the radio resource control unit 403 has a memory function of holding various parameters. For example, the radio resource control unit 403 holds information regarding the DL PRB pair of the second PDCCH region, information regarding the resource mapping method of eCCE of the second PDCCH region, and information regarding a PUCCH resource offset for each second PDCCH region, and outputs various control signals to the control unit 405. The radio resource control unit 403 holds parameters related to the transmission power of the PUSCH, the PUCCH, the SRS, and the PRACH, and outputs the control signal to the control unit 405 so as to use the parameters notified by the base station apparatus 3.

The radio resource control unit 403 sets values of parameters related to the transmission power such as the PUCCH, the PUSCH, the SRS, and the PRACH. The value of transmission power which is configured in the radio resource control unit 403 is output by the control unit 405 to the transmission processing unit 407. In addition, the DM RS configured with the resource within the same UL PRB as the PUCCH is subjected to the same transmission power control as the PUCCH. In addition, the DM RS configured with the resource within the same UL PRB as the PUSCH is subjected to the same transmission power control as the PUSCH. The radio resource control unit 403 sets values such as a parameter based on the number of UL PRB pairs allocated to the PUSCH, the cell-specific and mobile station apparatus-specific parameters which are notified in advance by the base station apparatus 3, a parameter based on the modulation scheme used in the PUSCH, a parameter based on the estimated path-loss value, and a parameter based on the transmission power control command notified by the base station apparatus 3, for the PUSCH. The radio resource control unit 403 sets values such as a parameter based on the signal configuration of PUCCH, the cell-specific and mobile station apparatus-specific parameters which are notified in advance by the base station apparatus 3, a parameter based on the estimated path-loss value, and a parameter based on the notified transmission power control command, for the PUCCH.

In addition, as parameters related to the transmission power, the cell-specific and mobile station apparatus-specific parameters are notified by the base station apparatus 3 using the PDSCH, and the transmission power control command is notified by the base station apparatus 3 using the PDCCH. The transmission power control command for the PUSCH is included in the uplink grant, and the transmission power control command for the PUCCH is included in the downlink assignment. In addition, various parameters which are notified by the base station apparatus 3 and related to the transmission power are appropriately stored in the radio resource control unit 403, and the stored value is input to the control unit 405.

The transmission processing unit 407 transmits signals obtained by coding and modulating the information data and the UCI, using the resources of the PUSCH and the PUCCH, to the base station apparatus 3 through the transmit antenna 411, according to the instruction of the control unit 405. Further, the transmission processing unit 407 sets the transmission power of each of the PUSCH, the PUCCH, the SRS, the DM RS, and the PRACH according to an instruction of the control unit 405. The details of the transmission processing unit 407 will be described later.

<Reception Processing Unit 401 of Mobile Station Apparatus 5>

Hereinafter, the details of the reception processing unit 401 of the mobile station apparatus 5 will be described. FIG. 5 is a schematic block diagram showing a configuration of a reception processing unit 401 of the mobile station apparatus 5 according to the embodiment of the present invention. As illustrated in FIG. 5, the reception processing unit

401 is configured to include a reception RF unit 501, an A/D unit 503, a symbol timing detection unit 505, a GI removing unit 507, a FFT unit 509, a demultiplexing unit 511, a channel estimation unit 513, a PDSCH channel compensation unit 515, a physical downlink shared channel decoding unit 517, a PDCCH channel compensation unit 519, a physical downlink control channel decoding unit 521, a downlink reception quality measurement unit 531, and a PDCCH demapping unit 533. Further, as illustrated in FIG. 5, the physical downlink shared channel decoding unit 517 includes a data demodulation unit 523 and a turbo decoding unit 525. Further, as illustrated in FIG. 5, the physical downlink control channel decoding unit 521 includes a QPSK demodulation unit 527 and a Viterbi decoder unit 529.

The reception RF unit 501 appropriately amplifies the signals which are received in the receive antenna 409, converts the amplified signals to signals of the intermediate frequency (down-convert), removes the unnecessary frequency component, controls the amplification level so as to appropriately maintain the signal level, and performs orthogonal demodulation, based on the in-phase component and the quadrature-phase component of the received signals. The reception RF unit 501 outputs the analog signal subjected to the orthogonal demodulation, to the A/D unit 503.

The A/D unit 503 converts the analog signal subjected to the orthogonal demodulation by the reception RF unit 501 into the digital signal, and outputs the converted digital signal to the symbol timing detection unit 505 and the GI removing unit 507. The symbol timing detection unit 505 detects the timing of the symbol, based on the digital signal which is converted by the A/D unit 503, and outputs a control signal indicating the detected timing of the symbol boundary to the GI removing unit 507. The GI removing unit 507 removes the portion corresponding to the guard interval from the digital signal which is output by the A/D unit 503, based on the control signal from the symbol timing detection unit 505, and outputs the signals of the remaining parts to the FFT unit 509. The FFT unit 509 performs fast Fourier transform and a demodulation of an OFDM scheme on the signals which are input from the GI removing unit 507, and outputs the signals to the demultiplexing unit 511.

The demultiplexing unit 511 separates the signals demodulated by the FFT unit 509 into a signal of the PDCCH (first PDCCH and the second PDCCH) and the signal of the PDSCH, based on the control signal which is input from the control unit 405. The demultiplexing unit 511 outputs the separated signals of the PDSCH to the PDSCH channel compensation unit 515, and outputs separated signals of the PDCCH to the PDCCH channel compensation unit 519. For example, the demultiplexing unit 511 outputs the signals of the second PDCCH of the second PDCCH region which is designated to the mobile station apparatus 5, to the PDCCH channel compensation unit 519. Further, the demultiplexing unit 511 separates the downlink resource element in which the downlink reference signal is allocated, and outputs the downlink reference signal (CRS and UE-specific RS) to the channel estimation unit 513. For example, the demultiplexing unit 511 outputs the UE-specific RS of the second PDCCH region designated to the mobile station apparatus 5, to the channel estimation unit 513. Further, the demultiplexing unit 511 outputs the downlink reference signal (CRS and CSI-RS) to the downlink reception quality measurement unit 531.

The channel estimation unit 513 estimates the change in the channel by using the downlink reference signal separated by the demultiplexing unit 511 and known signals, and outputs the channel compensation value for adjusting the amplitude and the phase in order to compensate for the change in the channel, to the PDSCH channel compensation unit 515 and the PDCCH channel compensation unit 519. The channel estimation unit 513 estimates independently the change in the channel by respectively using the CRS and the UE-specific RS, and outputs the estimated change. For example, the channel estimation unit 513 generates a channel compensation value from the channel estimation value which is estimated by using the UE-specific RS allocated in a plurality of DL PRB pairs within the second PDCCH region designated to the mobile station apparatus 5, and outputs the generated value to the PDCCH channel compensation unit 519. Further, the channel estimation unit 513 performs the channel estimation and the generation of channel compensation value, by using the UE-specific RS for each of one or more antenna ports which are designed from the control unit 405. For example, the channel estimation unit 513 generates a channel compensation value from the channel estimation value which is estimated by using the UE-specific RS which is allocated to the mobile station apparatus 5 and allocated in a plurality of DL PRB pairs allocated to PDSCH, and outputs the generated value to the PDSCH channel compensation unit 515. For example, the channel estimation unit 513 generates a channel compensation value from the channel estimation value which is estimated using the CRS, and outputs the generated value to the PDCCH channel compensation unit 519. For example, the channel estimation unit 513 generates a channel compensation value from the channel estimation value which is estimated using the CRS, and outputs the generated value to the PDSCH channel compensation unit 515.

The PDSCH channel compensation unit 515 adjusts the amplitude and the phase of the PDSCH signals which are separated by the demultiplexing unit 511 according to the channel compensation value which is input from the channel estimation unit 513. For example, the PDSCH channel compensation unit 515 adjusts the signals of a certain PDSCH according to the channel compensation value generated based on the UE-specific RS in the channel estimation unit 513, and adjusts the signals of a different PDSCH according to the channel compensation value generated based on the CRS in the channel estimation unit 513. The PDSCH channel compensation unit 515 outputs the signals of which channel is adjusted to the data demodulation unit 523 of the physical downlink shared channel decoding unit 517.

The physical downlink shared channel decoding unit 517 performs demodulation and decoding of the PDSCH, based on the instruction from the control unit 405 and detects information data. The data demodulation unit 523 performs demodulation of the signals of the PDSCH which are input from the channel compensation unit 515, and outputs the demodulated signals of the PDSCH to the turbo decoding unit 525. The demodulation is a demodulation corresponding to the modulation scheme used in the data modulation unit 221 of the base station apparatus 3. The turbo decoding unit 525 decodes information data from the demodulated signals of the PDSCH which are input from the data demodulation unit 523, and outputs the decoded information data to the higher layer through the control unit 405. In addition, control information which is transmitted using the PDSCH and is generated in the radio resource control unit 103 of the base station apparatus 3, and the like is output to the control unit 405, and is output also to the radio resource control unit 403 through the control unit 405. In addition, the CRC code included in the PDSCH is also output to the control unit 405.

The PDCCH channel compensation unit 519 adjusts the amplitude and the phase of the PDCCH signals which are separated by the demultiplexing unit 511 according to the channel compensation value which is input from the channel estimation unit 513. For example, the PDCCH channel compensation unit 519 adjusts the signals of the second PDCCH according to the channel compensation value generated based on the UE-specific RS in the channel estimation unit 513, and adjusts the signals of the first PDCCH according to the channel compensation value generated based on the CRS in the channel estimation unit 513. For example, the PDCCH channel compensation unit 519 adjusts the eCCE signals, according to the channel compensation value which has been generated based on the UE-specific RS of the antenna port corresponding to the eCCE. For example, PDCCH channel compensation unit 519 adjusts the eCCE signals, according to the channel compensation value which has been generated based on the UE-specific RS of the antenna port corresponding to the eREG configuring the eCCE. The PDCCH channel compensation unit 519 outputs the adjusted signals to the PDCCH demapping unit 533.

The PDCCH demapping unit 533 performs a demapping for the first PDCCH or a demapping for the second PDCCH, on the signals which are input from the PDCCH channel compensation unit 519. In addition, the PDCCH demapping unit 533 performs a demapping for the Localized mapping or a demapping for the Distributed mapping on the signals of the second PDCCH which are input from the PDCCH channel compensation unit 519. The PDCCH demapping unit 533 converts the signals of the first PDCCH which are input into signals in a unit of a CCE as described using FIG. 17 such that a process in a unit of a CCE illustrated in FIG. 16 is performed for the signals of the first PDCCH which are input, in the physical downlink control channel decoding unit 521. The PDCCH demapping unit 533 converts the signals of the second PDCCH which are input into signals in a unit of the eCCE such that a process in a unit of the eCCE illustrated in FIG. 19 is performed for the signals of the second PDCCH which are input, in the physical downlink control channel decoding unit 521. The PDCCH demapping unit 533 converts the signals of the second PDCCH of the second PDCCH region, which are input, and to which the Localized mapping is applied into signals of a unit of the eCCE, as described using FIG. 20. The PDCCH demapping unit 533 converts the signals of the second PDCCH of the second PDCCH region, which are input, to which the Distributed mapping is applied into signals of a unit of the eCCE, as described using FIG. 21. The PDCCH demapping unit 533 outputs the converted signals to the QPSK demodulation unit 527 of the physical downlink control channel decoding unit 521.

The physical downlink control channel decoding unit 521 performs demodulation and decoding on the signals which are input from the PDCCH channel compensation unit 519 as below, and detects the control data. The QPSK demodulation unit 527 performs QPSK demodulation on the signals of the PDCCH, and outputs the signals to the Viterbi decoder unit 529. The Viterbi decoder unit 529 decodes the signals demodulated by the QPSK demodulation unit 527, and outputs the decoded DCI to the control unit 405. Here, the signal is represented in a unit of a bit, and the Viterbi decoder unit 529 performs a rate dematching for adjusting the number of bits for performing a Viterbi decoding process on the input bits. In addition, when the detected control data is output to the control unit 405, the physical downlink control channel decoding unit 521 outputs the information indicating the region of the second PDCCH from which the control data is detected and information indicating the eCCE to the control unit 405.

First, a detection process for the first PDCCH will be described. The mobile station apparatus 5 assumes a plurality of CCE aggregation numbers, and performs a process to detect a DCI addressed to the mobile station apparatus 5. The mobile station apparatus 5 performs a different decoding process on the signal of the first PDCCH for each assumed CCE aggregation number (coding rate), and obtains a DCI included in the first PDCCH in which an error is not detected in the CRC code added to the first PDCCH with the DCI. Such a process is referred to as a blind decoding. In addition, the mobile station apparatus 5 does not perform the blind decoding in which the first PDCCH is assumed on the signals (reception signals) of all CCEs (REG) of the downlink system band but performs the blind decoding on only some CCE. Some CCE (CCEs) on which the blind decoding is performed is referred to as a search space (search space for the first PDCCH). Further, different search spaces (search space for the first PDCCH) are defined for each CCE aggregation number. In the communication system 1 according to an embodiment of the present invention, respective different search spaces (search space for first PDCCH) are configured for the first PDCCH in the mobile station apparatus 5. Here, the search space (search space for the first PDCCH) for the first PDCCH of each mobile station apparatus 5 may be configured with all different CCE (CCEs), may be configured with all the same CCE (CCEs), and may be configured with a partially overlapping CCE (CCEs).

Next, a detection process for the second PDCCH will be described. The mobile station apparatus 5 assumes a plurality of eCCE aggregation numbers, and performs a process to detect a DCI addressed to the mobile station apparatus 5. The mobile station apparatus 5 performs a different decoding process on the signal of the second PDCCH for each assumed eCCE aggregation number (coding rate), and obtains a DCI included in the second PDCCH in which an error is not detected in the CRC code added to the second PDCCH with the DCI. Such a process is referred to as a blind decoding. In addition, the mobile station apparatus 5 does not perform the blind decoding in which the second PDCCH is assumed on the signals of all eCCEs (reception signal) of the second PDCCH region configured by the base station apparatus 3, but performs the blind decoding on only some eCCEs. Some eCCE (eCCEs) on which the blind decoding is performed is referred to as a search space (search space for the second PDCCH). Further, different search spaces (search space for the second PDCCH) are defined for each eCCE aggregation number. In the mobile station apparatus 5 in which a plurality of second PDCCH regions are configured, the search spaces are configured (configured and defined) in respective configured second PDCCH regions. In the mobile station apparatus 5, the search spaces are configured for the second PDCCH region to which the Distributed mapping is applied and the second PDCCH region to which the Localized mapping is applied. In the mobile station apparatus 5 in which a plurality of second PDCCH regions are configured, a plurality of search spaces are simultaneously configured in a certain downlink subframe.

In the communication system 1 according to an embodiment of the present invention, with respect to the second PDCCH, a plurality of different search spaces (search space for the second PDCCH) are configured in the mobile station apparatus 5. Here, the search space (search space for the second PDCCH) for the second PDCCH of each mobile station apparatus 5 in which the same second PDCCH region is configured may be configured with all different eCCE (eCCEs), may be configured with all the same eCCE (eCCEs), and may be configured with a partially overlapping eCCE (eCCEs).

In the mobile station apparatus 5 in which a plurality of second PDCCH regions are configured, search spaces (search space for the second PDCCH) are configured in each second PDCCH region. The search space (search space for the second PDCCH) means a logical region in which the mobile station apparatus 5 performs decoding detection of the second PDCCH within the second PDCCH region. The search space (search space for the second PDCCH) is configured with a plurality of second PDCCH candidates. The second PDCCH candidates are to be subjected to the decoding detection of the second PDCCH by the mobile station apparatus 5. For each eCCE aggregation number, different second PDCCH candidates are configured with different eCCEs (including one eCCE and a plurality of eCCEs). For example, the base station apparatus 3 notifies the mobile station apparatus 5 of the eCCE or the second PDCCH candidate used in the search space (search space for the second PDCCH), using RRC signaling.

The number of second PDCCH candidates may be different in respective search spaces of a plurality of second PDCCH regions. Further, in a certain eCCE aggregation number, the number of second PDCCH candidates of the search space of respective second PDCCH regions may be the same, and in a different eCCE aggregation number, the number of second PDCCH candidates of the search space of respective second PDCCH regions may be different. Further, the second PDCCH candidate of a certain eCCE aggregation number may be configured in the search space of one second PDCCH region, and may not be configured in the search space of the other second PDCCH region. Further, the number of second PDCCH candidates of the search space in one second PDCCH region may vary depending on the number of second PDCCH regions configured in the mobile station apparatus 5.

In addition, the control unit 405 determines whether the DCI which is input from the Viterbi decoder unit 529 has no error and is a DCI addressed to the mobile station apparatus 5 or not, and when it is determined that there is no error and it is the DCI addressed to the mobile station apparatus 5, the control unit 405 controls the demultiplexing unit 511, the data demodulation unit 523, the turbo decoding unit 525, and the transmission processing unit 407, based on the DCI. For example, when the DCI is downlink assignment, the control unit 405 controls the reception processing unit 401 so as to decode the signal of the PDSCH. In addition, similar to the PDSCH, even in the PDCCH, a CRC code is included and the control unit 405 determines whether the DCI of the PDCCH has an error or not using the CRC code.

The downlink reception quality measurement unit 531 measures reception quality (RSRP) of the downlink of the cell, using the downlink reference signal (CRS and CSI-RS), and outputs the measured reception quality information of the downlink to the control unit 405. Further, the downlink reception quality measurement unit 531 performs temporary channel quality measurement for generating the CQI to be notified to the base station apparatus 3 in the mobile station apparatus 5. The downlink reception quality measurement unit 531 outputs information such as the measured RSRP to the control unit 405.

<Transmission Processing Unit 407 of Mobile Station Apparatus 5>

Figure 6:
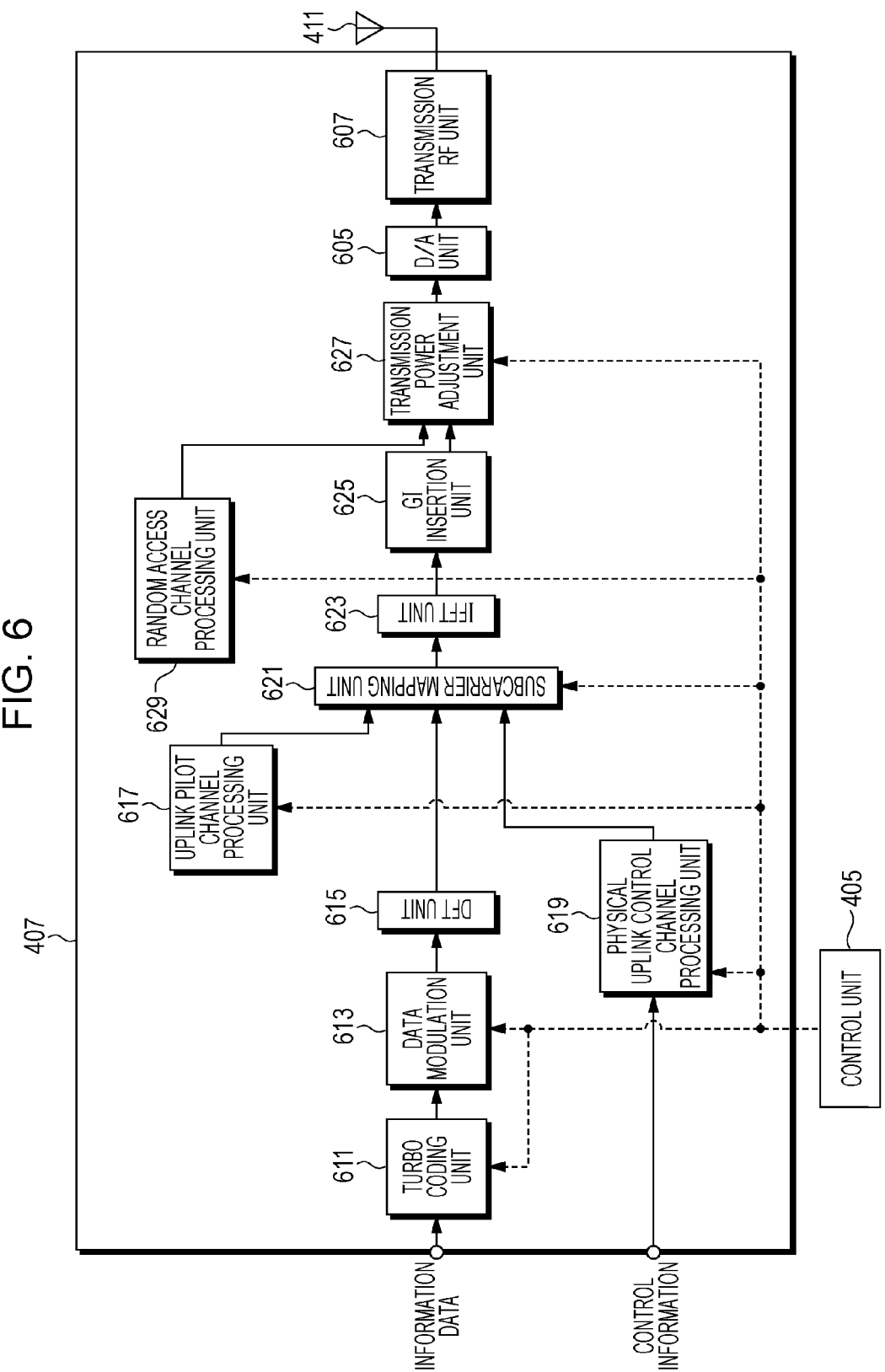
FIG. 6 is a schematic block diagram showing a configuration of a transmission processing unit 407 of the mobile station apparatus 5 according to the embodiment of the present invention.

FIG. 6 is a schematic block diagram showing a configuration of a transmission processing unit 407 of the mobile station apparatus 5 according to the embodiment of the present invention. As illustrated in FIG. 6, the transmission processing unit 407 is configured to include a turbo coding unit 611, a data modulation unit 613, a DFT unit 615, an uplink pilot channel processing unit 617, a physical uplink control channel processing unit 619, a subcarrier mapping unit 621, an IFFT unit 623, a GI insertion unit 625, a transmission power adjustment unit 627, a random access channel processing unit 629, a D/A unit 605, a transmission RF unit 607, and a transmit antenna 411. The transmission processing unit 407 performs coding and modulation on the information data and the UCI, generates signals to be transmitted using the PUSCH and the PUCCH, and adjusts transmission power of the PUSCH and the PUCCH. The transmission processing unit 407 generates signals using the PRACH, and adjusts transmission power of the PRACH. The transmission processing unit 407 generates a DM RS and a SRS, and adjusts transmission power of the DM RS and the SRS.

The turbo coding unit 611 performs a turbo coding for enhancing error tolerance of the data on the information data which is input in a coding rate which is instructed from the control unit 405, and output the information data to the data modulation unit 613. The data modulation unit 613 modulates the code data which is coded by the turbo coding unit 611 by a modulation scheme which is instructed from the control unit 405, for example, modulation schemes such as the QPSK, the 16QAM, and the 64QAM, and generates a signal sequence of modulation symbols. The data modulation unit 613 outputs the generated signal sequence of modulation symbols to the DFT unit 615. The DFT unit 615 performs a discrete Fourier transform on the signals which are output by the data modulation unit 613 and outputs the transformed signals to the subcarrier mapping unit 621.

The physical uplink control channel processing unit 619 performs a baseband signal process for transmitting a UCI which is input from the control unit 405. The UCI which is input to the physical uplink control channel processing unit 619 is the ACK/NACK, the SR, and the CQI. The physical uplink control channel processing unit 619 outputs the generated signals to the subcarrier mapping unit 621 while being subjected to the baseband signal process. The physical uplink control channel processing unit 619 generates signals by coding the information bit of the UCI.

Further, the physical uplink control channel processing unit 619 performs a signal process related to the code multiplexing of the frequency domain and/or the code multiplexing of the time domain on the signals generated from the UCI. For example, the UL PRB pair, the code sequence in the frequency domain, and the code sequence in the time domain, which are used for signals generated from the ACK/NACK are indicated to the physical uplink control channel processing unit 619 from the control unit 405. The physical uplink control channel processing unit 619 multiplies the signal of the PUCCH generated from the information bit of ACK/NACK, the information bit of SR, or the information bit of CQI by a code sequence instructed from the control unit 405 in order to realize a code multiplexing of the frequency domain. The physical uplink control channel processing unit 619 multiplies the signal of the PUCCH generated from the information bit of ACK/NACK, or the information bit of SR, by a code sequence instructed from the control unit 405 in order to realize a code multiplexing of the time domain.

The uplink pilot channel processing unit 617 generates the SRS and the DM RS which are known signals in the base station apparatus 3 based on the instruction from the control unit 405, and outputs the generated signals to the subcarrier mapping unit 621.

The subcarrier mapping unit 621 places the signals which are input from the uplink pilot channel processing unit 617, the signals which are input from the DFT unit 615, and the signals which are input from the physical uplink control channel processing unit 619 in the subcarrier according to the instruction from the control unit 405 so as to be output to the IFFT unit 623.

The IFFT unit 623 performs inverse fast Fourier transform on the signals which are output by the subcarrier mapping unit 621, and outputs the signals to the GI insertion unit 625. Here, the number of points of the IFFT unit 623 is greater than the number of points of the DFT unit 615. The mobile station apparatus 5 performs demodulation of a DFT-Spread-OFDM scheme on signals which are transmitted using the PUSCH, by using the DFT unit 615, the subcarrier mapping unit 621, and the IFFT unit 623. The GI insertion unit 625 adds the guard interval to the signals which are input from the IFFT unit 623, and outputs the signals to the transmission power adjustment unit 627.

The random access channel processing unit 629 generates signals transmitted on the PRACH by using a preamble sequence instructed from the control unit 405, and outputs the generated signals to the transmission power adjustment unit 627.

The transmission power adjustment unit 627 adjusts the transmission power of the signals which are input from the GI insertion unit 625 or the signals which are input from the random access channel processing unit 629, based on the control signal from the control unit 405, and outputs the adjusted power to the D/A unit 605. In addition, the transmission power adjustment unit 627 controls average transmission power of each of the PUSCH, the PUCCH, the DM RS, the SRS, and the PRACH for each uplink subframe.

The D/A unit 605 converts the digital signal of a baseband which is input from the transmission power adjustment unit 627 into an analog signal and outputs the signals to the transmission RF unit 607. The transmission RF unit 607 generates the in-phase component and the quadrature-phase component of the intermediate frequency, from the analog signal which is input from the D/A unit 605, and removes the excess frequency component with respect to the intermediate frequency band. Next, the transmission RF unit 607 converts the signals of the intermediate frequency into the signals of a high frequency (up-convert), removes the excess frequency component, amplifies the power, and transmits the signals to the base station apparatus 3 through the transmit antenna 411.

Figure 7:
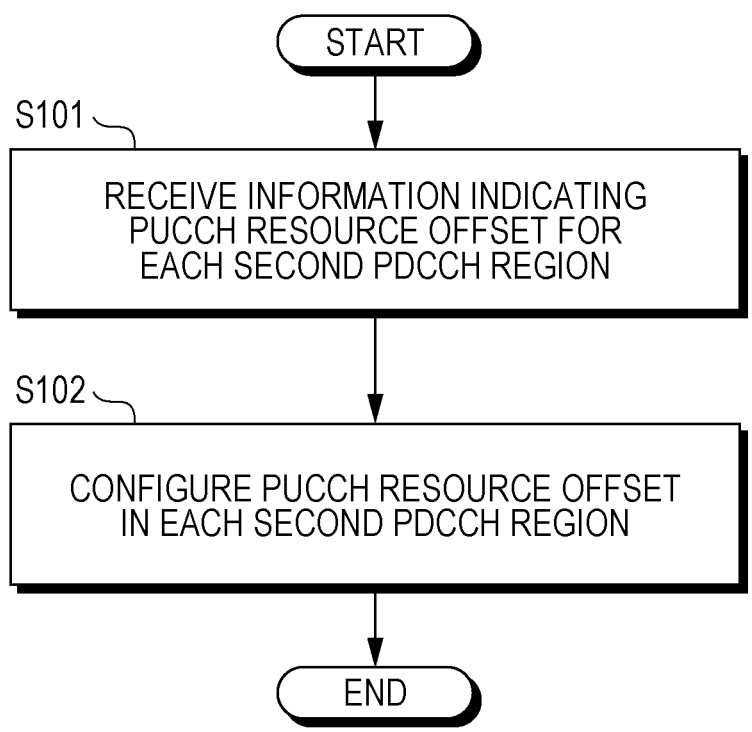
FIG. 7 is a flowchart showing an example of a process regarding a configuration of a PUCCH resource offset for each second PDCCH region of the mobile station apparatus 5 according to the embodiment of the present invention.

FIG. 7 is a flowchart showing an example of a process regarding a configuration of a PUCCH resource offset for each second PDCCH region of the mobile station apparatus 5 according to the embodiment of the present invention. The mobile station apparatus 5 receives information indicating a PUCCH resource offset for each second PDCCH region by using RRC signaling from the base station apparatus 3 (step S101). Next, the mobile station apparatus 5 configures a PUCCH resource offset for each second PDCCH region, based on the information received from the base station apparatus 3 (step S102).

Figure 8:
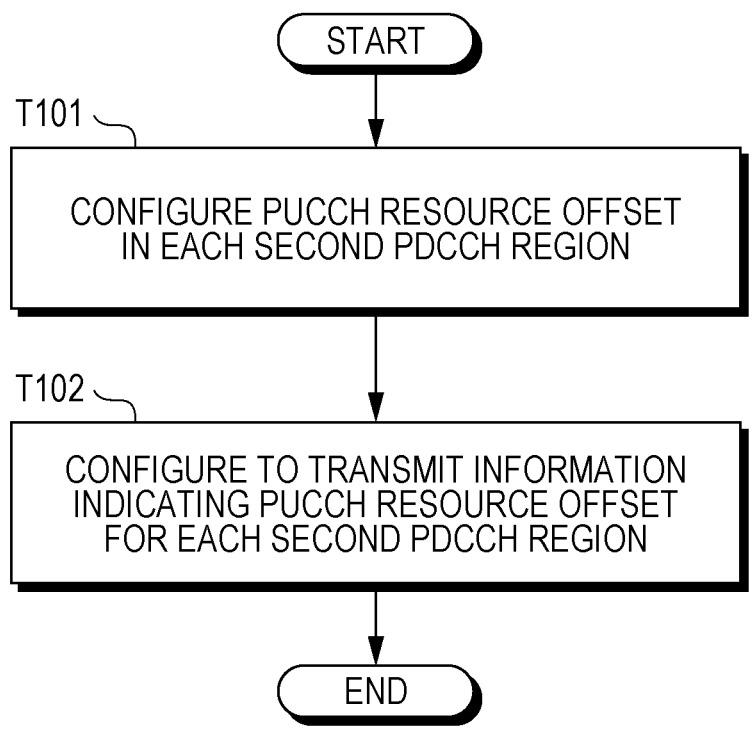
FIG. 8 is a flowchart showing an example of a process regarding a configuration of a PUCCH resource offset for each second PDCCH region of the base station apparatus 3 according to the embodiment of the present invention.

FIG. 8 is a flowchart showing an example of a process regarding a configuring of PUCCH resource offset for each second PDCCH region of the base station apparatus 3 according to the embodiment of the present invention. The base station apparatus 3 configures PUCCH resource offset for each second PDCCH region, based on the number of second PDCCH regions within a cell (step T101). Next, the base station apparatus 3 configures such that information indicating PUCCH resource offset for each second PDCCH region is transmitted to each mobile station apparatus 5 (step T102).

As described above, in the embodiments of the present invention, in the communication system 1, a plurality of physical resource block pairs (DL PRB pairs) are configured as a downlink control channel region (second PDCCH region) (ePDCCH region) (ePDCCH set) in which a downlink control channel (second PDCCH) (ePDCCH) may be allocated, a first element (eREG) is configured with a plurality of (for example, 16) resources into which one physical resource block pair (DL PRB pair) is divided, a second element (eCCE) is configured with an aggregation (Localized mapped eCCE) of a plurality of (for example, 4) first elements (eREG) within one physical resource block pair (DL PRB pair) or an aggregation (Distributed mapped eCCE) of a plurality of (for example, 4) first elements (eREG) within a plurality of (for example, 4) physical resource block pairs (DL PRB pair), a downlink control channel (second PDCCH) is configured with an aggregation of one or more second elements (eCCE) (for example, an aggregation of 1, 2, 4, or 8 second elements), the resource of an uplink control channel (PUCCH) corresponds to each of second elements (eCCE), and the base station apparatus 3 configures a plurality of downlink control channel regions (second PDCCH regions), the base station apparatus 3 configures the resource (PUCCH resource offset) of the uplink control channel in which the association with the second element (eCCE) of the downlink control channel region (second PDCCH region) is started for each downlink control channel region (second PDCCH region), the base station apparatus 3 transmits the configured information to the mobile station apparatus 5, the mobile station apparatus 5 configures a plurality of downlink control channel regions (second PDCCH regions) based on the information received from the base station apparatus 3, the mobile station apparatus 5 configures the resource (PUCCH resource offset) of the uplink control channel in which the association with the second element (eCCE) of the downlink control channel region (second PDCCH region) is started for each downlink control channel region (second PDCCH region), based on information received from the base station apparatus 3, for each downlink control channel region (second PDCCH region) which is configured. The mobile station apparatus 5 determines the identification number (PUCCH resource index) of resources of an uplink control channel (PUCCH) used in transmission of reception confirmation acknowledgement (ACK/NACK) for the data (transport block) of the received downlink shared channel (PDSCH), based on the identification number (eCCE index) of one or more second elements (eCCEs) configuring a downlink control channel (second PDCCH) including information of resource allocation of a downlink shared channel (PDSCH), and a resource (PUCCH resource offset) of an uplink control channel (PUCCH) in which the association with the second element (eCCE) of the downlink control channel region (second PDCCH region) from which the downlink control channel (second PDCCH) is detected is started.

Thus, it is possible to configure and use the PUCCH resource offset for each second PDCCH region, such that it is possible to use different ACK/NACK PUCCH resources for the eCCEs of different second PDCCH regions, and prevent the different mobile station apparatuses for which the PDSCHs are allocated to the second PDCCH in different second PDCCH regions from using the same ACK/NACK PUCCH resource, in other words, it is possible to avoid the collision of the uplink signals between the mobile station apparatuses 5. Further, the base station apparatus 3 can appropriately control the ACK/NACK PUCCH resources for dynamic ACK/NACK which are prepared in the uplink system band according to the number of second PDCCH regions configured for a plurality of mobile station apparatuses 5, and avoid an increase in the overhead on the ACK/NACK PUCCH of the uplink system band. If the eCCEs of the second PDCCH region configured with DL PRB pairs are determined in advance according to the DL PRB pairs which are physically configured, and different ACK/NACK PUCCH resources are prepared for the eCCEs of the second PDCCH region configured with DL PRB pairs which may all be DL PRB pairs, the collision of the ACK/NACK signals between the mobile station apparatuses 5 is avoided, but the overhead on the ACK/NACK PUCCH of the uplink system band is increased significantly. By using the embodiment of the present invention, it is possible to avoid the collision of ACK/NACK signals between the mobile station apparatuses 5, while avoiding an increase in uplink overhead.

In addition, in the embodiment of the present invention, a configuration has been described in which information indicating a PUCCH resource offset for each second PDCCH region is explicitly and directly notified to the mobile station apparatus 5 from the base station apparatus 3 by using RRC signaling, but a configuration may be used in which a PUCCH resource offset for each second PDCCH region is associated with the other information and the PUCCH resource offset for each second PDCCH region is determined based on the other information in the mobile station apparatus 5. For example, a number is given to the second PDCCH region, a PUCCH resource offset is associated with the second PDCCH region number, and the PUCCH resource offset for the second PDCCH region is determined based on the number of the second PDCCH region in the mobile station apparatus 5. Here, with respect to the second PDCCH region number, a common number is used in an area managed by the base station apparatus 3. For example, as illustrated in FIG. 25, when three second PDCCH regions (a second PDCCH region 1, a second PDCCH region 2, and a second PDCCH region 3) are configured in the downlink system band, a number is given to each of the second PDCCH regions, the number #0 is given to the second PDCCH region 1, the number #1 is given to the second PDCCH region 2, and the number #2 is given to the second PDCCH region 3. When the second PDCCH region is configured in the mobile station apparatus 5, the base station apparatus 3 notifies the mobile station apparatus 5 of the given second PDCCH region number by using RRC signaling.

The mobile station apparatus 5 calculates the PUCCH resource offset for the second PDCCH region to which the second PDCCH region number is given, based on the given second PDCCH region number. Here, the mobile station apparatus 5 calculates a PUCCH resource offset for the second PDCCH region, by assuming that one second PDCCH region is configured with eCCEs of the number that has been determined in advance and PUCCH resources are reserved for each eCCE. For example, it is assumed that in the mobile station apparatus 5, one second PDCCH region is configured with 16 eCCEs, and 16 PUCCH resources are reserved from the second PDCCH region. The mobile station apparatus 5 recognizes that the second PDCCH regions of the smaller number than the given second PDCCH region number are configured with any DL PRB pairs of downlink system band, and recognizes that the PUCCH resource is reserved for the second PDCCH regions. Here, it is defined that the first ACK/NACK PUCCH resource for Dynamic ACK/NACK is associated from the second PDCCH region having the second PDCCH region number #0. In other words, in FIG. 25, Offset X1 is used as the PUCCH resource offset for the second PDCCH region 1 having the second PDCCH region number #0, and in this manner, the mobile station apparatus 5 recognizes the PUCCH resource offset. The Offset X2 which is the PUCCH resource offset used in the second PDCCH region 2 having the second PDCCH region number #1 is obtained by adding Offset X1 to 16 which is the number of ACK/NACK PUCCH resources which are reserved for the second PDCCH region 1 (Offset X1+16). The Offset X3 which is the PUCCH resource offset used in the second PDCCH region 3 having the second PDCCH region number #2 is obtained by adding Offset X1 to 16 which is the number of ACK/NACK PUCCH resources which are reserved for the second PDCCH region 1 and 16 which is the number of ACK/NACK PUCCH resources which are reserved for the second PDCCH region 2 (Offset X1+16×2). In other words, the PUCCH resource offset for the second PDCCH region of the second PDCCH region number is calculated by multiplying the second PDCCH region number by 16 (the number of ACK/NACK PUCCH resources which are reserved for one second PDCCH region) and by adding the obtained value from the multiplication to Offset X1 (Offset X1+16×second PDCCH region #). In addition, for example, when the second PDCCH region number starts from "1", it is possible to use the present application by adjusting the calculation expression into (Offset X1+16×(second PDCCH region #-1)).

In the case of the above configuration, a communication system of the present invention is a communication system which is configured with a plurality of mobile station apparatuses and a base station apparatus which performs communication with the plurality of mobile station apparatuses by using a downlink control channel and an uplink control channel, in which a plurality of physical resource block pairs are configured as a downlink control channel region having a possibility of the downlink control channel being arranged, a first element is configured with a plurality of resources into which one of the physical resource block pairs is divided, a second element is configured with an aggregation of a plurality of the first elements in the one physical resource block pair or an aggregation of a plurality of the first elements in the plurality of physical resource block pairs, the downlink control channel is configured with an aggregation of one or more second elements, and a resource of the uplink control channel corresponds to each of the second elements, in which the base station apparatus includes a second radio resource control unit that configures a plurality of downlink control channel regions, and configures a resource of an uplink control channel in which the association with a second element of the downlink control channel region is started for each of the downlink control channel regions, and associates information regarding the resource of an uplink control channel in which the association with a second element of a downlink control channel region which is configured is started with the number of a downlink control channel region; and a second transmission processing unit that transmits information which is configured by the second radio resource control unit, to the mobile station apparatus, and the mobile station apparatus includes a first radio resource control unit that configures a plurality of downlink control channel regions, based on information received from the base station apparatus which is configured by the second radio resource control unit; and a first control unit that configures the resource of the uplink control channel in which the association with the second element of the downlink control channel region is started, for each of the downlink control channel regions that are configured by the first radio resource control unit, based on the downlink control channel region number which is received from the base station apparatus.

In addition, in the embodiments of the present invention, for simplicity of explanation, the region of the resource in which the second PDCCH may be allocated is defined as the second PDCCH region, however, even if it is defined as a different term (for example, ePDCCH set), as long as it has an analogous meaning, it is obvious that the present invention can be applied thereto.

Further, the mobile station apparatus 5 is not limited to a moving terminal, and the present invention may be realized by implementing the function of the mobile station apparatus 5 in a fixed terminal.

The characteristic units of the present invention described above can be realized by implementing functions in an integrated circuit and controlling the functions. In other words, an integrated circuit of the present invention is an integrated circuit in which a plurality of physical resource block pairs are configured as a downlink control channel region in which a downlink control channel may be arranged, a first element is configured with a plurality of resources into which the one physical resource block pair is divided, a second element is configured with an aggregation of a plurality of the first elements in the one physical resource block pair or an aggregation of a plurality of the first elements in a plurality of the physical resource block pairs, a downlink control channel is configured with an aggregation of one or more second elements, and a resource of an uplink control channel corresponds to each of second elements, and which is implemented in a mobile station apparatus which performs communication with a base station apparatus by using the downlink control channel and the uplink control channel, including a first reception processing unit that receives information indicating a plurality of downlink control channel regions and information indicating a resource of an uplink control channel in which the association with a second element of a downlink control channel region is started for each of the downlink control channel regions, from the base station apparatus; a first radio resource control unit that configures a plurality of downlink control channel regions, based on information which is received by the first reception processing unit; and a first control unit that configures a resource of an uplink control channel in which the association with a second element of a downlink control channel region is started, based on information which is received by the first reception processing unit for each of the downlink control channel regions which are configured by the first radio resource control unit.

Further, in the integrated circuit of the present invention, the uplink control channel is used for transmission and reception of a reception confirmation acknowledgement, and the reception confirmation acknowledgement is a reception confirmation acknowledgement for data of the downlink shared channel of which resource allocation information is indicated by the downlink control channel.

Further, in the integrated circuit of the present invention, the first control unit determines the identification number of a resource of the uplink control channel used for transmission of a reception confirmation acknowledgement, based on the identification number of one or more second elements configuring the downlink control channel including information of resource allocation of the downlink shared channel and a resource of the uplink control channel in which the association with a second element of a downlink control channel region in which the downlink control channel is detected is started.

Further, an integrated circuit of the present invention is an integrated circuit in which a plurality of physical resource block pairs are configured as a downlink control channel region in which a downlink control channel may be arranged, a first element is configured with a plurality of resources into which the one physical resource block pair is divided, a second element is configured with an aggregation of a plurality of the first elements in the one physical resource block pair or an aggregation of a plurality of the first elements in a plurality of the physical resource block pairs, a downlink control channel is configured with an aggregation of one or more second elements, and a resource of an uplink control channel corresponds to each of second element, and which is implemented in a base station apparatus which performs communication with a plurality of mobile station apparatuses by using the downlink control channel and the uplink control channel, including a second radio resource control unit that configures a plurality of downlink control channel regions, and configures a resource of an uplink control channel in which the association with a second element of a downlink control channel region is started for each downlink control channel region; and a second transmission processing unit that transmits information which is configured by the second radio resource control unit, to the mobile station apparatus.

The operations described in the embodiments of the present invention may be realized by a program. A program operating in the mobile station apparatus 5 and the base station apparatus 3 according to the present invention is a program (a program for causing a computer to function) for controlling a CPU and so forth so as to implement the functions of the foregoing embodiments according to the present invention. Such information as handled by apparatuses is temporarily accumulated in a RAM while being processed, and then is stored in various ROMs and HDDs. The information is read by the CPU as necessary, for modification and writing. A recording medium having the program stored therein may be any of semiconductor media (for example, a ROM, a non-volatile memory card, and the like), optical recording media (for example, a DVD, an MO, an MD, a CD, a BD, and the like), magnetic recording media (for example, a magnetic tape, a flexible disk, and the like), and so forth. Furthermore, in addition to the implementation of the functions of the embodiments described above by executing the loaded program, the functions of the present invention may be implemented by processing the program in cooperation with an operating system, any other application program, or the like, based on instructions of the program.

In a case where the program is Distributed on market, the program may be stored in a transportable recording medium for distribution, or may be transferred to a server computer connected through a network such as the Internet. In this case, a storage device in the server computer also falls within the scope of the present invention. In addition, all or a part of the mobile station apparatus 5 and the base station apparatus 3 in the embodiments described above may be implemented as an LSI, which is typically an integrated circuit. The respective functional blocks of the mobile station apparatus 5 and the base station apparatus 3 may be individually built into chips, or some or all of them may be integrated and built into a chip. The method for forming an integrated circuit is not limited to LSI, and may be implemented by a dedicated circuit or a general-purpose processor. In the case of the advent of integrated circuit technology replacing LSI due to the advancement of semiconductor technology, it is also possible to use an integrated circuit based on this technology. The respective functional blocks of the mobile station apparatus 5 and the base station apparatus 3 may be implemented by a plurality of circuits.

Information and signal may be represented using any various different technologies and methods. For example, chips, symbols, bits, signals, information, commands, instructions, and data which may be referred to through the above description may be represented by voltages, currents, electromagnetic waves, magnetic fields or magnetic particles, optical fields or light particles, or the combination thereof.

Various exemplary logical blocks, processing units and the algorithm steps which are described in connection with the disclosure herein can be implemented by electronic hardware, computer software, or the combination of both. To clearly illustrate the synonymy of hardware and software, various exemplary elements, blocks, modules, circuits, and steps have been described generally with respect to their functionalities. Whether such functionalities are to be implemented as software or to be implemented as hardware will depend on individual applications and the design constraints imposed on the overall system. Although those skilled in the art may implement the described functionality by various methods regarding respective specific applications, determination of such implementation should not be interpreted as departing from the scope of this disclosure.

Various exemplary logical blocks and processing units described in connection with the disclosure herein may be implemented or performed by a general purpose application processor, a digital signal processor (DSP), an application specific integrated circuit (ASIC), a field programmable gate array signal (FPGA), or other programmable logic devices, a discrete gate or transistor logic, discrete hardware components, or combinations thereof which are designed to perform the functions described herein. The general purpose application processor may be a microprocessor, and instead thereof, may be processors in the related art, controllers, microcontrollers, or state machines. The processor may also be implemented as a combination of the computing devices. For example, the process may be a combination of the DSP and the microprocessor, a combination of a plurality of microprocessors, a combination of a DSP core and one or more microprocessors which are connected, or a combination of other such configurations.

The steps of a method or an algorithm described in connection with the disclosure herein may be embodied directly by hardware, a software module which is executed by a processor, or by a combination of these. The software module may be present in a RAM memory, a flash memory, a ROM memory, a EPROM memory, a EEPROM memory, a register, a hard disk, a removable disk, a CD-ROM, or a recording medium in any form known in the field. The typical recording medium may be coupled to a processor such that the processor can read information from the recording medium or can write information on the recording medium. In an alternative method, the recording medium may be integrated into the processor. The recording medium and the processor may be present in an ASIC. The ASIC may be present in the mobile station apparatus (user terminal). Alternatively, the processor and the recording medium may be present in the mobile station apparatus 5 as a discrete element.

In one or more typical designs, the described functions may be implemented by hardware, software, firmware, or a combination thereof. If the functions are implemented by software, the functions are held as one or more commands or codes on a computer-readable medium, or may be transmitted. Computer-readable media includes both communication media including any medium that facilitates carrying of computer programs from one place to another place and computer storage media. Recording media may be any media that can be accessed by a general purpose or a special purpose computer. While not being limited thereto, such computer-readable media may include a RAM, a ROM, an EEPROM, a CDROM or other optical disc media, magnetic disk media or other magnetic recording media, or available media that are accessible by a general purpose or a special purpose computer, or a general purpose or a special purpose processor in order to carry or hold desired program code means in the form of instructions or data structures. Further, any connection is appropriately referred to as a computer-readable medium. For example, when software is transmitted from web sites, servers, or other remote sources using wireless technologies such as a coaxial cable, a fiber optic cable, a twisted pair, a digital subscriber line (DSL), or an infrared, a radio, or a microwave, the coaxial cable, the fiber optic cable, the twisted pair, the DSL, or the infrared, the radio, or the microwave are included in the definition of medium. The disk (disc) as used herein includes a compact disk (CD), a laser disc (registered trademark), an optical disc, a digital versatile disc (DVD), a floppy (registered trademark) disk and a blu-ray disc. While the disk (disk) generally reproduces data magnetically, the disk (disc) reproduces data optically with lasers. A combination of the above should also be included in the computer-readable medium.

(1) The present invention includes the following units in order to achieve the above objects. In other words, a communication system of the present invention is a communication system which is configured with a plurality of mobile station apparatuses and a base station apparatus which performs communication with the plurality of mobile station apparatuses by using a downlink control channel and an uplink control channel, in which a plurality of physical resource block pairs are configured as a downlink control channel region having a possibility of the downlink control channels being arranged, a first element is configured with a plurality of resources into which one of the physical resource block pairs is divided, a second element is configured with an aggregation of a plurality of the first elements in the one physical resource block pair or an aggregation of a plurality of the first elements in the plurality of physical resource block pairs, the downlink control channel is configured with an aggregation of one or more second elements, and a resource of the uplink control channel corresponds to each of the second elements, in which the base station apparatus includes a second radio resource control unit that configures a plurality of downlink control channel regions, and configures a resource of an uplink control channel in which the association with a second element of the downlink control channel region is started for each of the downlink control channel regions; and a second transmission processing unit that transmits information which is configured by the second radio resource control unit, to the mobile station apparatus, and the mobile station apparatus includes a first radio resource control unit that configures a plurality of downlink control channel regions, based on information received from the base station apparatus which is configured by the second radio resource control unit; and a first control unit that configures the resource of the uplink control channel in which the association with the second element of the downlink control channel region is started, for each of the downlink control channel regions that are configured by the first radio resource control unit, based on information received from the base station apparatus which is configured by the second radio resource control unit.

(2) Further, in the communication system of the present invention, the uplink control channel is used in transmission and reception of a reception confirmation acknowledgement, and the reception confirmation acknowledgement is a reception confirmation acknowledgement for data of downlink shared channel of which resource allocation information is represented by the downlink control channel.

(3) Further, in the communication system of the present invention, the first control unit determines an identification number of a resource of the uplink control channel used in transmission of the reception confirmation acknowledgement, based on identification numbers of one or more second elements configuring the downlink control channel, which contains resource allocation information of the downlink shared channel and a uplink control channel resource in which the association with a second element of a downlink control channel region from which the downlink control channel is detected is started.

(4) Further, a mobile station apparatus of the present invention is a mobile station apparatus which performs communication with a base station apparatus by using a downlink control channel and an uplink control channel, in which a plurality of physical resource block pairs are configured as a downlink control channel region having a possibility of the downlink control channels being arranged, a first element is configured with a plurality of resources into which one of the physical resource block pairs is divided, a second element is configured with an aggregation of a plurality of the first elements in the one physical resource block pair or an aggregation of a plurality of the first elements in the plurality of physical resource block pairs, the downlink control channel is configured with an aggregation of one or more second elements, and a resource of the uplink control channel corresponds to each of the second elements, in which the mobile station apparatus includes a first reception processing unit that receives information indicating a plurality of downlink control channel regions and information indicating a resource of the uplink control channel in which the association with a second element of the downlink control channel region is started for each of the downlink control channel regions, from the base station apparatus; a first radio resource control unit that configures a plurality of downlink control channel regions, based on information which is received by the first reception processing unit; and a first control unit that configures a resource of the uplink control channel in which the association with a second element of a downlink control channel region is started, based on information which is received by the first reception processing unit, for each of the downlink control channel regions which are configured by the first radio resource control unit.

(5) Further, in the mobile station apparatus of the present invention, the uplink control channel is used in transmission and reception of a reception confirmation acknowledgement, and the reception confirmation acknowledgement is a reception confirmation acknowledgement for data of downlink shared channel of which resource allocation information is represented by the downlink control channel.

(6) Further, in the mobile station apparatus of the present invention, the first control unit determines identification number of a resource of the uplink control channel used in transmission of the reception confirmation acknowledgement, based on identification numbers of one or more second elements configuring the downlink control channel, which contains resource allocation information of the downlink shared channel and a uplink control channel resource in which the association with a second element of a downlink control channel region from which the downlink control channel is detected is started.

(7) Further, a base station apparatus of the present invention is a base station apparatus which performs communication with a plurality of mobile station apparatuses by using a downlink control channel and an uplink control channel, in which a plurality of physical resource block pairs are configured as a downlink control channel region having a possibility of the downlink control channels being arranged, a first element is configured with a plurality of resources into which one of the physical resource block pairs is divided, a second element is configured with an aggregation of a plurality of the first elements in the one physical resource block pair or an aggregation of a plurality of the first elements in the plurality of physical resource block pairs, the downlink control channel is configured with an aggregation of one or more second elements, and a resource of the uplink control channel corresponds to each of the second elements, in which the base station apparatus includes a second radio resource control unit that configures a plurality of downlink control channel regions, and configures a resource of an uplink control channel in which the association with a second element of the downlink control channel region is started for each of the downlink control channel regions; and a second transmission processing unit that transmits information which is configured by the second radio resource control unit, to the mobile station apparatus.

(8) Further, a communication method of the present invention is a communication method which is used in a mobile station apparatus that performs communication with a base station apparatus by using a downlink control channel and an uplink control channel, in which a plurality of physical resource block pairs are configured as a downlink control channel region having a possibility of the downlink control channels being arranged, a first element is configured with a plurality of resources into which one of the physical resource block pairs is divided, a second element is configured with an aggregation of a plurality of the first elements in the one physical resource block pair or an aggregation of a plurality of the first elements in the plurality of physical resource block pairs, the downlink control channel is configured with an aggregation of one or more second elements, and a resource of the uplink control channel corresponds to each of the second elements, in which the communication method includes at least a step of receiving information indicating a plurality of downlink control channel regions and information indicating a resource of the uplink control channel in which the association with a second element of the downlink control channel region is started for each of the downlink control channel regions, from the base station apparatus; a step of configuring a plurality of downlink control channel regions, based on information which is received; and a step of configuring a resource of the uplink control channel in which the association with a second element of a downlink control channel region is started, based on information which is received, for each of the downlink control channel regions which are configured.

(9) Further, in the communication method of the present invention, the uplink control channel is used in transmission and reception of a reception confirmation acknowledgement, and the reception confirmation acknowledgement is a reception confirmation acknowledgement for data of downlink shared channel of which resource allocation information is represented by the downlink control channel.

(10) Further, the communication method of the present invention further includes a step of determining identification number of a resource of the uplink control channel used in transmission of the reception confirmation acknowledgement, based on identification numbers of one or more second elements configuring the downlink control channel, which contains resource allocation information of the downlink shared channel, and a uplink control channel resource in which the association with a second element of a downlink control channel region from which the downlink control channel is detected is started.

(11) Further, a communication method of the present invention is a communication method which is used in a base station apparatus which performs communication with a plurality of mobile station apparatuses by using a downlink control channel and an uplink control channel, in which a plurality of physical resource block pairs are configured as a downlink control channel region having a possibility of the downlink control channels being arranged, a first element is configured with a plurality of resources into which one of the physical resource block pairs is divided, a second element is configured with an aggregation of a plurality of the first elements in the one physical resource block pair or an aggregation of a plurality of the first elements in the plurality of physical resource block pairs, the downlink control channel is configured with an aggregation of one or more second elements, and a resource of the uplink control channel corresponds to each of the second elements, in which the communication method includes a step of configuring a plurality of downlink control channel regions, and configuring a resource of an uplink control channel in which the association with a second element of the downlink control channel region is started for each of the downlink control channel regions; and a step of transmitting information which is configured to the mobile station apparatus.

(12) Further, an integrated circuit of the present invention is an integrated circuit which is implemented in a mobile station apparatus that performs communication with a base station apparatus by using a downlink control channel and an uplink control channel, in which a plurality of physical resource block pairs are configured as a downlink control channel region having a possibility of the downlink control channels being arranged, a first element is configured with a plurality of resources into which one of the physical resource block pairs is divided, a second element is configured with an aggregation of a plurality of the first elements in the one physical resource block pair or an aggregation of a plurality of the first elements in the plurality of physical resource block pairs, the downlink control channel is configured with an aggregation of one or more second elements, and a resource of the uplink control channel corresponds to each of the second elements, in which the integrated circuit includes a first reception processing unit that receives information indicating a plurality of downlink control channel regions and information indicating a resource of the uplink control channel in which the association with a second element of the downlink control channel region is started for each of the downlink control channel regions, from the base station apparatus; a first radio resource control unit that configures a plurality of downlink control channel regions, based on information which is received by the first reception processing unit; and a first control unit that configures a resource of the uplink control channel in which the association with a second element of a downlink control channel region is started, based on information which is received by the first reception processing unit, for each of the downlink control channel regions which are configured by the first radio resource control unit.

(13) Further, in the integrated circuit of the present invention, the uplink control channel is used in transmission and reception of a reception confirmation acknowledgement, and the reception confirmation acknowledgement is a reception confirmation acknowledgement for data of downlink shared channel of which resource allocation information is represented by the downlink control channel.

(14) Further, in the integrated circuit of the present invention, the first control unit determines identification number of a resource of the uplink control channel used in transmission of the reception confirmation acknowledgement, based on identification numbers of one or more second elements configuring the downlink control channel, which contains resource allocation information of the downlink shared channel and a uplink control channel resource in which the association with a second element of a downlink control channel region from which the downlink control channel is detected is started.

(15) Further, an integrated circuit of the present invention is an integrated circuit which is implemented in a base station apparatus which performs communication with a plurality of mobile station apparatuses by using a downlink control channel and an uplink control channel, in which a plurality of physical resource block pairs are configured as a downlink control channel region having a possibility of the downlink control channels being arranged, a first element is configured with a plurality of resources into which one of the physical resource block pairs is divided, a second element is configured with an aggregation of a plurality of the first elements in the one physical resource block pair or an aggregation of a plurality of the first elements in the plurality of physical resource block pairs, the downlink control channel is configured with an aggregation of one or more second elements, and a resource of the uplink control channel corresponds to each of the second elements, in which the integrated circuit includes a second radio resource control unit that configures a plurality of downlink control channel regions, and configures a resource of an uplink control channel in which the association with a second element of the downlink control channel region is started for each of the downlink control channel regions; and a second transmission processing unit that transmits information which is configured by the second radio resource control unit, to the mobile station apparatus.

While embodiments of this invention have been described in detail with reference to the drawings, a specific configuration is not limited to these embodiments, and the claims also includes design changes and the like without departing from the essence of this invention.

DESCRIPTION OF REFERENCE NUMERALS

3 BASE STATION APPARATUS,
4(A TO C) RRH,

5(A TO C) MOBILE STATION APPARATUS,
101 RECEPTION PROCESSING UNIT,
103 RADIO RESOURCE CONTROL UNIT,
105 CONTROL UNIT,
107 TRANSMISSION PROCESSING UNIT,
109 RECEIVE ANTENNA,
111 TRANSMIT ANTENNA,
201 PHYSICAL DOWNLINK SHARED CHANNEL PROCESSING UNIT,
203 PHYSICAL DOWNLINK CONTROL CHANNEL PROCESSING UNIT,
205 DOWNLINK PILOT CHANNEL PROCESSING UNIT,
207 MULTIPLEXING UNIT,
209 IFFT UNIT,
211 GI INSERTION UNIT,
213 D/A UNIT,
215 TRANSMISSION RF UNIT,
219 TURBO CODING UNIT,
221 DATA MODULATION UNIT,
223 CONVOLUTIONAL CODING UNIT,
225 QPSK MODULATION UNIT,
227 PRE-CODING PROCESSING UNIT (FOR PDCCH),
229 PRE-CODING PROCESSING UNIT (FOR PDSCH),
231 PRE-CODING PROCESSING UNIT (FOR DOWNLINK PILOT CHANNEL),
301 RECEPTION RF UNIT,
303 A/D UNIT,
309 SYMBOL TIMING DETECTION UNIT,
311 GI REMOVING UNIT,
313 FIT UNIT,
315 SUBCARRIER DEMAPPING UNIT,
317 CHANNEL ESTIMATION UNIT,
319 CHANNEL EQUALIZATION UNIT (FOR PUSCH),
321 CHANNEL EQUALIZATION UNIT (FOR PUCCH),
323 IDFT UNIT,
325 DATA DEMODULATION UNIT,
327 TURBO DECODING UNIT,
329 PHYSICAL UPLINK CONTROL CHANNEL DETECTION UNIT,
1331 PREAMBLE DETECTION UNIT,
333 SRS PROCESSING UNIT,
1401 RECEPTION PROCESSING UNIT,
403 RADIO RESOURCE CONTROL UNIT,
405 CONTROL UNIT,
407 TRANSMISSION PROCESSING UNIT,
409 RECEIVE ANTENNA,
411 TRANSMIT ANTENNA,
501 RECEPTION RF UNIT,
503 A/D UNIT,
505 SYMBOL TIMING DETECTION UNIT,
507 GI REMOVING UNIT,
509 FIT UNIT,
511 DEMULTIPLEXING UNIT,
513 CHANNEL ESTIMATION UNIT,
515 CHANNEL COMPENSATION UNIT (FOR PDSCH),
517 PHYSICAL DOWNLINK SHARED CHANNEL DECODING UNIT,
519 CHANNEL COMPENSATION UNIT (FOR PDCCH),
521 PHYSICAL DOWNLINK CONTROL CHANNEL DECODING UNIT,
523 DATA DEMODULATION UNIT,
525 TURBO DECODING UNIT,
527 QPSK DEMODULATION UNIT,
529 VITERBI DECODER UNIT,
531 DOWNLINK RECEPTION QUALITY MEASUREMENT UNIT,
533 PDCCH DEMAPPING UNIT,
605 D/A UNIT,
607 TRANSMISSION RF UNIT,
611 TURBO CODING UNIT,
613 DATA MODULATION UNIT,
615 DFT UNIT,
617 UPLINK PILOT CHANNEL PROCESSING UNIT,
619 PHYSICAL UPLINK CONTROL CHANNEL PROCESSING UNIT,
621 SUBCARRIER MAPPING UNIT,
623 IFFT UNIT,
625 GI INSERTION UNIT,
627 TRANSMISSION POWER ADJUSTMENT UNIT,
629 RANDOM ACCESS CHANNEL PROCESSING UNIT

The invention claimed is:

1. A terminal apparatus configured to communicate with a base station apparatus, the terminal apparatus comprising:
a radio resource controller configured to and/or programmed to, in a case that a transmission type of a first enhanced physical downlink control channel (EPDCCH) set and a transmission type of a second EPDCCH set are configured with a same transmission type:
configure, based on a radio resource control (RRC) signaling, the first EPDCCH set and the second EPDCCH set for EPDCCH monitoring; and
configure the transmission type of the first EPDCCH set and the transmission type of the second EPDCCH set with a localized transmission type or a distributed transmission type;
a receiver configured to and/or programmed to monitor a set of EPDCCH candidates based on the first EPDCCH set and the second EPDCCH set, a first physical uplink control channel (PUCCH) resource offset being configured for the first EPDCCH set by the RRC signaling, a second PUCCH resource offset being configured for the second EPDCCH set by the RRC signaling; and
a transmitter configured to and/or programmed to transmit a hybrid automatic repeat request-acknowledgement (HARQ-ACK) for a physical downlink shared channel transmission indicated by a detection of an EPDCCH, the HARQ-ACK being transmitted using a PUCCH resource, wherein
each of the first EPDCCH set and the second EPDCCH set consist of a plurality of physical resource block pairs,
in a case that the EPDCCH is in the first EPDCCH set, the PUCCH resource is determined based on at least a lowest enhanced control channel element (ECCE) index used to construct the EPDCCH and the first PUCCH resource offset,
in a case that the EPDCCH is in the second EPDCCH set, the PUCCH resource is determined based on at least a lowest ECCE index used to construct the EPDCCH and the second PUCCH resource offset, and
each of the first EPDCCH set and the second EPDCCH set includes a set of ECCEs, ECCE indices for the set of ECCEs being numbered in each of the first EPDCCH set and the second EPDCCH set.

2. The terminal apparatus according to claim 1, wherein the first PUCCH resource offset is a relative number difference between a lowest index of a PUCCH resource configured in a cell and an index of the PUCCH resource in which association with an ECCE index of the first EPDCCH set is started, and the second PUCCH resource offset is a relative number difference between a lowest index of a PUCCH resource configured in a cell and an index of the PUCCH resource in which association with an ECCE index of the second EPDCCH set is started.

3. A base station apparatus configured to communicate with a terminal apparatus, the base station apparatus comprising:

a radio resource controller configured to and/or programmed to, in a case that a transmission type of a first enhanced physical downlink control channel (EPDCCH) set and a transmission type of a second EPDCCH set are configures with a same transmission:

configure, based on a radio resource control (RRC) signaling, the first EPDCCH set and the second EPDCCH set for EPDCCH monitoring; and configure the reception type of the first EPDCCH set and the reception type of the second EPDCCH set with a localized reception type or a distributed reception type;

a transmitter configured to and/or programmed to transmit an EPDCCH based on the first EPDCCH set and the second EPDCCH set, a first physical uplink control channel (PUCCH) resource offset being configured by the RRC signaling for the first EPDCCH set, and a second PUCCH resource offset being configured by the RRC signaling for the second EPDCCH set; and a receiver configured to and/or programmed to receive a hybrid automatic repeat request-acknowledgement (HARQ-ACK) for a physical downlink shared channel transmission indicated by a detection of the EPDCCH, the HARQ-ACK being received using a PUCCH resource; wherein each of the first EPDCCH set and the second EPDCCH set consists of a plurality of physical resource block pairs, in a case that the EPDCCH is in the first EPDCCH set, the PUCCH resource is determined based on at least a lowest enhanced control channel element (ECCE) index used to construct the EPDCCH and the first PUCCH resource offset, in a case that the EPDCCH is in the second EPDCCH set, the PUCCH resource is determined based on at least a lowest ECCE index used to construct the EPDCCH and the second PUCCH resource offset, and each of the first EPDCCH set and the second EPDCCH set includes a set of ECCEs, ECCE indices for the set of ECCEs being numbered in each of the first EPDCCH set and the second EPDCCH set.

4. The base station apparatus according to claim 3, wherein the first PUCCH resource offset is a relative number difference between a lowest index of a PUCCH resource configured in a cell and an index of the PUCCH resource in which association with an ECCE index of the first EPDCCH set is started, and the second PUCCH resource offset is a relative number difference between a lowest index of a PUCCH resource configured in a cell and an index of the PUCCH resource in which association with an ECCE index of the second EPDCCH set is started.

5. A communication method for a terminal apparatus configured to communicate with a base station apparatus, the communication method comprising:

in a case that a transmission type of a first enhanced physical downlink control channel EPDCCH set and a transmission type of a second EPDCCH set are configured with a same transmission type:

configuring, based on a radio resource control (RRC) signaling, the first EPDCCH set and the second EPDCCH set for EPDCCH monitoring;

configuring the transmission type of the first EPDCCH set and the transmission type of the second EPDCCH set with a localized transmission type of a distributed transmission type;

monitoring a set of EPDCCH candidates based on the first EPDCCH set and the second EPDCCH set, a first physical uplink control channel (PUCCH) resource offset being configured by the RRC signaling, a second PUCCH resource offset being configured by the RRC signaling; and transmitting a hybrid automatic repeat request-acknowledgement (HARQ-ACK) for a physical downlink shared channel transmission indicated by a detection of an EPDCCH, the HARQ-ACK being transmitted using a PUCCH resource, wherein each of the first EPDCCH set and the second EPDCCH set consists of a plurality of physical resource block pairs, in a case that the EPDCCH is in the first EPDCCH set, the PUCCH resource is determined based on at least a lowest enhanced control channel element (ECCE) index used to construct the EPDCCH and the first PUCCH resource offset, in a case that the EPDCCH is in the second EPDCCH set, the PUCCH resource is determined based on at least a lowest ECCE index used to construct the EPDCCH and the second PUCCH resource offset, and each of the first EPDCCH set and the second EPDCCH set includes a set of ECCEs, ECCE indices for the set of ECCEs being numbered in each of the first EPDCCH set and the second EPDCCH set.

6. A communication method for a base station apparatus configured to communicate with a terminal apparatus, the communication method comprising:

in a case that a reception type of a first enhanced physical downlink control channel (EPDCCH) set and a reception type of a second EPDCCH set are configured with a same reception type:

configuring, based on a radio resource control (RRC) signaling, the first EPDCCH set and the second EPDCCH set for EPDCCH monitoring; and configuring a reception type of the first EPDCCH set and a reception type of the second EPDCCH set with a localized reception type or a distributed reception type;

transmitting an EPDCCH based on the first EPDCCH set and the second EPDCCH set, a first physical uplink control channel (PUCCH) resource offset being configured by the RRC signaling and a second PUCCH resource offset being configured by the RRC signaling; and receiving a hybrid automatic repeat request-acknowledgement (HARQ-ACK) for a physical downlink shared channel transmission indicated by a detection of the EPDCCH, the HARQ-ACK being received using a PUCCH resource, wherein each of the first EPDCCH set and the second EPDCCE set consists of a plurality of physical resource block pairs, in a case that the EPDCCH is in the first EPDCCH set, the PUCCH resource is determined based on at least a lowest enhanced control channel element (ECCE) index used to construct the EPDCCH and the first PUCCH resource offset, in a case that the EPDCCH is in the second EPDCCH set, the PUCCH resource is determined based on at least a lowest enhanced control channel element (ECCE) index used to construct the EPDCCH and the second PUCCH resource offset, and each of the first EPDCCH set and the second EPDCCH set includes a set of ECCEs, ECCE indices for the set of ECCEs being numbered in each of the first EPDCCH set and the second EPDCCH set.

* * * * *